(12) United States Patent
Ohodnicki, Jr. et al.

(10) Patent No.: US 12,553,828 B2
(45) Date of Patent: Feb. 17, 2026

(54) FIBER OPTIC LUMINESCENCE-BASED SENSOR USING METAL-ORGANIC FRAMEWORKS FOR DETECTION OF RARE EARTH ELEMENTS

(71) Applicant: United States Department of Energy, Washington, DC (US)

(72) Inventors: Paul R. Ohodnicki, Jr., Allison Park, PA (US); John P. Baltrus, Jefferson Hills, PA (US); Scott E. Crawford, West Mifflin, PA (US)

(*) Notice: Subject to any disclaimer, the term of this patent is extended or adjusted under 35 U.S.C. 154(b) by 310 days.

(21) Appl. No.: 18/229,329

(22) Filed: Aug. 2, 2023

(65) Prior Publication Data

US 2025/0044227 A1 Feb. 6, 2025

(51) Int. Cl.
*G01N 21/64* (2006.01)

(52) U.S. Cl.
CPC ..... *G01N 21/6404* (2013.01); *G01N 21/6428* (2013.01); *G01N 21/645* (2013.01); *G01N 2021/6406* (2013.01); *G01N 2021/6482* (2013.01); *G01N 2021/6484* (2013.01)

(58) Field of Classification Search
CPC ....... G01N 21/6404; G01N 2021/6406; G01N 2021/6482; G01N 2021/6484
See application file for complete search history.

(56) References Cited

U.S. PATENT DOCUMENTS

| | | | |
|---|---|---|---|
| 8,617,421 B2 | 12/2013 | Petoud et al. | |
| 11,170,986 B2 | 11/2021 | Ahern et al. | |
| 11,371,943 B2* | 6/2022 | Lamberti | G01M 3/047 |
| 2014/0163111 A1 | 6/2014 | Rosi et al. | |

FOREIGN PATENT DOCUMENTS

CN 107652439 B * 7/2020 ............. G01N 21/64

OTHER PUBLICATIONS

English translation of CN-107652439-B (Year: 2020).*
An et al., Metal-Adeninate Vertices for the Construction of an Exceptionally Porous Metal-organic Framework, Nature Communications, 2012, 3, 604.

(Continued)

*Primary Examiner* — Sung H Pak
(74) *Attorney, Agent, or Firm* — Andrew Choi; Aaron Keith; Michael J. Dobbs

(57) ABSTRACT

A system and method for detecting and quantifying the concentration of rare earth elements in a fluid contacting a sensor, the method having the steps of: providing the sensor to an environment such that the sensor is in contact with the fluid, wherein the sensor features a fiber extending between a first end and a second end along a longitudinal axis, wherein the sensor further features a coating on the second end of the fiber, and wherein the coating is a metal-organic framework material including, but not limited to zinc adeninate, 1,3,5-benzenetricarboxylate, 4,4-biphenyldicarboxylate, and combinations thereof; interrogating the sensor with light; collecting a luminescent signal; and detecting the rare earth elements in the fluid contacting the sensor using the luminescent signal.

21 Claims, 69 Drawing Sheets

(56) References Cited

OTHER PUBLICATIONS

An et al., Zinc-Adeninate Metal-Organic Framework for Aqueous Encapsulation and Sensitization of Near-infrared and Visible Emitting Lanthanide Cations, Journal of the American Chemical Society, 2011, 133, 1220.

Shen et al., Anionic Metal-Organic Framework Hybrids: Functionalization with Lanthanide Ions or Cationic Dyes and Fluorescence Sensing of Small Molecules, RSC Advances, 2016, 6, 28165.

Qin et al., A Microporous Anionic Metal-Organic Framework for Sensing Luminescence of Lanthanide(III) Ions and Selective Absorption of Dyes by Ionic Exchange, Chemistry: A European Journal, 2014, 20, 5625.

Crawford et al., (2020). Materials for the Photoluminescent Sensing of Rare Earth Elements: Challenges and Opportunities. Journal of Materials Chemistry C, 8(24), 7975-8006.

An et al., (2015). Synthesis and Characterization of a New Anionic Zinc-Adeninate Metal-Organic Framework, [Zn 3 (ad)(BTC) 2·(Me 2 NH 2), 5.75 DMF, 0.25 H 2 O]. Journal of Porous Materials, 22(4), 867-875.

Gilles-Mazon et al., (2018). Synthesis and characterization of a Bio-MOF based on mixed adeninate/tricarboxylate ligands and zinc ions. Inorganica Chimica Acta, 469, 306-311.

Cai et al., (2015). Spatial, hysteretic, and adaptive host-guest chemistry in a metal-organic framework with open Watson-Crick sites. Angewandte Chemie, 127(36), 10600-10605.

Dou et al., (2014). Luminescent metal-organic framework films as highly sensitive and fast-response oxygen sensors. Journal of the American Chemical Society, 136(15), 5527-5530.

Lou et al., (2019). A Eu3+ post-functionalized metalorganic framework as fluorescent probe for highly selective sensing of Cu2+ in aqueous media. Journal of Molecular Structure, 1177, 444-448.

* cited by examiner

FIBER OPTIC LUMINESCENCE-BASED SENSOR USING METAL-ORGANIC FRAMEWORKS FOR DETECTION OF RARE EARTH ELEMENTS

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments relate to luminescence-based sensors and methods of using said sensors to detect rare earth elements in a fluid. More specifically, embodiments relate to optical sensors featuring a metal-organic framework coating, with said metal organic framework coating providing rare earth element sensitizing capabilities.

BACKGROUND

Rare earth elements (REEs) are broadly defined as the 14 lanthanides (Ce—Lu, characterized by a partially filled 4f subshell), along with lanthanum, scandium and yttrium. REEs are essential to advanced technologies, including electronics, high-performance magnets and turbines, optical displays, and national defense systems. Despite their relatively high abundance within the earth's crust, REE production is hindered by economic and environmental challenges: extracting and isolating individual REEs is tedious and expensive, requiring multiple extraction steps using harsh solvents. Mitigating the environmental effects of REE mining has rendered REE production unprofitable in many nations, contributing to monopolistic conditions in the global market.

Diversification of REE sources is one potential path for circumventing the economic and environmental challenges associated with REE mining. In particular, strategies involving REE recycling and recovery from natural water sources, waste streams such as coal refuse, fly ash, acid mine drainage, industrial wastewaters, and REE-rich end-of-life products (such as magnets, electronics, etc.) are being explored. A key step in enhancing the economic feasibility of REE extraction from waste streams is the ability to locate high value streams prior to engaging in tedious extraction processes, and to characterize and monitor downstream production and refining steps. There is thus a critical need to develop sensors capable of rapid REE detection and quantification within waste and recycling streams.

One exemplary area for REE detection includes acid mine drainage (AMD), a harsh matrix that presents extreme challenges. AMD waters often have REE content in the low part-per-million or part-per-billion range. And, the concentration of interfering metal cations in AMD is often several orders of magnitude higher than the REE content, with pH values as low as 2. For sensors based on REE sensitization, quenching effects from water must also be mitigated, an additional challenge. Therefore, it is essential to develop approaches that can detect REEs in aqueous fluids and in the presence of acids and other interfering secondary metals.

Several techniques currently exist for metals characterization. Atomic emission techniques, such as inductively-coupled plasma mass spectrometry (ICP-MS) or optical emission spectroscopy (ICP-OES), are the most commonly-used techniques for analyzing REE content in waste streams due to their high sensitivity (down to part-per-billion or part-per-trillion concentration levels) and ability to distinguish individual elements. Despite the sensitivity, significant drawbacks to ICP techniques include high instrumentation ($100,000 or higher) and operation costs, required use of acids and carrier gasses for operation, specialized operator training, and a lack of portability. All of these drawbacks substantially lengthen the amount of time required for sample processing. Miniaturized, handheld X-Ray fluorescence spectroscopy (XRF) and laser-induced breakdown spectroscopy (LIBS) systems are available and are more cost-effective than ICP-MS, however the detection limits are several orders of magnitude higher than luminescence spectroscopy. Further, commercial XRF and LIBS can only be used on solid samples.

A promising alternative to replace (or to complement) ICP is to use luminescence-based sensors for REE detection. Advantages to luminescent techniques include significantly lower instrumentation costs, simpler operation, and the ability to design portable systems for field deployment. Notably, luminescence-based detection of REEs is almost exclusively conducted in solution. Additionally, the processing steps (i.e. extraction, purification, and concentration) associated with REE recovery from solid state sources are usually solution-based. Hence, luminescence-based techniques present a foundation for rapid, low-cost method for characterizing downstream REE processing steps relative to ICP, and they may be directly used to rapidly identify high value liquid streams of REEs, such as natural waters, acid mine drainage, and industrial wastewaters. Thus, luminescence sensing methods would considerably lower both the monetary and time costs associated with identifying high-value waste streams and improve the economic viability of REE recovery.

Several REEs, including Gadolinium, Terbium, Samarium, Dysprosium, Europium, Holmium, Thulium, Ytterbium, Praseodymium, Neodymium, and Erbium are well suited for luminescence-based sensing techniques, because they exhibit distinct, element-specific emission bands in the visible and near-infrared regions. However, the optical transitions that give rise to these emission bands are parity forbidden, rendering direct excitation inefficient. To circumvent this, a sensitizer material may first be excited, followed by energy transfer (typically via the sensitizer triplet state) to the REE and subsequent REE-centered photoluminescence. This energy-transfer process may occur through space by donor-acceptor dipole-dipole coupling (i.e., Förster resonance energy transfer), a simultaneous through-bond electron exchange between the donor and acceptor (Dexter energy transfer), or via a photoinduced, redox-mediated pathway. In general, sensitization requires the chromophore and REE to be in close proximity (approximately 100 Å or less for a Förster process and a few angstrom or less for a Dexter mechanism), as well as spectral overlap between the energy donor and acceptor. Hence, a sensor material with suitable emission energy and in proximity to an REE may be used to sensitize REE-centered emissions, allowing individual emissive REEs to be distinguished from one another.

A range of high-performance sensing materials have recently been developed for the luminescence-based detection of REEs. Metal-organic frameworks (MOFs), which are crystalline, ordered, highly porous materials having metal centers linked by organic ligands, have emerged as attractive materials for use in luminescent ion sensing due to their highly tunable emission properties and pore functionalities.

MOF structural variables such as pore size can be precisely tuned via careful selection of the linker or by post-synthetic modifications, making them attractive as selective sensors. Further, a nearly limitless combination of metal centers and organic linkers can be used for the design of MOFs, enabling a range of exciting properties that can be optimized for applications including gas capture/separation, drug delivery, and sensing.

Along with structural tunability, the optical features of the MOF may also be controlled by judicious choice of the linker and metal centers, facilitating their use as REE sensitizers. Certain anionic MOFs, such as the zinc-adeninate MOFs, encapsulate REEs via a cation-exchange process, whereas other MOFs utilize linkers with extra chelation sites that bind REEs. Following REE encapsulation, these MOFs sensitize REEs through excitation of chromophoric ligands on the MOF by an external light source, which results in energy transfer to the REE and REE-centered emission, enabling detection.

There are, however, multiple challenges that must be overcome for the development of a robust MOF-based sensor. Many MOFs are not stable in water, or at the low pH levels in which REEs are often extracted, have not been evaluated for detection limits in water, and/or are toxic. MOFs that do require custom-made linkers can be expensive both in terms of material cost and in the number of synthetic steps required. For environmental applications, such as deployment in acid mine drainage where potentially interfering metal concentrations are orders of magnitude higher than REE content, highly selective sensors are needed. Despite significant progress in the development of MOF-based REE sensors, correlations of the MOF structure with sensing efficacy have been limited.

One class of MOFs, anionic zinc adeninate metal-organic frameworks (bioMOFs) can be used for detecting and distinguishing part-per-billion levels of terbium, europium, dysprosium, samarium, ytterbium, and neodymium, and this response is observed even in complex matrices such as spiked acid mine drainage samples. Biological metal organic frameworks (bioMOFs) generally are metal organic frameworks incorporating biologically-derived biomolecules, such as amino acids, peptides, nucleobases, and polysaccharides. Several portable instrumentations have been developed specifically for rare earth element detection, and the bioMOF sensing material has successfully been integrated with several of these platforms. However, in these cases, the sensing material is dispersed in solution for sensing and is not recovered for reuse. Moreover, the sensing signal in solution is weakened by solvent molecules, which are known to significantly quench REE-centered emission. Solution-based luminescent sensing also makes real-time monitoring a challenge because new sensing material must constantly be introduced.

An embodiment of the invention described herein addresses these challenges by immobilizing a thin film of bioMOF onto an optical fiber, which can be used with a portable spectrometer. The system is suitable for detecting part-per-billion levels of REEs in water. Additionally, the luminescence signal and sensitivity is typically doubled by drying the BioMOF-coated tip. The sensing material can be qualitatively regenerated and used across multiple sensing cycles by exposing the tip to dilute hydrochloric acid for several minutes to remove encapsulated REEs. Further, in an embodiment, the invention described herein is capable of detecting parts-per-billion levels of REEs in process streams and harsh matrices, including fly ash leachate and pentane extraction liquids. Finally, an embodiment of the invention described herein provides advantages over other luminescence sensing approaches in the prior art, including ICP-MS in terms of cost and portability, and significantly better sensitivity than XRF or LIBS.

A need exists in the art for a rapid, portable, luminescence-based sensing technique for sensing rare earth elements, that technique suitable for detecting REEs at part-per-billion concentration levels and suitable for deployment in aqueous fluids that overcomes the disadvantages of the prior art.

SUMMARY

Embodiments of the invention provide a luminescence-based sensor for detecting REEs in aqueous solutions and methods for using same, wherein the sensor comprises an optical fiber coated with a metal-organic framework. In an embodiment, the metal-organic framework absorbs REEs and sensitizes said REEs to luminescence-based detection. One object of the invention is providing a luminescence-based sensor suitable for detecting and quantifying rare earth elements at part-per billion concentration levels in aqueous fluids, especially in fluids with high acidity and high concentrations of interfering metal ions. The invented sensor comprises an optical fiber coated with a metal-organic framework material. Said sensor is suitable for deployment in harsh fluids, such as fly ash leachate, sulfuric acid leachate, and pentane extraction liquids.

The invention provides a method to detect and quantify rare earth elements in a solution contacting a sensor, comprising: providing the sensor to an environment such that the sensor is in contact with the fluid, wherein the sensor comprises a fiber extending between a first end and a second end along a longitudinal axis, wherein the sensor further comprises a coating on the second end of the fiber, wherein the coating comprises a metal-organic framework material; interrogating the sensor with light; collecting a luminescent signal; and detecting the rare earth elements in the fluid contacting the sensor using the luminescent signal.

The invention also provides a luminescence-based sensor comprising: a fiber extending between a first end and a second end along a longitudinal axis, wherein the sensor further comprises a coating on the second end of the fiber, wherein the coating comprises a metal-organic framework material.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

As used herein, limit or limits of detection (LOD) means the lowest concentration of an analyte or selected material in a sample that can be detected.

Sensor Devices and Materials

Figure 1A:
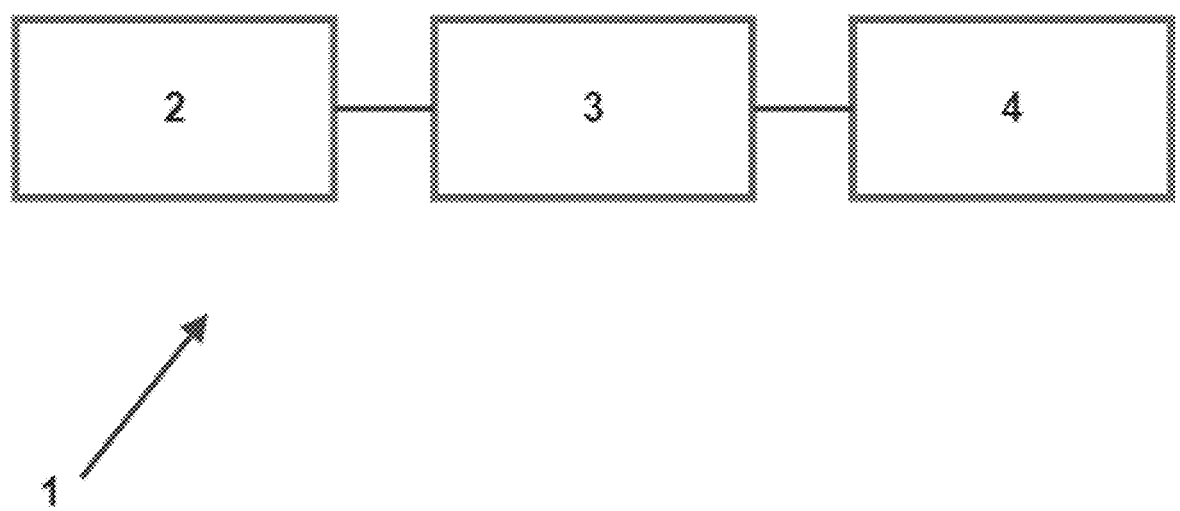
FIG. 1A is a simplified schematic of a system for detecting and quantifying rare earth elements in a fluid using a fiber optic sensor featuring a metal-organic framework coating, in accordance with the features of the present invention.
Figure 20:
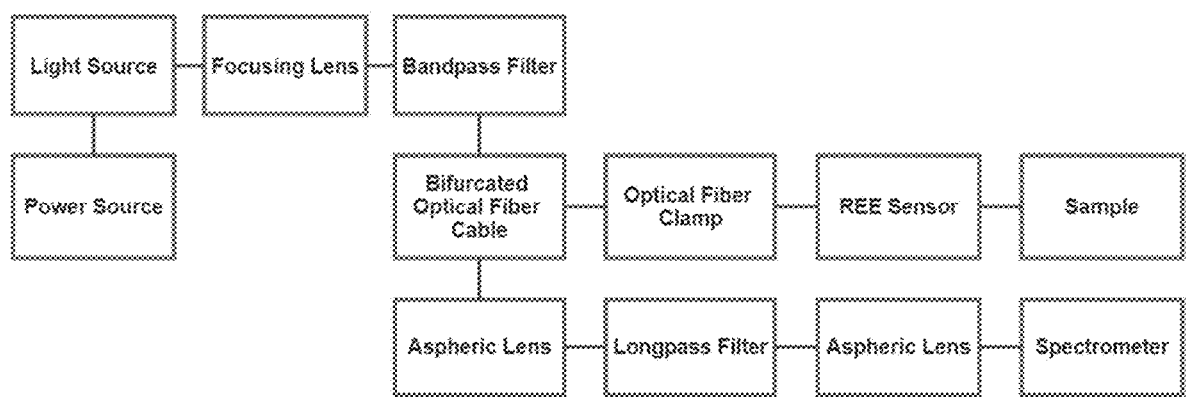
FIG. 20 is a schematic of an exemplary embodiment of a system for detecting and quantifying rare earth elements in a fluid using a fiber optic sensor featuring a metal-organic framework coating, in accordance with the features of the present invention.

FIG. 1A depicts a simplified schematic of a system 1 for detecting and quantifying rare earth elements in a fluid using luminescence. As shown in FIG. 1A, the system 1 comprises a light source 2 upstream from and in electronic and optical communication with an REE sensor 3. A detector 4 is in electronic and optical communication with the REE sensor. An exemplary embodiment of the system 1 is shown in FIG. 20.

Figure 1B:
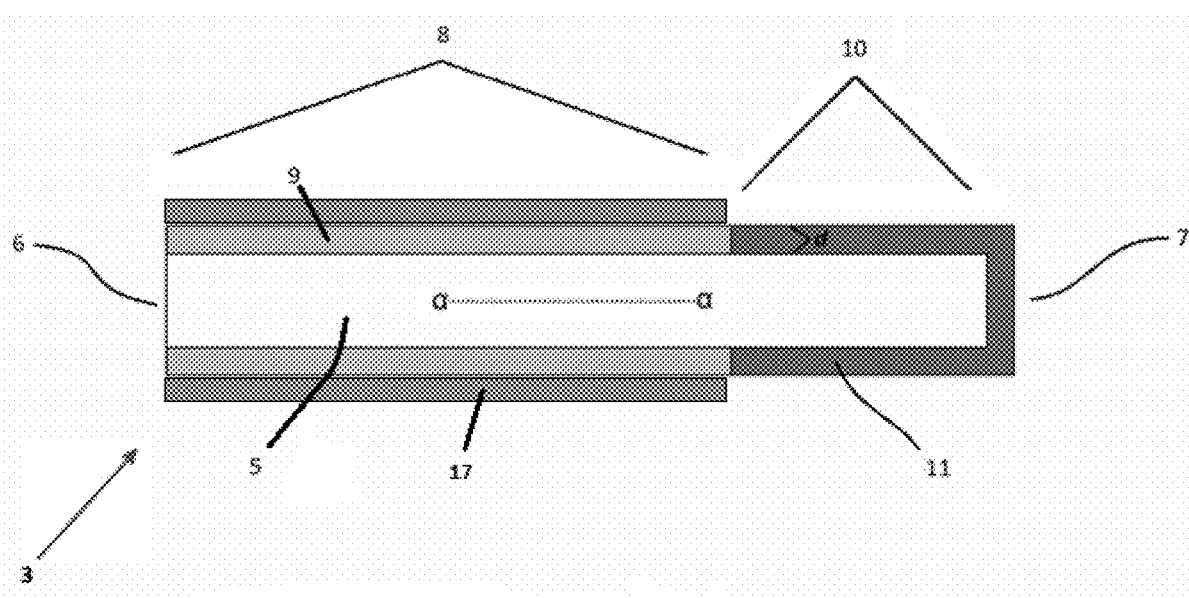
FIG. 1B is a detail view of a fiber optic REE sensor featuring a metal-organic framework coating, in accordance with the features of the present invention.

FIG. 1B is a simplified schematic of the invented REE sensor 3. As shown in FIG. 1B, the REE sensor 3 comprises an optical fiber 5 extending between a first end 6 and second end 7 along the longitudinal axis a of the fiber 5. A proximal portion 8 of the fiber 5 adjacent to and including the first end 6 is optionally surrounded by a cladding 9, wherein the cladding 9 is optionally overlaid and surrounded by a polymer jacket 17. A distal portion 10 of the fiber 5 adjacent to and including the second end 7 does not feature the cladding 9 or the polymer jacket 17. The distal portion 10 of the fiber 5 adjacent to and including the second end 7 is surrounded by a coating comprising a metal-organic framework material 11.

In an embodiment, the optical fiber 5 comprises a multi-mode type of fiber. In an exemplary embodiment of the REE sensor shown in FIGS. 1A and 1B, the fiber 5 comprises a cladded, solarization-resistant, high-OH silica fiber, wherein the second end 7 of the fiber, and the core thereof is exposed to and directly contacts the metal-organic framework material 11.

The above describes the REE sensor 3 comprising an end-coated segment of fiber overlaid by a metal organic framework material. In such an embodiment, the light source 2 and the detector 4 are on the same side of the REE sensor 3. This is exemplary and not meant to be limiting. Practical embodiments can comprise portions of fiber overlaid by the metal-organic framework material 11 positioned between portions of the fiber overlaid by cladding 9.

Figure 21:
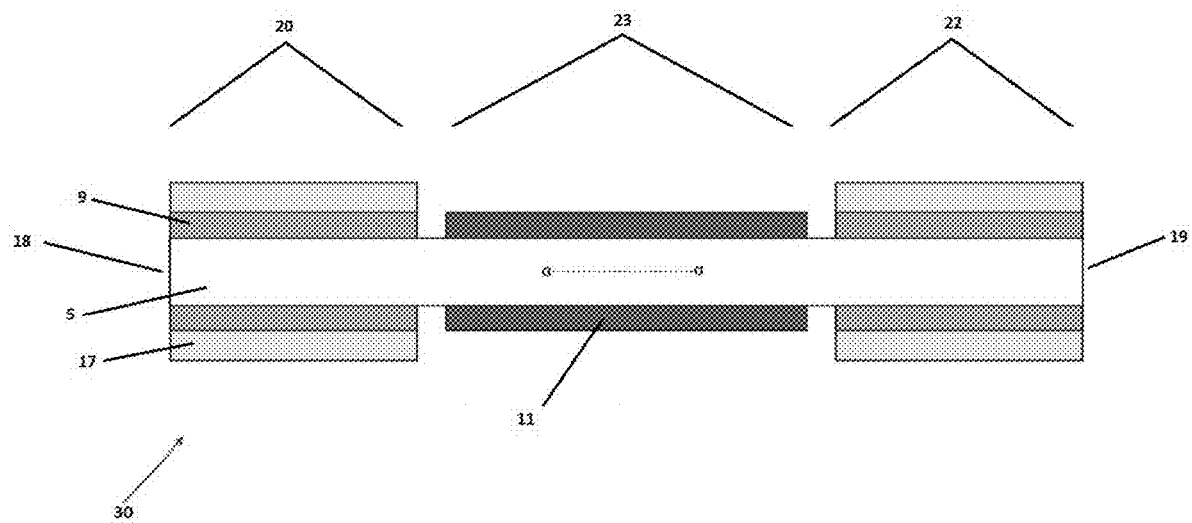
FIG. 21 is a detail view of a fiber optic REE sensor featuring a metal-organic framework coating, in accordance with the features of the present invention.

FIG. 21 is a simplified schematic of an alternative embodiment of the invented REE sensor 30. As shown in FIG. 21, the REE sensor 30 comprises an optical fiber 5 extending between a first end 18 and a second end 19 along the longitudinal axis a of the fiber. A proximal portion 20 of the fiber 5 adjacent to and including the first end 18 is overlaid and surrounded by a cladding 9, wherein the cladding 9 is optionally overlaid and surrounded by a polymer jacket 17. A distal portion 22 of the fiber 20 adjacent to and including the second end 19 is also optionally overlaid and surrounded by the cladding 9, wherein the cladding 9 is optionally overlaid and surrounded by a polymer jacket 17. A medial portion 23 of the fiber 5 positioned between the proximal portion 20 and distal portion 22 of the fiber does not feature cladding or a polymer jacket. The medial portion 23 of the fiber 5 is coated with a metal-organic framework material 11.

The above describes the REE sensor 30 featuring proximal 20, medial 23, and distal portions 22. This is exemplary and not meant to be limiting. Practical embodiments can comprise a plurality of portions of fiber overlaid by the metal-organic framework material 11 positioned between portions of the fiber overlaid by cladding 9. In some such embodiments, the light source 2 and detector 4 are on opposite sides of the sensor 30. In other embodiments using the sensor design shown in FIG. 21, the light source and detector are both upstream from the sensor and utilize backscattering.

Returning to FIG. 1B, A salient feature of the invention is the metal-organic framework (MOF) material 11 comprising the overlayment (coating) surrounding the distal portion 10 of the fiber 5 adjacent to and including the second end 7 of the fiber 5. The MOF material 11 comprises any highly porous crystalline material comprising of metal centers linked by organic ligands that are suitable for encapsulating rare earth elements, wherein chromophoric ligands on the metal-organic framework are excited by a light source, followed by energy transfer to encapsulated rare earth element and rare earth element-centered emission, enabling detection. Exemplary metal-organic framework materials include zinc-adeninate MOFs (BioMOFs) comprising zinc metal centers and adeninate ligands, University of Oslo (UiO) MOFs, comprising zirconium metal centers and terephthalic acid ligands, and Materials of Institut Lavoisier (MIL) MOFs, comprising aluminum metal centers and trimellitic acid ligands.

In an embodiment, the metal-organic framework materials described herein are highly porous crystalline materials comprising one or more metal ions and one or more bridging organic ligands coupled to the metal ions. In such an embodiment, the metal ions and ligands are coupled via coordination bonds that are covalent and/or ionic (e.g., electrostatic). In an embodiment, the MOFs disclosed herein are made to exhibit high surface area and tunable nanostructured cavities and are modified both chemically and physically. In an embodiment, the MOFs disclosed herein also can rapidly adsorb and/or absorb rare earth elements in pores defined in the MOFs. In an embodiment, the MOFs are recycled as the physiosorbed detectable species is evacuated from the MOF material by subjecting it to dilute hydrochloric acid solution. As such, in an embodiment, the MOF materials described herein are reusable in a subsequent application.

In an embodiment, the metal ions comprising the MOFs are selected from metals capable of forming one or more coordination bonds with one or more of a mono-, di-, tri-, or tetra-valent ligand. In some embodiments, the one or more metals comprise a metal selected from a Group 2 metal, a metal belonging to any one of Groups 7-13 metal (wherein "Group" refers to a group of the Periodic Table), and combinations thereof. In some embodiments, the metal ions comprising the MOFs comprise multiple metal ions of a single species, or a cluster thereof. In yet additional embodiments, multiple metal ions of two or more species, or a cluster thereof, are used. In exemplary embodiments, the metal is selected from copper, silver, gold, aluminum, zinc, cobalt, nickel, magnesium, manganese, iron, cadmium, beryllium, calcium, titanium, tin, chromium, vanadium, and combinations thereof.

In an embodiment, the organic ligands comprising the MOFs disclosed herein are selected from mono-, di-, tri-, and tetra-valent ligands. In some embodiments, the ligands are selected from a bidentate carboxylic acid ligand (or a carboxylate thereof), a tri-dentate carboxylic acid ligand (or carboxylate thereof), an azole ligand, and a combination thereof. Exemplary ligands include, but are not limited to, oxalic acid, malonic acid, succinic acid, glutaric acid, phthalic acid, terephthalic acid, citric acid, trimesic acid, benzene-1,3,5-tricarboxylic acid (BTC), 4,6-dioxido-1,3-benzenedicarboxylate (DOBDC), 1,2,3-triazole, pyrrodizaole, squaric acid, 1,4-diazabicyclo[2.2.2]octane) (DABCO), 1,4-naphthalenedicarboxylate (NDC), 3,6-di (pyridin-4-yl)-1,2,4,5-tetrazine (DPTZ), N,N'-di(4-pyridyl)-1,4,5,8-naphthalenediimide (dpNDI), 4,4-biphenyldicarboxylate, and combinations thereof.

In an embodiment, a metal-organic framework material is applied to an underlying fiber 5 using any suitable procedure for providing a thin coating of the MOF material onto the fiber. Exemplary procedures include sol-gel coating and dipcoating, wherein the procedures include using silica coatings including, but not limited to, tetraethyl orthosilicate (TEOS), silanes, including but not limited to (3-aminopropyl)triethoxysilane (APTES), and polymers including but not limited to polymethyl methacrylate (PMMA).

Returning to FIG. 1A, in an embodiment, the light source 2 is any device suitable for sending light to the REE sensor 3. Exemplary light sources include deep UV light-emitting diodes (LEDs), broadband lamps, blue and UV lasers, UV lamps, and combinations thereof.

In an embodiment, the detector 4 comprises any device suitable for receiving and measuring a luminescent signal. For example, an embodiment uses a spectrometer to measure luminescent signal transmitted from REE sensor 3. Exemplary detectors include broadband spectrometers, photodiodes, photomultiplier tubes, and charge coupled devices. In the system 1 shown in FIG. 1A, the detector 4 is a simple optical detector that measures luminescent signal it receives from the REE sensor 3.

Figure 1C:
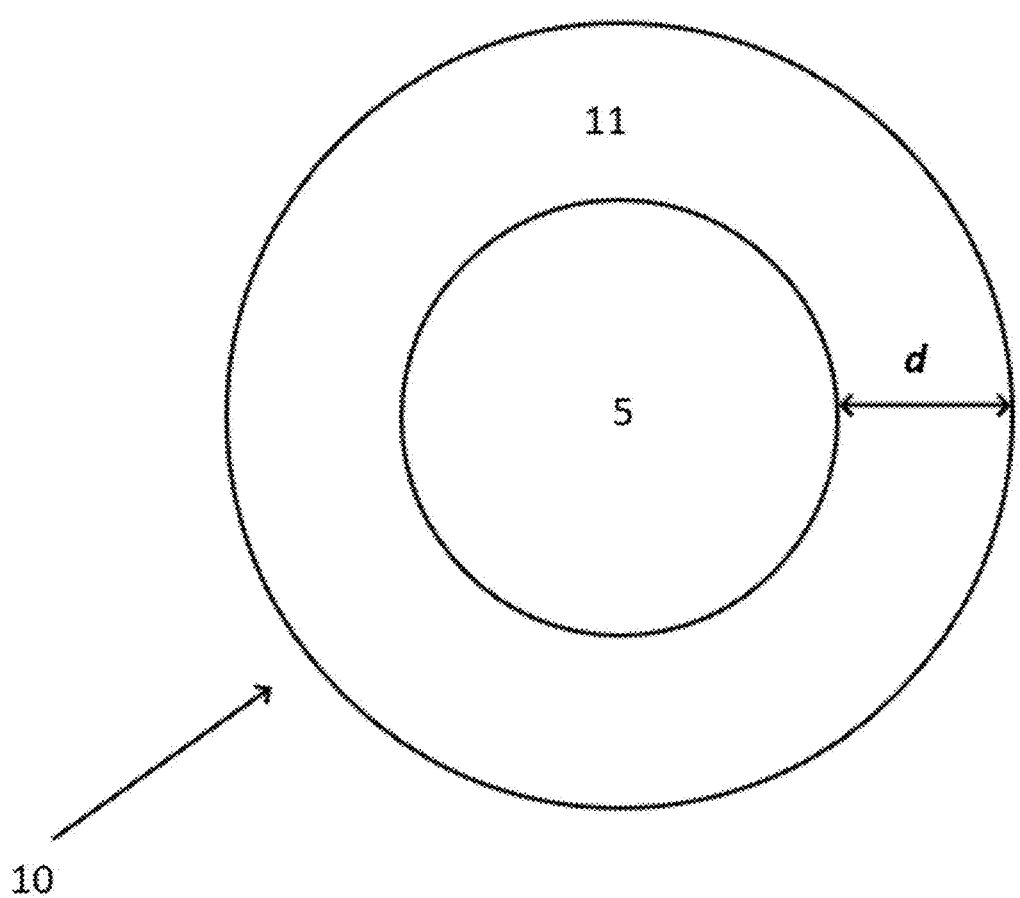
FIG. 1C is a cross sectional view of a fiber optic REE sensor featuring a metal-organic framework coating, in accordance with the features of the present invention.
Figure 2:
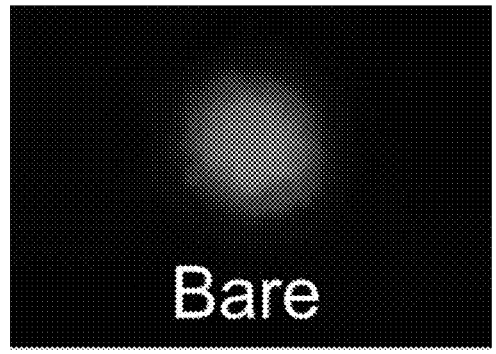
FIG. 2 is a cross-sectional image an optical fiber in communication with a powered-on light source powered on before application of a metal-organic framework coating, in accordance with the features of the present invention.
Figure 3:
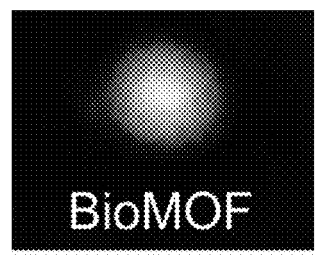
FIG. 3 is a cross-sectional image of an optical fiber that has been coated with a metal-organic framework in communication with a powered-on light, in accordance with the features of the present invention.
Figure 4:
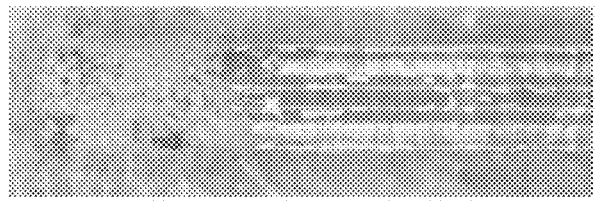
FIG. 4 is an optical microscope image of an optical fiber coated with a metal-organic framework coating, in accordance with the features of the present invention.
Figure 5:
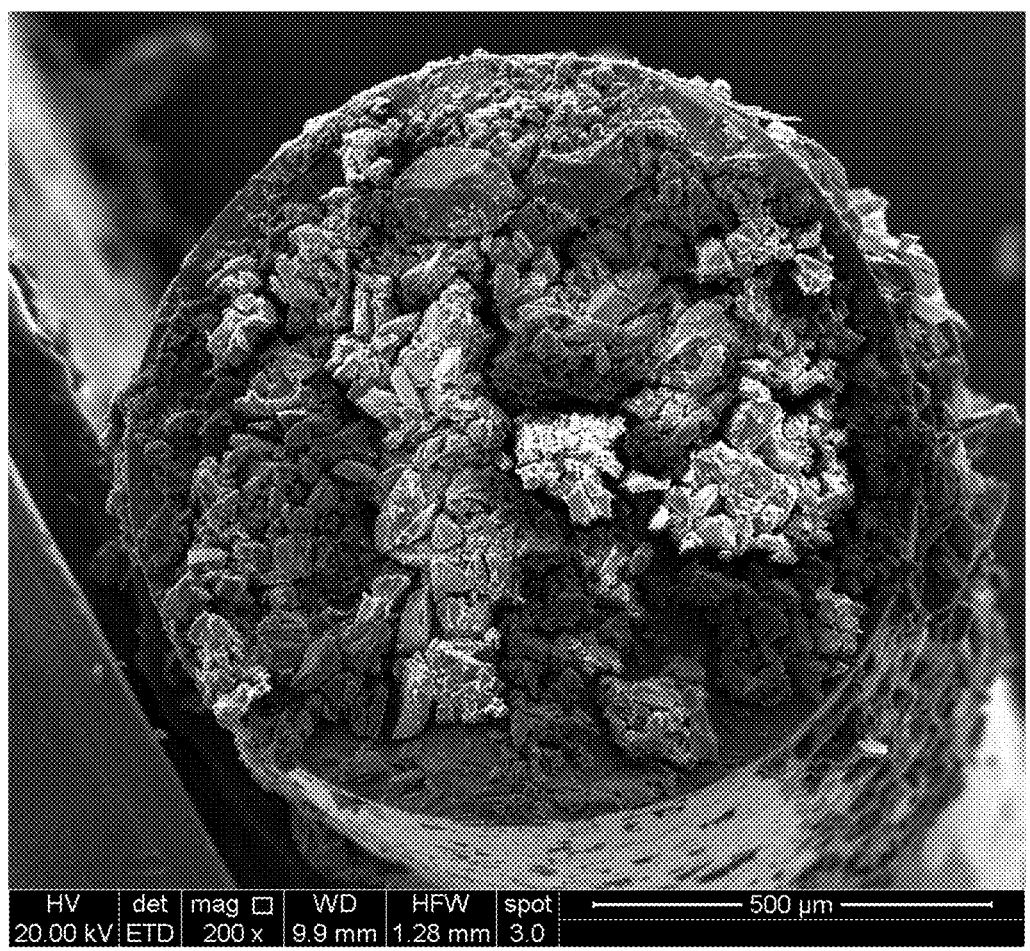
FIG. 5 is a cross-sectional SEM image of an optical fiber featuring a metal-organic framework coating, in accordance with the features of the present invention.

FIG. 1C is a cross-sectional view of fiber 5 with a coating comprising the metal-organic framework material 11. As shown in FIG. 1C, the coating of metal-organic framework material 11 has a thickness d. A person having ordinary skill in the art can readily discern that a coating of any thickness can be generated using one of the coating procedures described above. In an embodiment, the coating of metal-organic framework material 11 has a thickness d between approximately 50 nm and approximately 100 μm. Exemplary embodiments of metal-organic framework material coatings are shown in FIGS. 2-5. FIG. 2 shows an optical image of the second end of a fiber prior to coating, and FIG. 3. shows an optical image of the second end of a fiber after coating, wherein a light source is powered on in both images. FIG. 4 shows an optical microscope image of the fiber after coating. FIG. 5 shows a SEM image of a MOF-coated fiber tip.

Methods of Using REE Sensor

Figure 6:
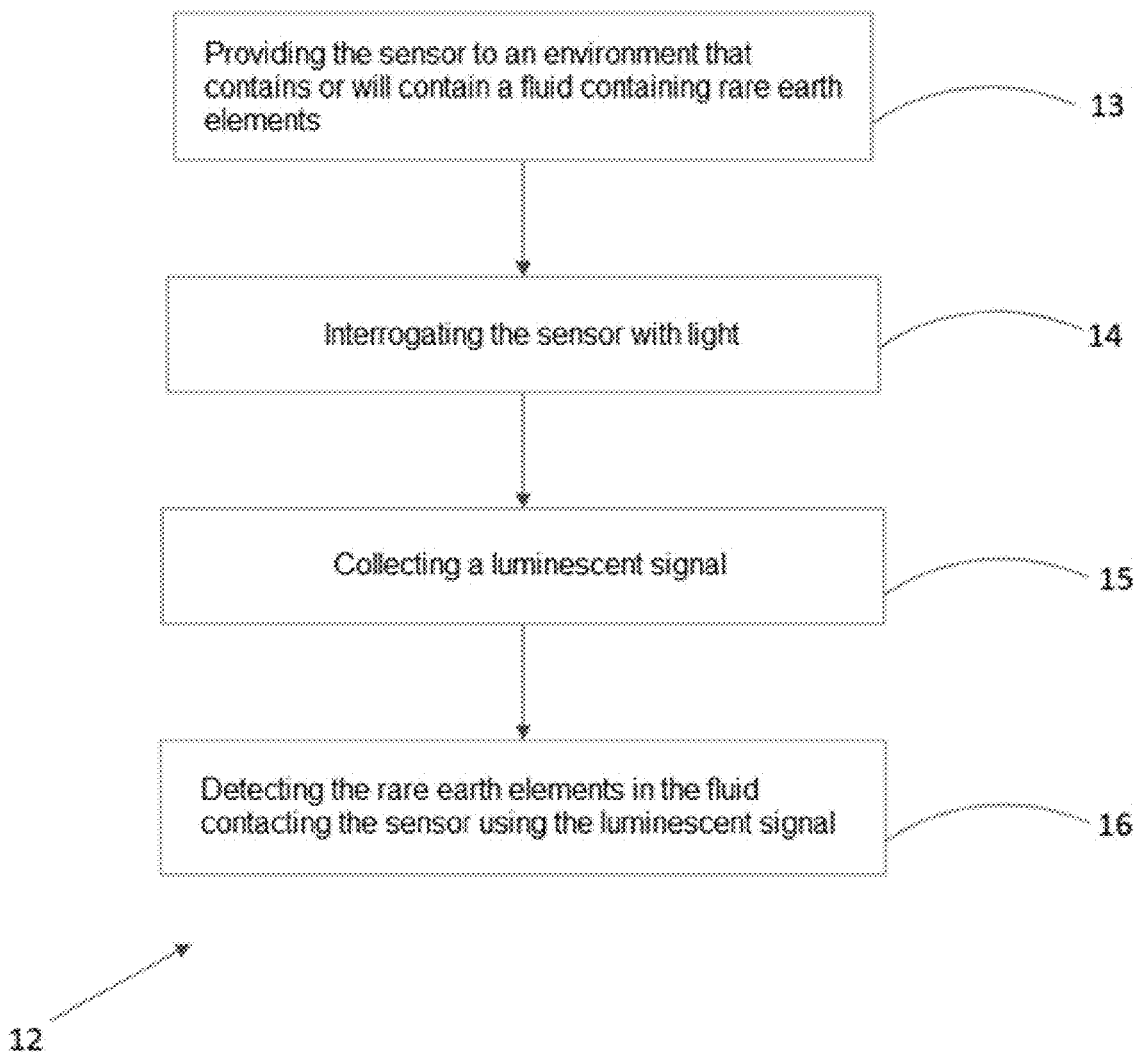
FIG. 6 is a flow chart for a method of detecting and quantifying REEs of a fluid using a fiber optic REE sensor featuring a metal-organic framework coating, in accordance with the features of the present invention.

FIG. 6 provides a method 12 to detect and quantify rare earth elements using the invented luminescence-based REE sensor 3 in a fluid contacting said sensor. The method 12 begins by providing the sensor to an environment that contains or will contain a fluid containing rare earth elements 13. The method then continues with interrogating the sensor with light 14, collecting a luminescent signal 15, and detecting and quantifying rare earth elements in the fluid contacting the REE sensor using the luminescent signal 16.

In the first step of method 12 shown in FIG. 6, the REE sensor is deployed into an environment that contains or will contain a fluid containing rare earth elements to be detected and quantified 13. A salient feature of the invention is that the REE sensor is suitable for detecting and quantifying rare earth elements in exemplary fluids such as harsh aqueous solutions and organic solvents. For example, the sensor is suitable for deployment in environments and contact with fluids having low pH values, or in the presence of interfering metal cation concentrations several orders of magnitude higher than the rare earth element concentrations. Further, the sensor is suitable for deployment in aqueous fluids, where O—H oscillations quench rare earth element emission. In an embodiment, the REE sensor is suitable for detecting and quantifying REEs present in exemplary fluids such as aqueous fluids/solutions, AMD, fly ash leachate, sulfuric acid leachate, organic solvents used for extraction, and combinations thereof. In an embodiment, the REE sensor is suitable for detecting and quantifying REEs present in acidic fluids with pH values as low as approximately 0. In an embodiment, the REE sensor is suitable for detecting and quantifying REEs present in environments and fluids with temperatures as high as approximately 130° C. In still further embodiments, the invented sensor and method are suitable for detecting REEs in any fluid.

As shown in FIG. 6, the invented method continues with interrogating the sensor with light 14. In this step, light is emitted from a light source, wherein the light used in the interrogating step comprises wavelengths that energize chromophoric ligands within a metal-organic framework, whereafter the metal-organic framework transfers energy to an encapsulated REE, resulting in REE-centered emission. In an embodiment, in the invented method, the wavelength of the light used in the interrogation step is determined by performing excitation scans, whereby the wavelength of the light selected is the wavelength or wavelengths producing the highest emission intensity from each MOF-REE combination.

As shown in FIG. 6 and described above, the invented method comprises collecting a luminescent signal 15. In this step, the luminescent signal is collected after the sensor has been interrogated. The luminescent signal is light emitted by rare earth elements contained in the fluid, the emitted light generated as a result of the light used to interrogate the sensor interacting with the rare earth elements.

In an embodiment, the method shown in FIG. 6 further comprises sensitizing the rare earth elements for detection. Sensitizing the rare earth elements for detection comprises absorbing the rare earth elements from a fluid into pores defined in the metal-organic framework material coating 11 on the sensor 3. In an embodiment, in the invented method, interrogating the sensor comprises energizing the metal-organic framework with the light from the light source, wherein the metal-organic framework transfers energy to REEs absorbed by, encapsulated within, pores defined by the metal-organic framework. Energy received by the REEs from the energized MOF excites said REEs, the excited REEs then emitting the luminescent signal to a detector 4. The wavelength and intensity of the luminescent signal will be modified varying amounts as the specific rare earth element and the concentration of said element or elements in the fluid contacting the metal-organic framework material varies.

After collecting the luminescent signal 15, the method continues with detecting the rare earth elements in the fluid contacting the sensor using the luminescent signal 16. This step comprises determining the presence and quantity of rare earth elements in the fluid contacting the metal-organic framework material coating 11 on the sensor 3. In an embodiment, the detecting and quantifying step comprises testing the sensor with reference solutions having various known concentrations of different REEs and comparing data from testing said reference solutions with the collected luminescent signal.

In an embodiment, the invented REE sensor utilizes a metal-organic framework material. In an embodiment, properties of the metal-organic framework are tunable such that said metal-organic framework encapsulates and sensitizes particular rare earth elements. In some embodiments, the optical emission profile of the metal-organic framework is controlled by altering its ligands and metal center structures. In an embodiment, altering the ligand and metal structure provides the ability to selectively sensitize individual REEs, or to sensitize multiple REEs simultaneously. In an embodiment, alterations to both the MOF linker and structure tune selectivity for REEs in the presence of acids and competing metal ions.

In an alternative embodiment, after the sensor is provided into the environment containing a fluid containing rare earth elements, the method continues with removing the sensor from the environment 13 followed by drying the sensor prior to interrogating the sensor with light. Drying the sensor reduces solvent-based luminescence quenching and leads to enhanced luminescent signal, as demonstrated in FIG. 7. In an embodiment, the method comprises drying the sensor under nitrogen gas for 1 minute. In another embodiment, the method comprises drying the sensor with a heat gun set to 400° C. for approximately 0.5 minutes with the fiber tip held 2 inches away.

In an embodiment, the method is performed continuously and in situ, by continuously interrogating the sensor that is deployed in the environment and continuously collecting and analyzing luminescent signals.

Alternatively, the method shown in FIG. 6 continues by removing the sensor from the environment 13 followed by regenerating the REE sensor for reuse in the method. Regenerating the REE sensor comprises stripping REEs from the MOF, removing said REEs from the pores of the MOF. Stripping the REEs from the MOF comprises exposing the MOF-coated sensor to a dilute acid. In an embodiment, the acid is selected from hydrochloric acid, hydrobromic acid, sulfuric acid, nitric acid, chloric acid, acetic acid, and phosphoric acid. The REE sensor disclosed herein can be regenerated using dilute hydrochloric acid of approximately 0.5M.

Regeneration is desirable because it increases the lifetime of the sensing material, reduces chemical waste, and saves time and costs that would be spent synthesizing additional sensing material. In an embodiment, exposing a metal-organic framework material-coated optical fiber tip to dilute hydrochloric acid for 2.5 minutes eliminated emission signal from REEs. Importantly, the REE signal returned upon exposure to the REE solution.

In another alternative embodiment, after taking a measurement, the portion of the optical fiber coated by the metal-organic framework material can be stripped off or cleaved, and subsequently dipcoated in fresh metal-organic framework material. Given the miniscule amount of metal-organic framework material used per measurement, and the short length of the coated sensor tip (approximately a few millimeters), the cost of each measurement is estimated to be a few cents based on the price of metal-organic framework precursors and the optical fiber consumed.

The invented sensor and method described herein are suitable to detect and quantify rare earth elements in a fluid. As used herein, rare earth elements include exemplary elements scandium, yttrium, lanthanum, cerium, praseodymium, neodymium, promethium, samarium, europium, gadolinium, terbium, dysprosium, holmium, erbium, thulium, ytterbium, lutetium, and combinations thereof. These elements suitable for detection and quantification using the invented sensor and method are exemplary and not meant to be limiting.

In some embodiments, the REE sensors provide limits of detection and quantification suitable for use in detecting various concentrations of rare earth elements. In some embodiments, the sensor devices are suitable for detecting and quantifying REEs present in fluid in concentrations between approximately several hundred ppm to approximately several hundred ppb. In some embodiments, the REE sensor provides limits of detection ranging from approximately 140 ppb to approximately 780 ppb, preferably between approximately 140 ppb and approximately 500 ppb, and limits of quantification ranging from approximately 380 ppb to approximately 2600 ppb, preferably between approximately 380 ppb and approximately 1000 ppb, (shown in Table 1).

Limits of detection and quantification are decreased (i.e. sensitivity of the sensor increases) in embodiments drying the sensor before interrogating said sensor. In those embodiments, REE emission intensity is enhanced due to the removal of solvent molecules that typically act as vibrational quenchers of REE emission. For example, in an embodiment, an improved limit of detection can be achieved using drying, wherein a limit of detection for an REE decreased from approximately 140 ppb in solution to 60 ppb after drying, and a limit of quantification for the REE decreased from approximately 450 ppb in solution to 210 ppb after drying. After drying, the REE sensor can achieve limits of detection ranging from approximately 60 ppb to 620 ppb and limits of quantification ranging from approximately 210 ppb to 2100 ppb (shown in Table 1). The limit of detection of the sensor device can be determined using methods known to those of ordinary skill in the art, such as by measuring changes in REE emission intensity as a function of REE concentration.

TABLE 1

Limits of Detection and Quantification for Visible-Emitting REEs in Water and After Drying

| REE | | Solution | Dry |
|---|---|---|---|
| Tb | LOD (ppb) | 140 + 20 | 60 + 10 |
|    | LOQ (ppb) | 450 + 80 | 210 + 40 |
| Dy | LOD (ppb) | 600 + 80 | 440 + 20 |
|    | LOQ (ppb) | 2000 + 200 | 1460 + 60 |
| Sm | LOD (ppb) | 780 + 80 | 620 + 80 |
|    | LOQ (ppb) | 2600 + 300 | 2100 + 300 |
| Eu | LOD (ppb) | 110 + 20 | 90 + 10 |
|    | LOQ (ppb) | 380 + 60 | 290 + 30 |

In some embodiments, the REE sensor disclosed herein can be used during prospecting to locate REE-rich streams, such as in fresh waters, and in other streams containing solubilized REEs which do not require leaching steps to facilitate extraction.

In some embodiments, the REE sensor disclosed herein can be used to detect REEs in waste streams, including acid leachates, containing quenching species such as metal ions and acids. Likewise, the REE sensor can be used to monitor the effectiveness of solution-phase leaching, processing, and purification steps, including Membrane Solvent Extraction (MSX), utilized to extract REEs from solids, including from coal, fly ash, and electronic waste. In an embodiment, the REE sensor is suitable to detect a luminescent signal from part per billion concentrations of rare earth elements in several process streams containing REEs, including fly ash leachate, sulfuric acid leachate, and acid mine drainage.

In some embodiments, the REE sensor disclosed herein can be used to detect REEs in fluids including organic solvents. It is common for REEs to be extracted into organic solvents. In an embodiment, the REE sensor was able to detect luminescent signal from rare earth elements extracted into pentane.

The REE sensor disclosed herein can be used to monitor the performance and integrity of sorbent materials. In an exemplary embodiment, a method of determining the presence of REEs, comprising exposing a sample downstream of a sorbent material to the disclosed REE sensor and analyzing a luminescent signal obtained from REEs by the REE sensor. In an embodiment, no signal would be observed by the REE sensor downstream from a REE sorbent material until the sorbent material is saturated with the REE(s) of interest or fails. Consequently, the presence of signal from REEs in such an embodiment would indicate sorbent saturation or failure. In an embodiment, when a sorbent functions properly, REEs are absorbed, and no signal from the REE sensor would be observed.

EXAMPLES

Reagent grades of zinc nitrate hexahydrate, europium(III) chloride hexahydrate, terbium(III) nitrate hexahydrate, dysprosium(III) chloride hexahydrate, samarium(III) nitrate hexahydrate, adenine, nitric acid, hydrochloric acid, 1,3,5'-benzenetricarboxylate (BTC), and dimethylformamide (DMF) were purchased from Millipore Sigma (St. Louis, MO). De-ionized water (purity of 18.2 MΩ-cm, Barnstead EASYpure LF system) was used for all syntheses and measurements (typical pH: approximately 5.8).

An exemplary luminescence-based REE sensor, as shown and described herein, for the detection of rare earth elements was fabricated using anionic zinc adeninate metal-organic frameworks (bioMOFs) with 1,3,5-benzenetricarboxylate (BTC) ligands as sensitizers for REE-centered emission. The BTC MOF structures evaluated are shown in Table 2.

TABLE 2

MOF Structures Evaluated for REE Detection

| Name | Formula |
|---|---|
| BTC-1 | $Zn_3(Ad)(BTC)_2(DMA) \cdot 5.75DMF, 0.25H_2O$ |
| BTC-2 | $Zn_7(Ad)_4(BTC)_4(DMF)O \cdot 4DMA, 3DMF_4, H_2O$ |
| BTC-3 | $Zn_3(Ad)(BTC)_2(H_2O) \cdot DMA, xDMF, yH_2O$ |

Figure 14:
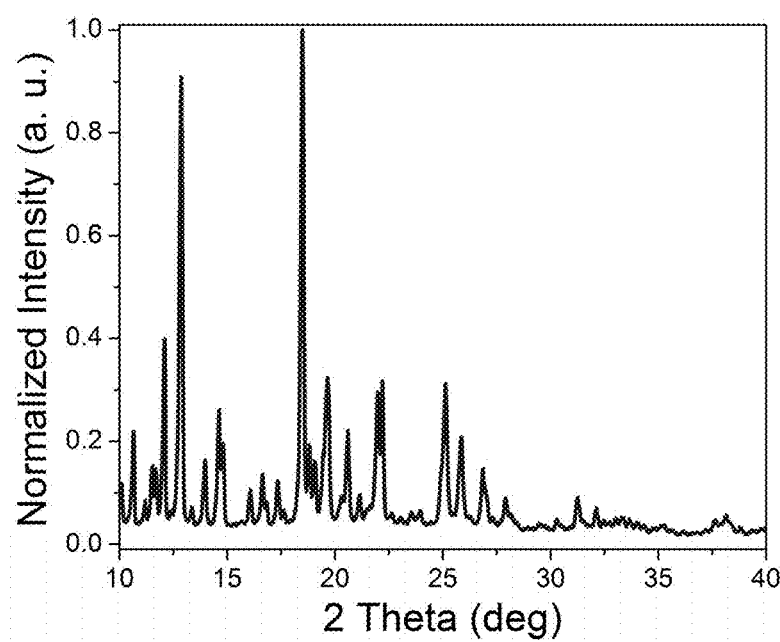
FIG. 14 is an XRD characterization of BTC-1 MOF, in accordance with the features of the present invention.
Figure 15A:
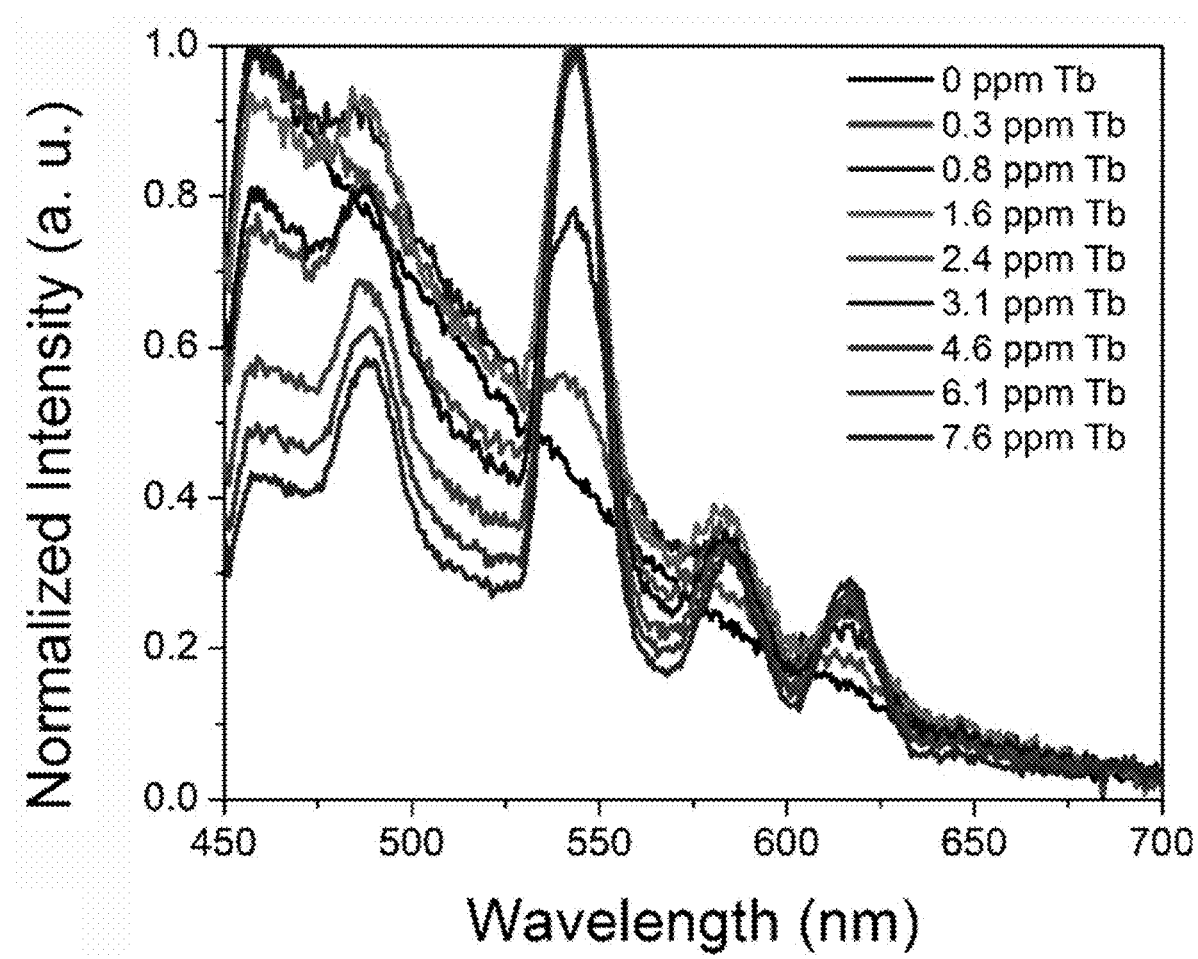
FIG. 15A is normalized emission spectra of BTC-1 as a function of increasing Tb concentration in solution, in accordance with the features of the present invention.
Figure 15B:
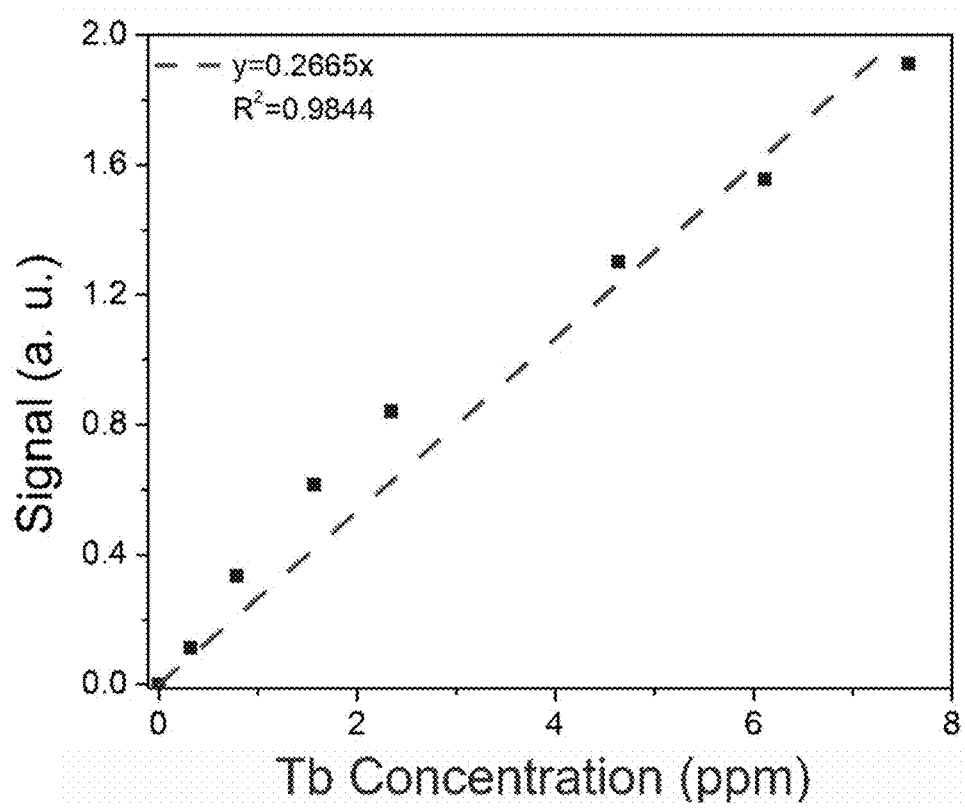
FIG. 15B is a corresponding calibration curve to FIG. 15A for limit of detection analysis of BTC-1 as a function of increasing Tb concentration in solution, where Signal corresponds to the intensity ratio ($I_{543}/I_{453}$) at each data point with the ($I_{543}/I_{453}$) of the MOF alone subtracted, in accordance with the features of the present invention.
Figure 15C:
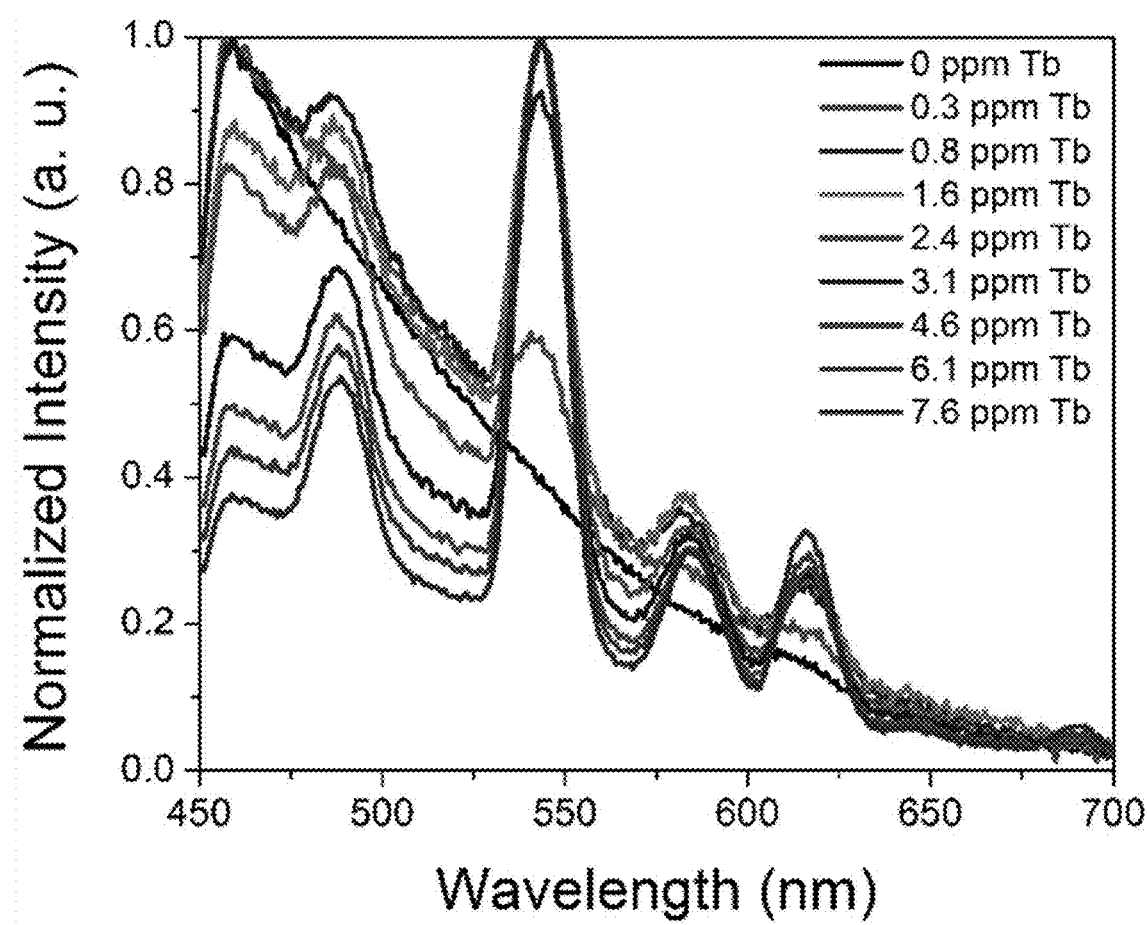
FIG. 15C is normalized emission spectra of BTC-1 as a function of increasing Tb concentration after drying, in accordance with the features of the present invention.
Figure 15D:
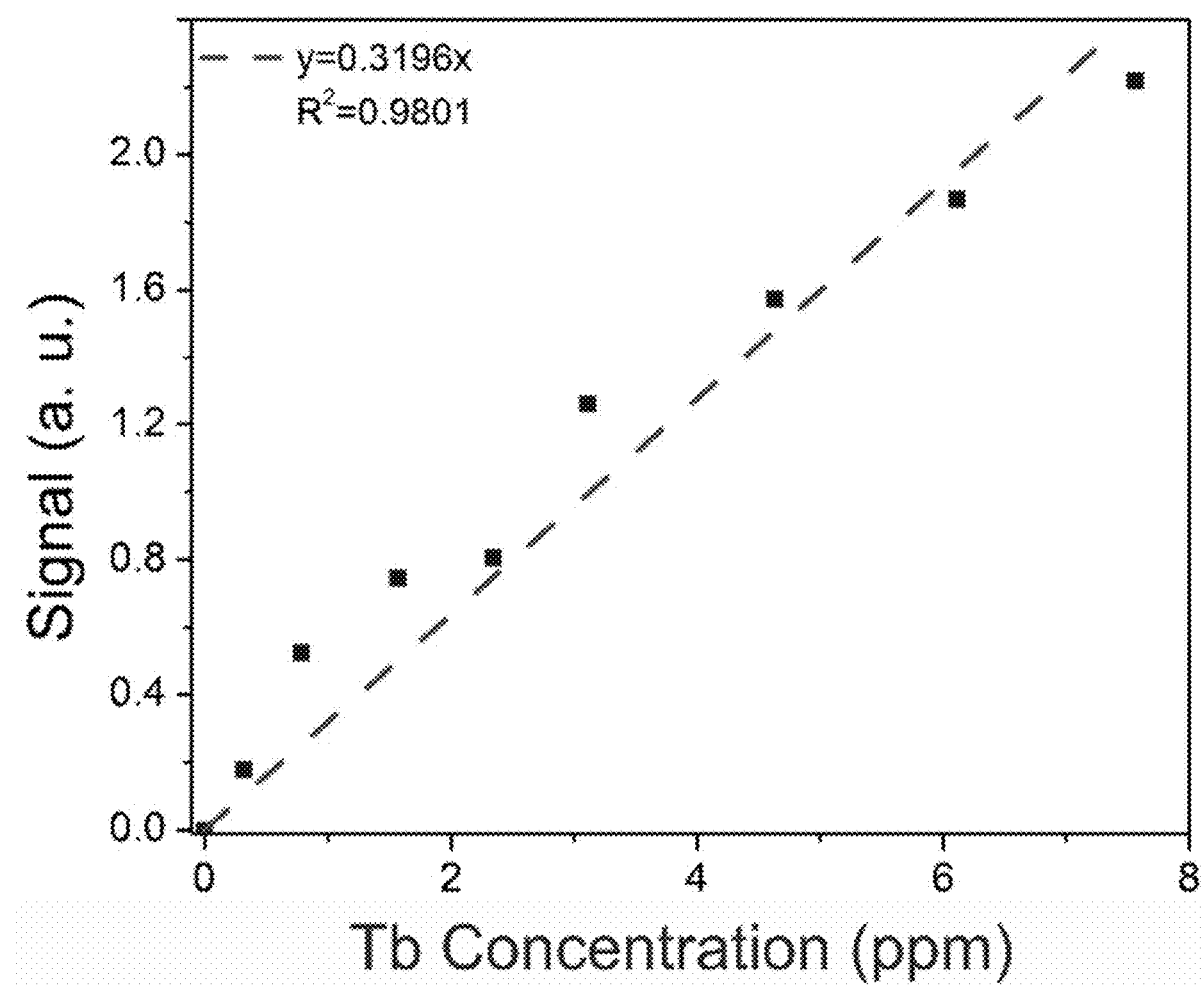
FIG. 15D is a corresponding calibration curve to FIG. 15C for limit of detection analysis of BTC-1 as a function of increasing Tb concentration after drying, Signal corresponds to the intensity ratio ($I_{543}/I_{453}$) at each data point with the ($I_{543}/I_{453}$) of the MOF alone subtracted, in accordance with the features of the present invention.
Figure 16A:
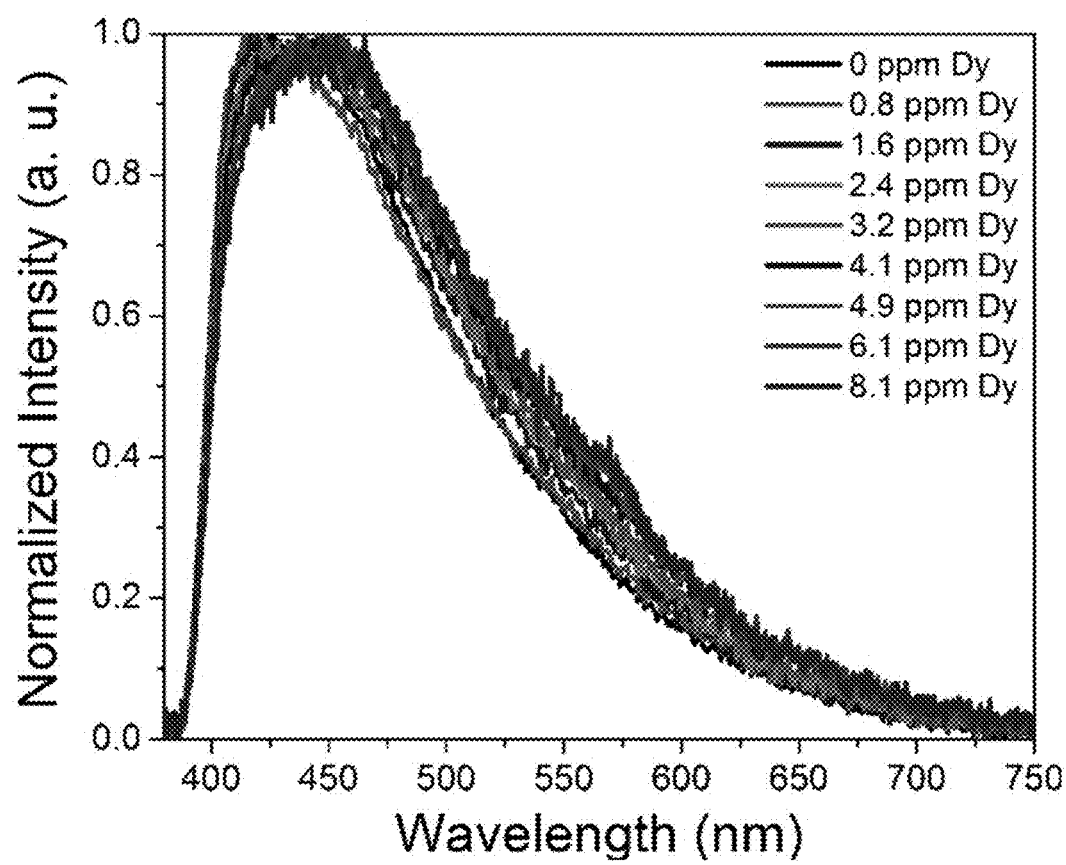
FIG. 16A is normalized emission spectra of BTC-1 as a function of increasing Dy concentration in solution, in accordance with the features of the present invention.
Figure 16B:
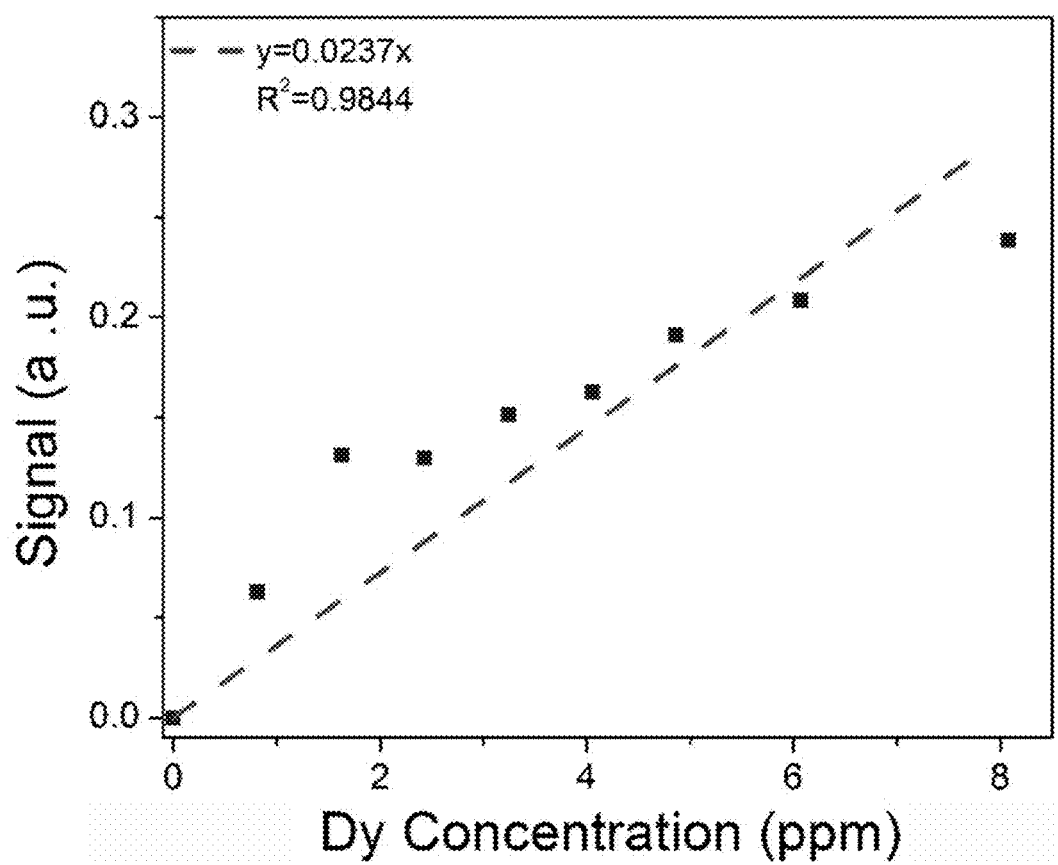
FIG. 16B is a corresponding calibration curve to FIG. 16A for limit of detection analysis of BTC-1 as a function of increasing Dy concentration in solution, where Signal corresponds to the intensity ratio ($I_{573}/I_{453}$) at each data point with the ($I_{573}/I_{453}$) of the MOF alone subtracted, in accordance with the features of the present invention.
Figure 16C:
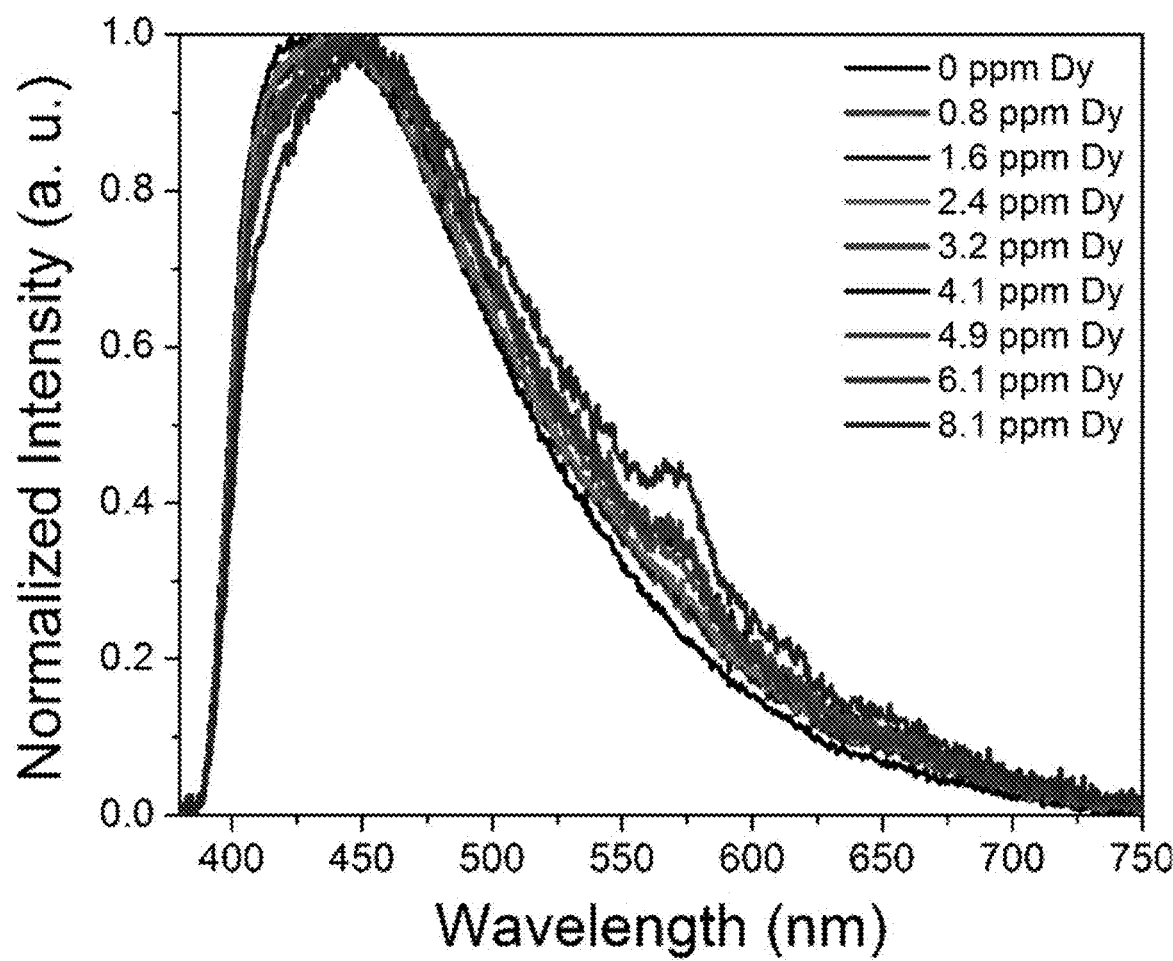
FIG. 16C is normalized emission spectra of BTC-1 as a function of increasing Dy concentration after drying, in accordance with the features of the present invention.
Figure 16D:
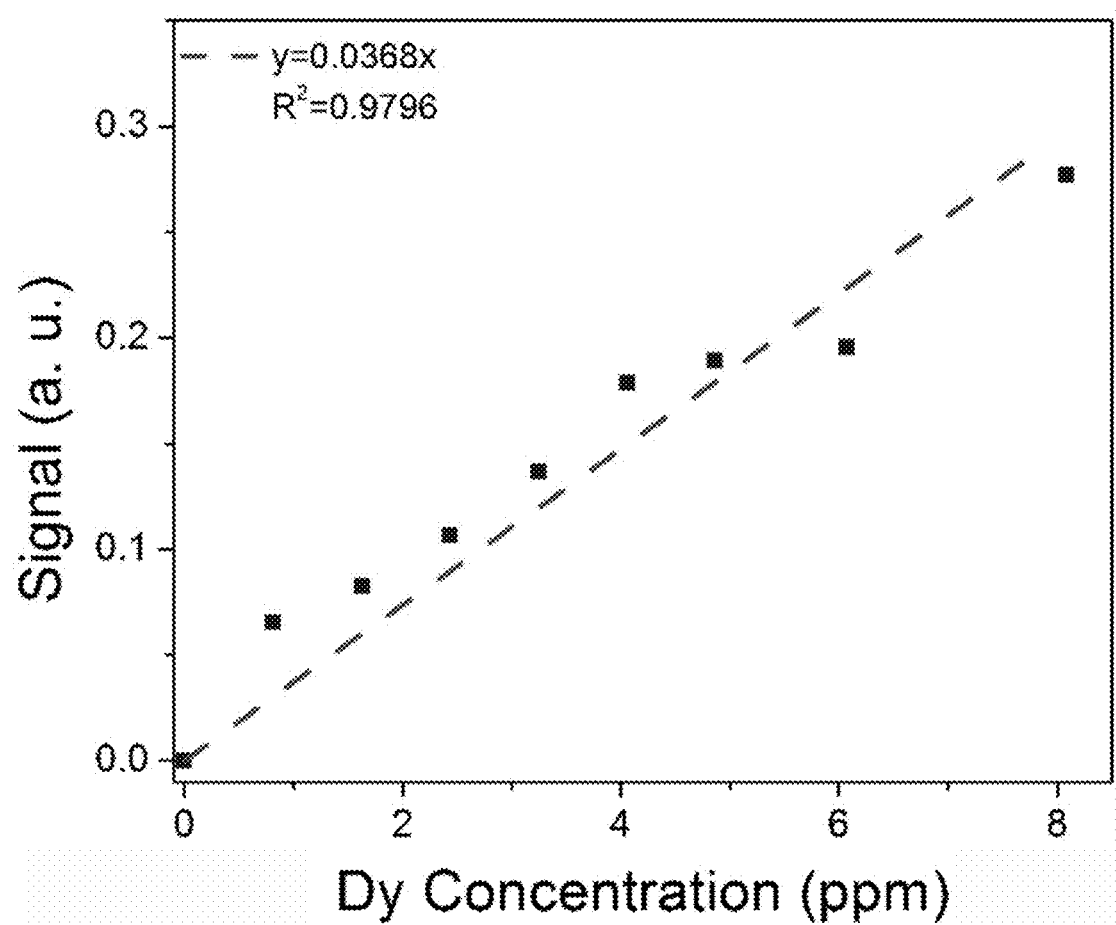
FIG. 16D is a corresponding calibration curve to FIG. 16C for limit of detection analysis of BTC-1 as a function of increasing Dy concentration after drying, Signal corresponds to the intensity ratio ($I_{573}/I_{453}$) at each data point with the ($I_{573}/I_{453}$) of the MOF alone subtracted, in accordance with the features of the present invention.
Figure 17A:
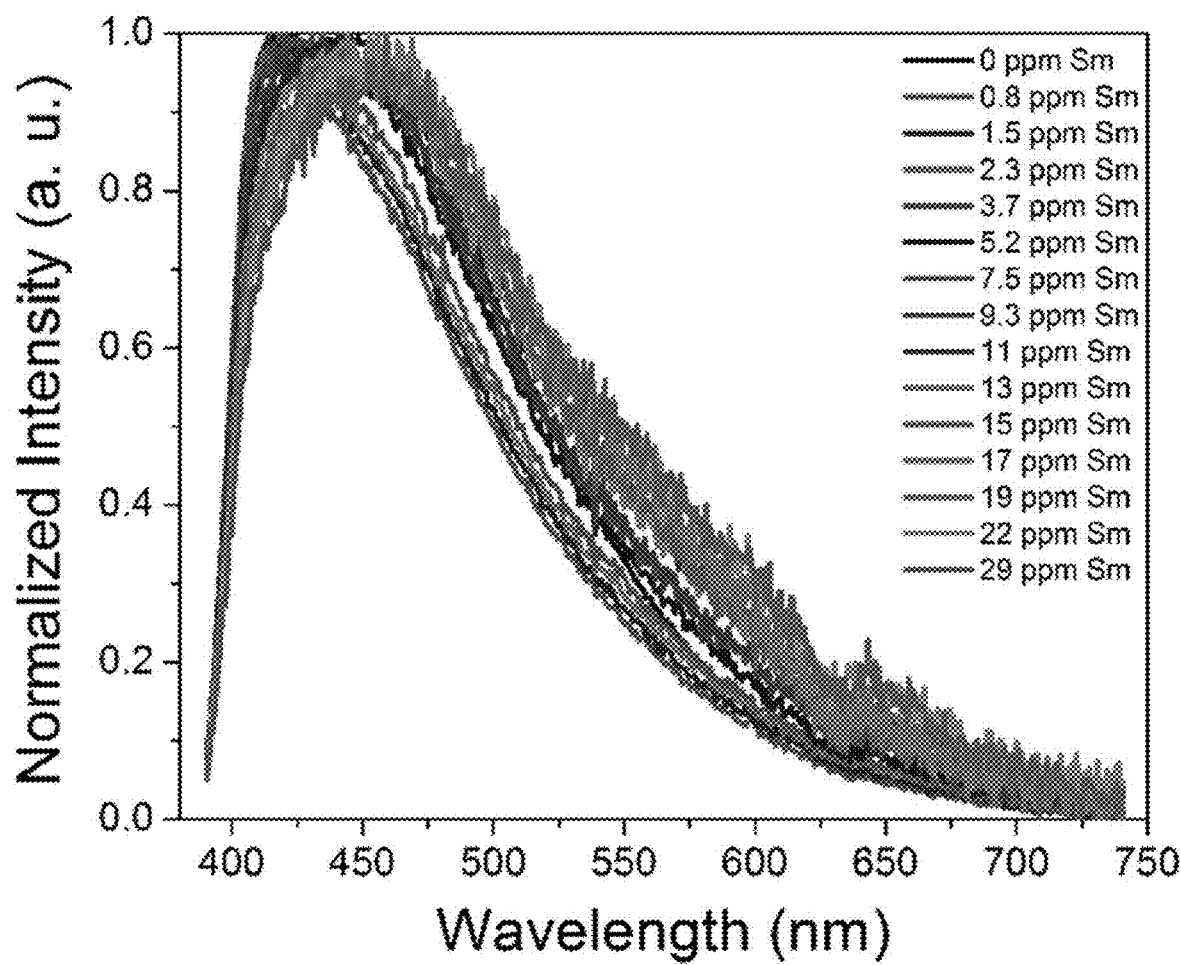
FIG. 17A is normalized emission spectra of BTC-1 as a function of increasing Sm concentration in solution, in accordance with the features of the present invention.
Figure 17B:
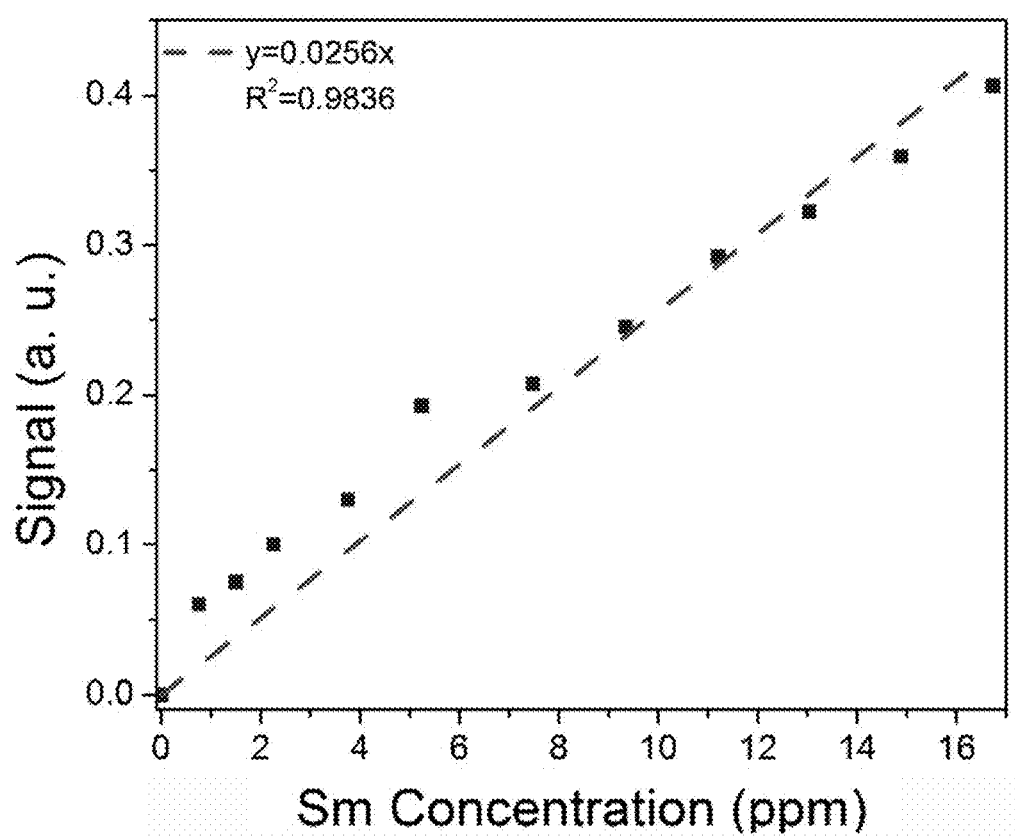
FIG. 17B is a corresponding calibration curve to FIG. 17A for limit of detection analysis of BTC-1 as a function of increasing Sm concentration in solution, where Signal corresponds to the intensity ratio ($I_{597}/I_{453}$) at each data point with the ($I_{597}/I_{453}$) of the MOF alone subtracted, in accordance with the features of the present invention.
Figure 17C:
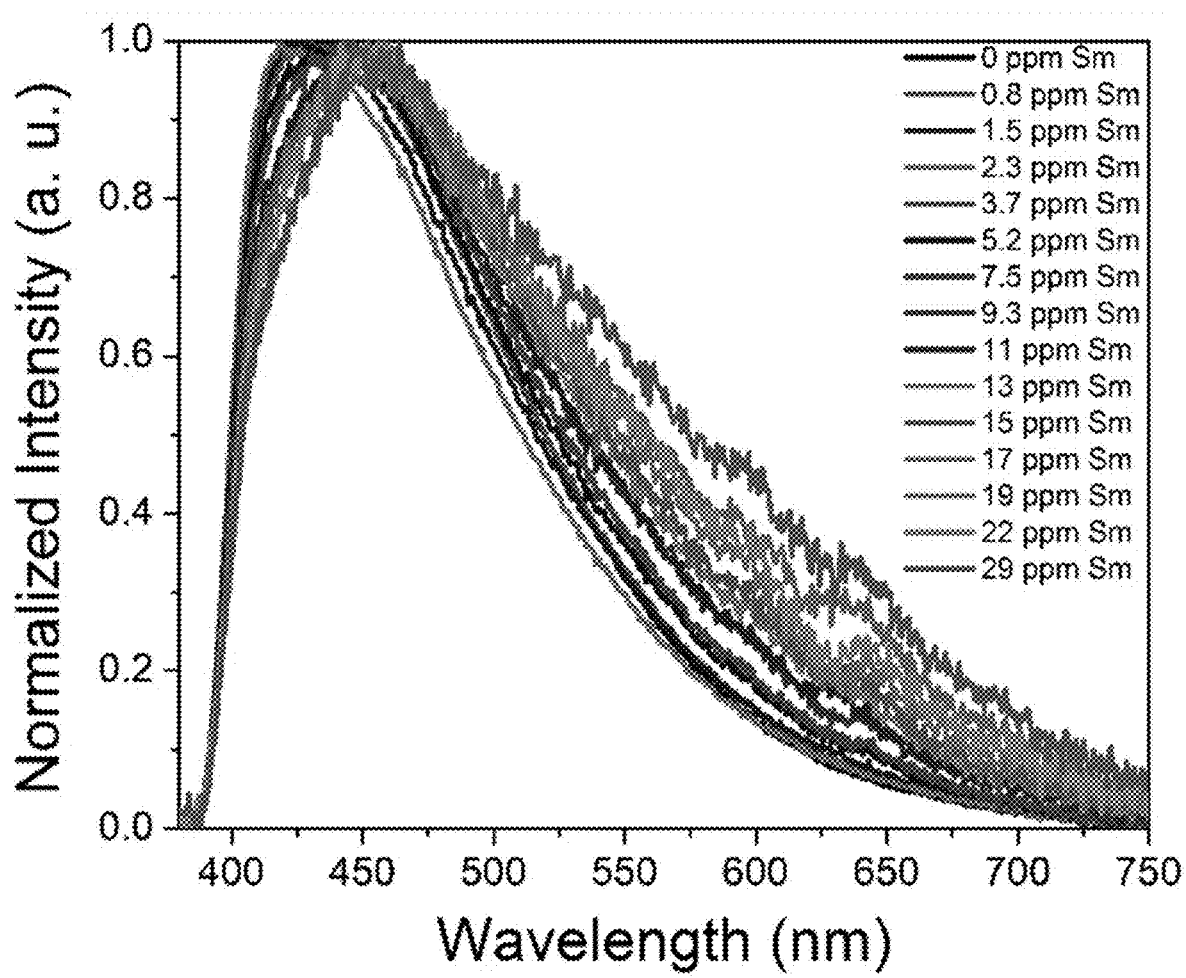
FIG. 17C is normalized emission spectra of BTC-1 as a function of increasing Sm concentration after drying, in accordance with the features of the present invention.
Figure 17D:
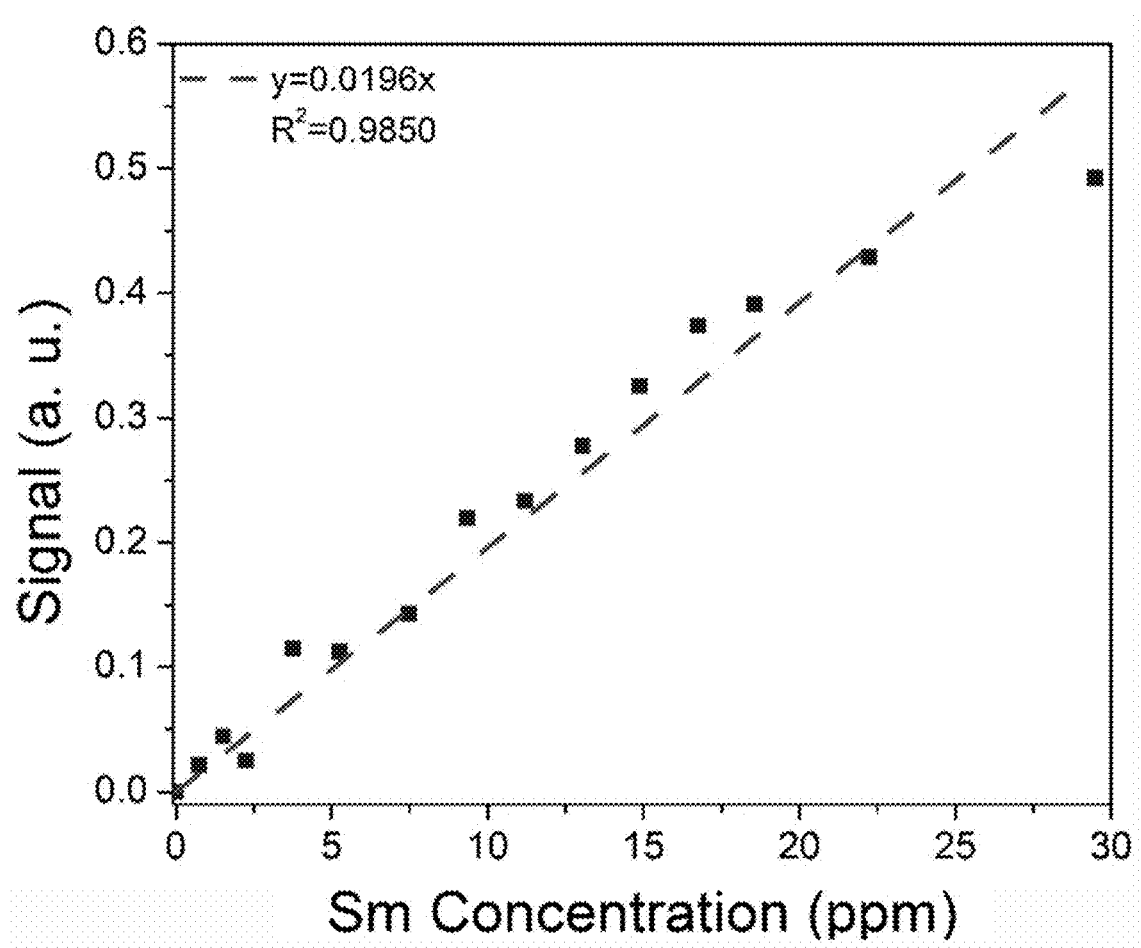
FIG. 17D is a corresponding calibration curve to FIG. 17C for limit of detection analysis of BTC-1 as a function of increasing Sm concentration after drying, Signal corresponds to the intensity ratio ($I_{597}/I_{453}$) at each data point with the ($I_{597}/I_{453}$) of the MOF alone subtracted, in accordance with the features of the present invention.
Figure 18A:
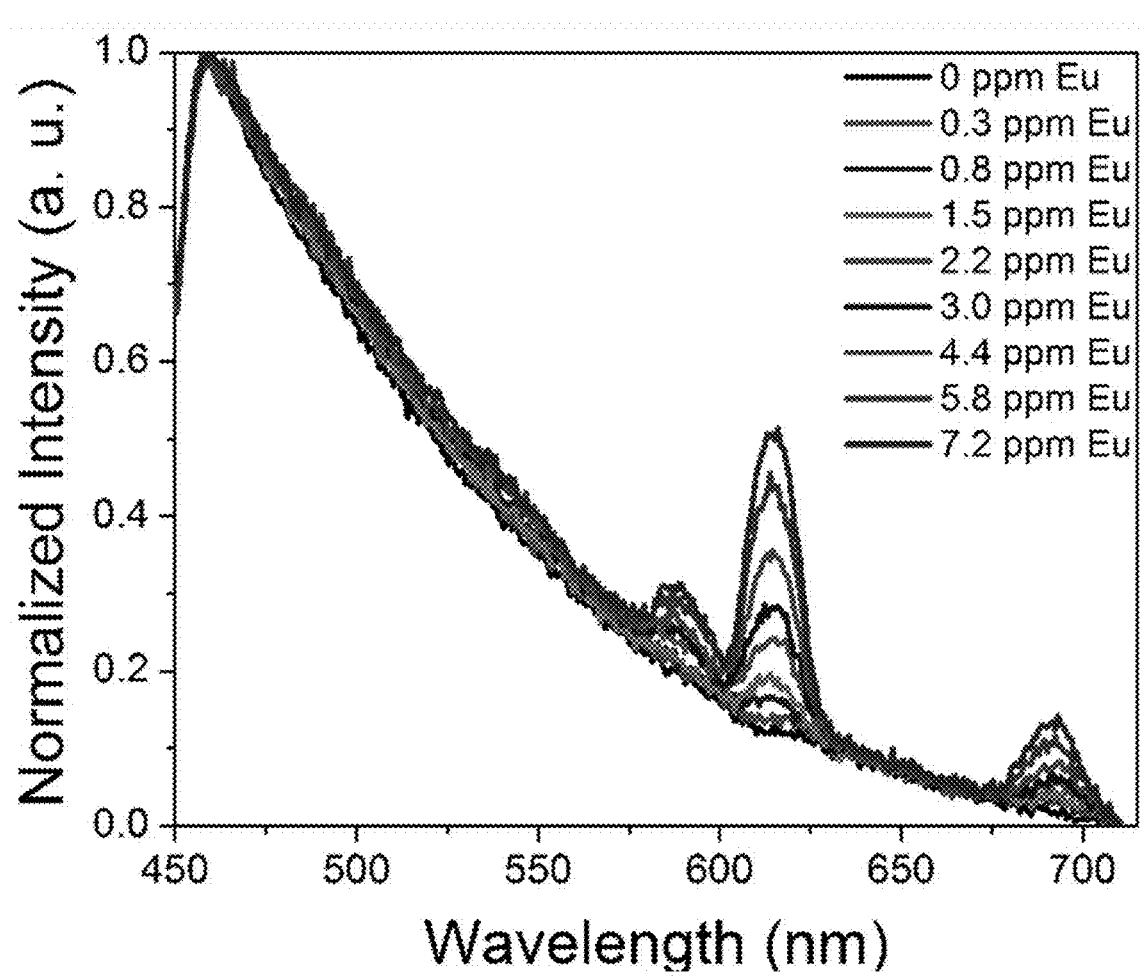
FIG. 18A is normalized emission spectra of BTC-1 as a function of increasing Sm concentration in solution, in accordance with the features of the present invention.
Figure 18B:
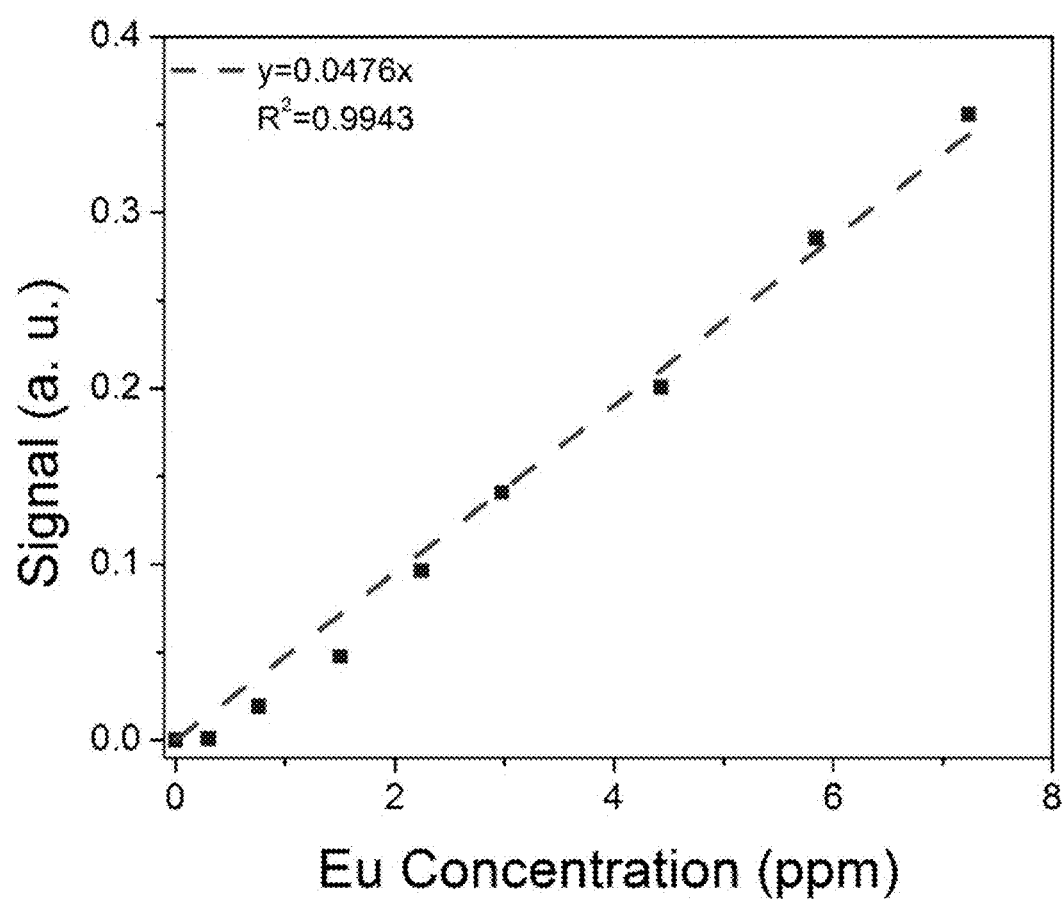
FIG. 18B is a corresponding calibration curve to FIG. 18A for limit of detection analysis of BTC-1 as a function of increasing Sm concentration in solution, where Signal corresponds to the intensity ratio ($I_{613}/I_{453}$) at each data point with the ($I_{613}/I_{453}$) of the MOF alone subtracted, in accordance with the features of the present invention.
Figure 18C:
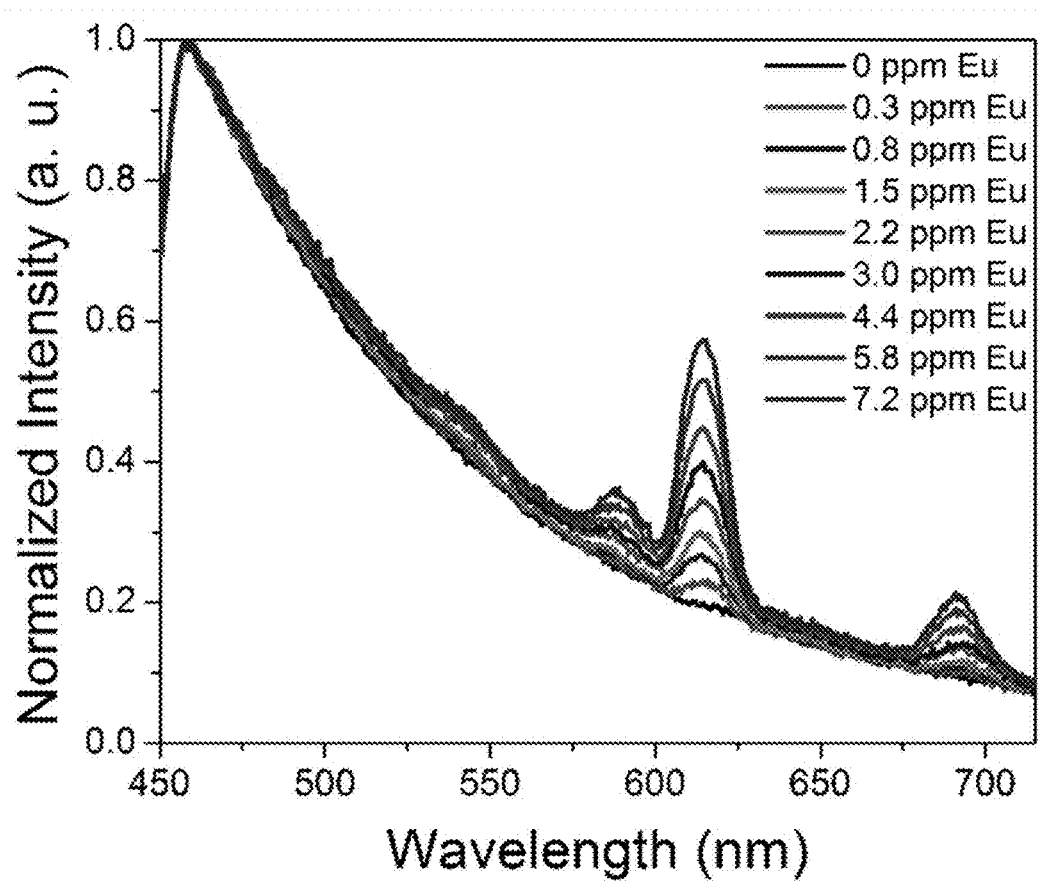
FIG. 18C is normalized emission spectra of BTC-1 as a function of increasing Sm concentration after drying, in accordance with the features of the present invention.
Figure 18D:
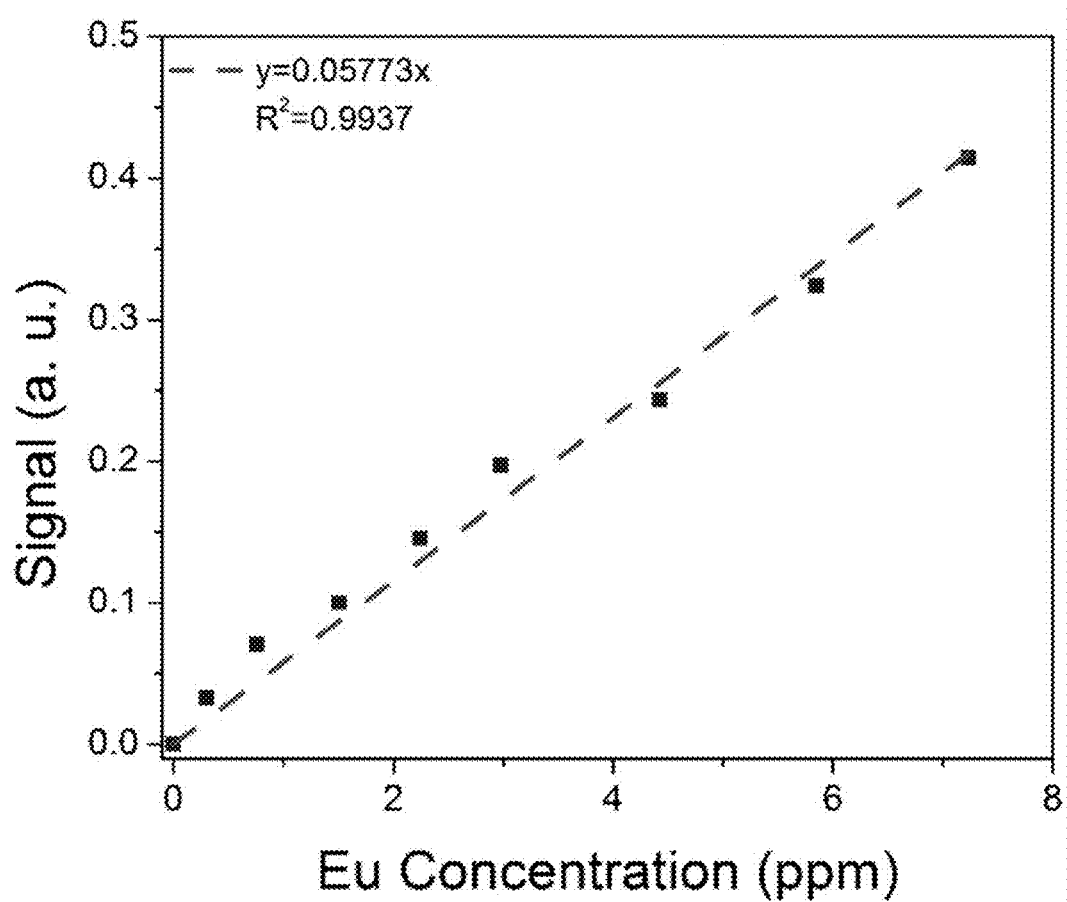
FIG. 18D is a corresponding calibration curve to FIG. 18C for limit of detection analysis of BTC-1 as a function of increasing Sm concentration after drying, Signal corresponds to the intensity ratio ($I_{613}/I_{453}$) at each data point with the ($I_{613}/I_{453}$) of the MOF alone subtracted, in accordance with the features of the present invention.

Abbreviations:
Ad = adenine,
DMA = dimethylammonium,
DMF = Dimethylformamide,
BTC = 1,3,5-benzenetricarboxylate An X-ray diffraction (XRD) pattern of the BTC powder was collected using a Malvern Panalytical Empyrean X-ray diffractometer operating with Cu kα radiation (0.1542 nm) operating at 45 kV and 40 mA. The sample was scanned from a 2 theta range of 10 degrees to 40 degrees. XRD of BTC-1 is shown in FIG. 14.

Scanning Electron Microscopy (SEM) characterization was performed using a FEI Quanta 600 F field emission scanning electron microscope operated at 20 kV at a 10 mm working distance.

A sol-gel method was used to coat the solarization resistant silica fiber tip of the exemplary REE sensor with metal-organic framework material. Approximately a 5-inch piece of UV-compatible fiber optic cable (FG910UEC, Thorlabs) was carefully cleaved. A few cm of the polymer jacket was removed on both tips of the fiber. One tip of the fiber was first treated for 10 minutes by placing the end into a vial of 1 M hydrochloric acid. Meanwhile, in a 2 mL vial, 220 µL of TEOS and 180 µL of methanol were combined. After 10 minutes, 40 µL of 1M hydrochloric acid was added, and this mixture sat for an additional ten minutes. The optical fiber tip was then placed in the TEOS solution for 15 minutes, was then quickly and directly pressed into metal-organic framework powder and was then held 2 inches away from a heat gun set to 700° C., where it was annealed for 30 seconds. The tip was rinsed gently with water to remove excess and poorly attached metal-organic framework material, followed by drying under nitrogen. The metal-organic framework material-coated tip (FIG. 1B) was characterized using an optical microscope (FIG. 4) and scanning electron microscopy (FIG. 5).

During luminescent studies, at least 5 mL of liquid sample was added to an amber vial. The optical fiber tip was placed into the REE-containing solution and monitored until the emission signal stabilized (typically within 3 minutes). After the measurement was recorded, the fiber tip was removed and dried for 1 minute under nitrogen gas. The tip was then placed into an empty amber vial and the signal was re-recorded. For limit of detection studies, emission was first recorded in water and then after nitrogen drying. Then, various concentrations of different REEs were added, and the emission properties at each concentration level were recorded under wet and dry conditions. At least 7 data points were collected at each concentration level, and at least 7 different concentration samples were measured. For each measurement, the ratio of the most intense REE peak (for example, 545 nm for Tb) versus the ratio of the MOF peak at 456 nm was taken, and the data points for each concentration level were averaged. The standard deviation at the intensity ratio at the lowest REE concentration tested(s) was used for noise estimation, and sensitivity was estimated by recording the slope (m) of a calibration curve of average signal (e.g., average intensity ratio at each REE concentration level minus the average intensity ratio of the 0 ppm REE measurement) versus the REE concentration, with the slope forced through 0. At least three independent trials were used for all limit of detection experiments. Limits of detection (LOD) were estimated using Equation 1:

$$LOD = \frac{3*s}{m} \qquad (1)$$

Limits of quantification (LOQ) were estimated using Equation 2:

$$LOQ = \frac{10*s}{m} \qquad (2)$$

Figure 7:
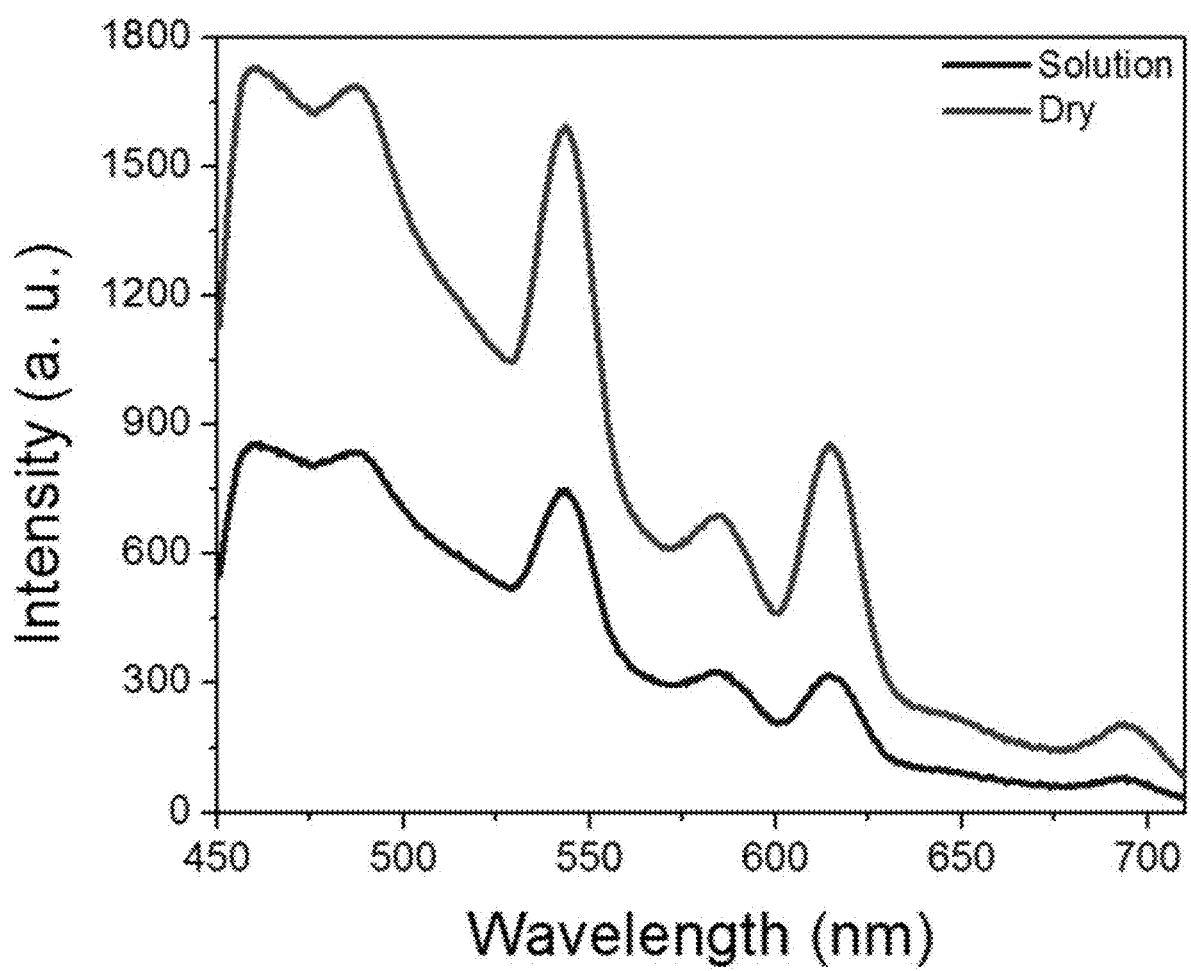
FIG. 7 is normalized emission spectra of a BTC-3 MOF-coated optical fiber tip in the presence of 1.6 ppm Eu and Tb in solution (blue) and after drying (red), demonstrating that drying significantly enhances the emission signal from the REEs, in accordance with the features of the present invention.
Figure 8A:
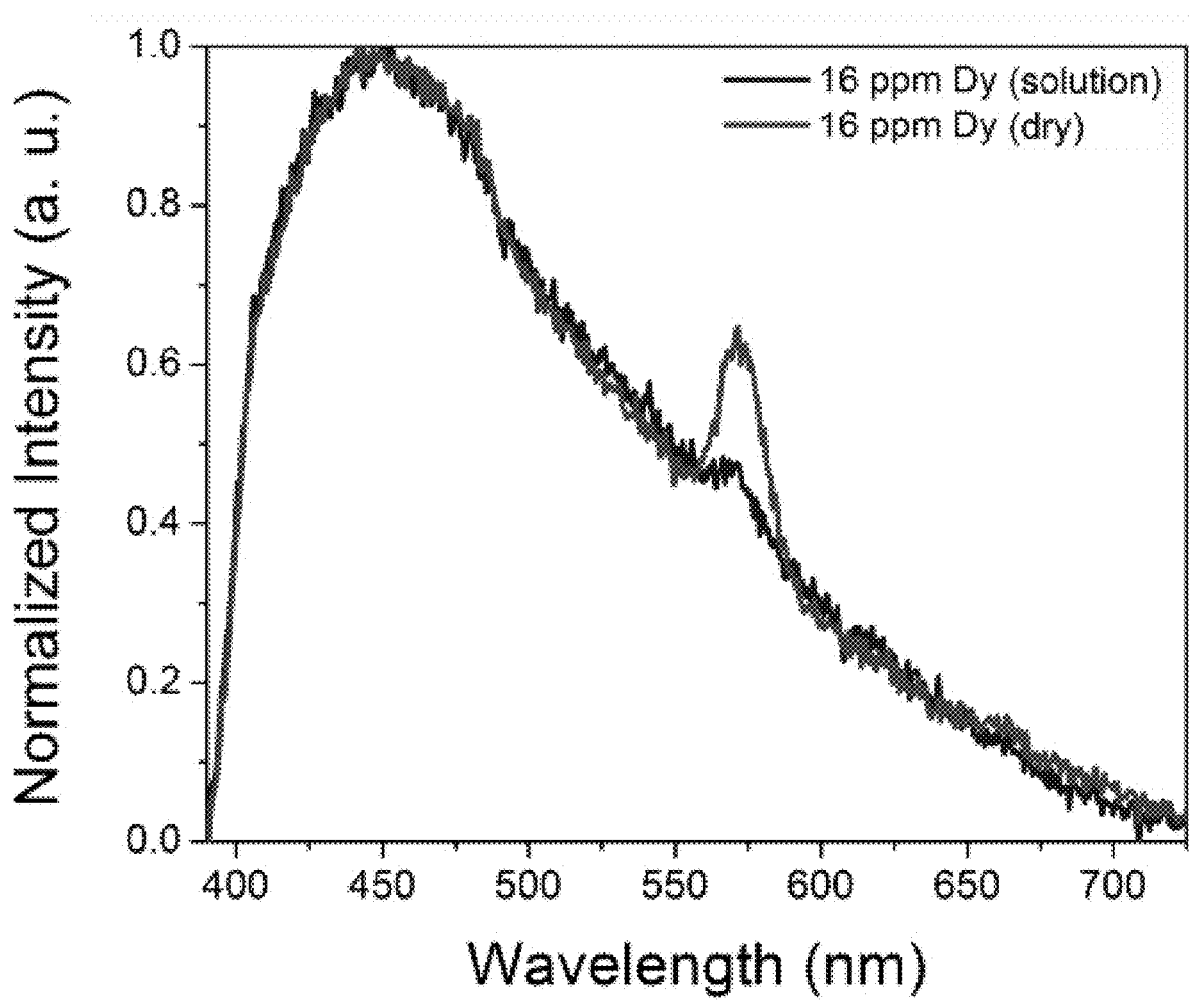
FIG. 8A is normalized emission spectra of a BTC-1 MOF-coated optical fiber tip in the presence of 16 ppm Dy in solution versus after drying, demonstrating that drying significantly enhances the emission signal from the REEs, in accordance with the features of the present invention.
Figure 8B:
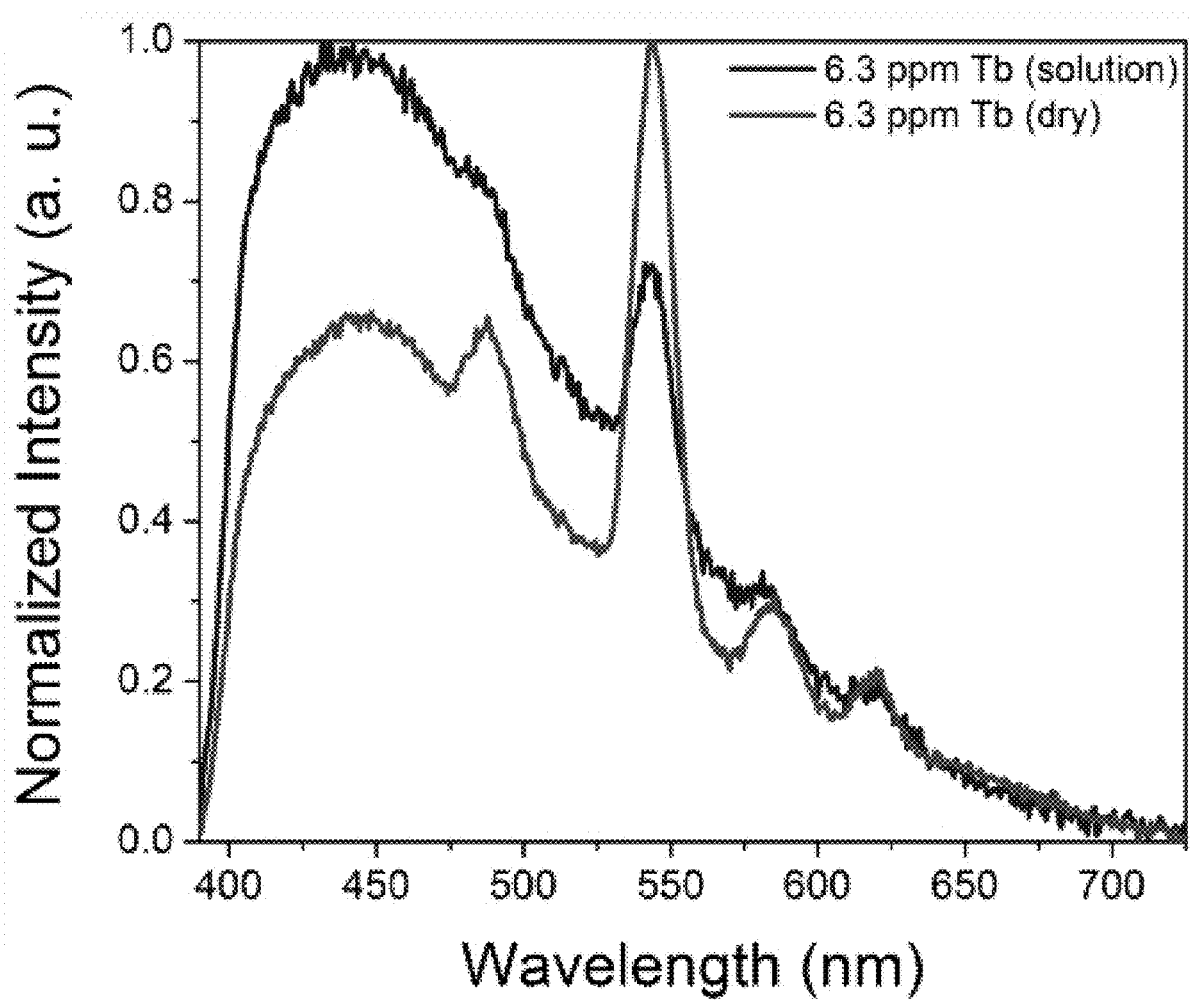
FIG. 8B is normalized emission spectra of a BTC-1 MOF-coated optical fiber tip in the presence of 15 ppm Sm in solution versus after drying, demonstrating that drying significantly enhances the emission signal from the REEs, in accordance with the features of the present invention.
Figure 8C:
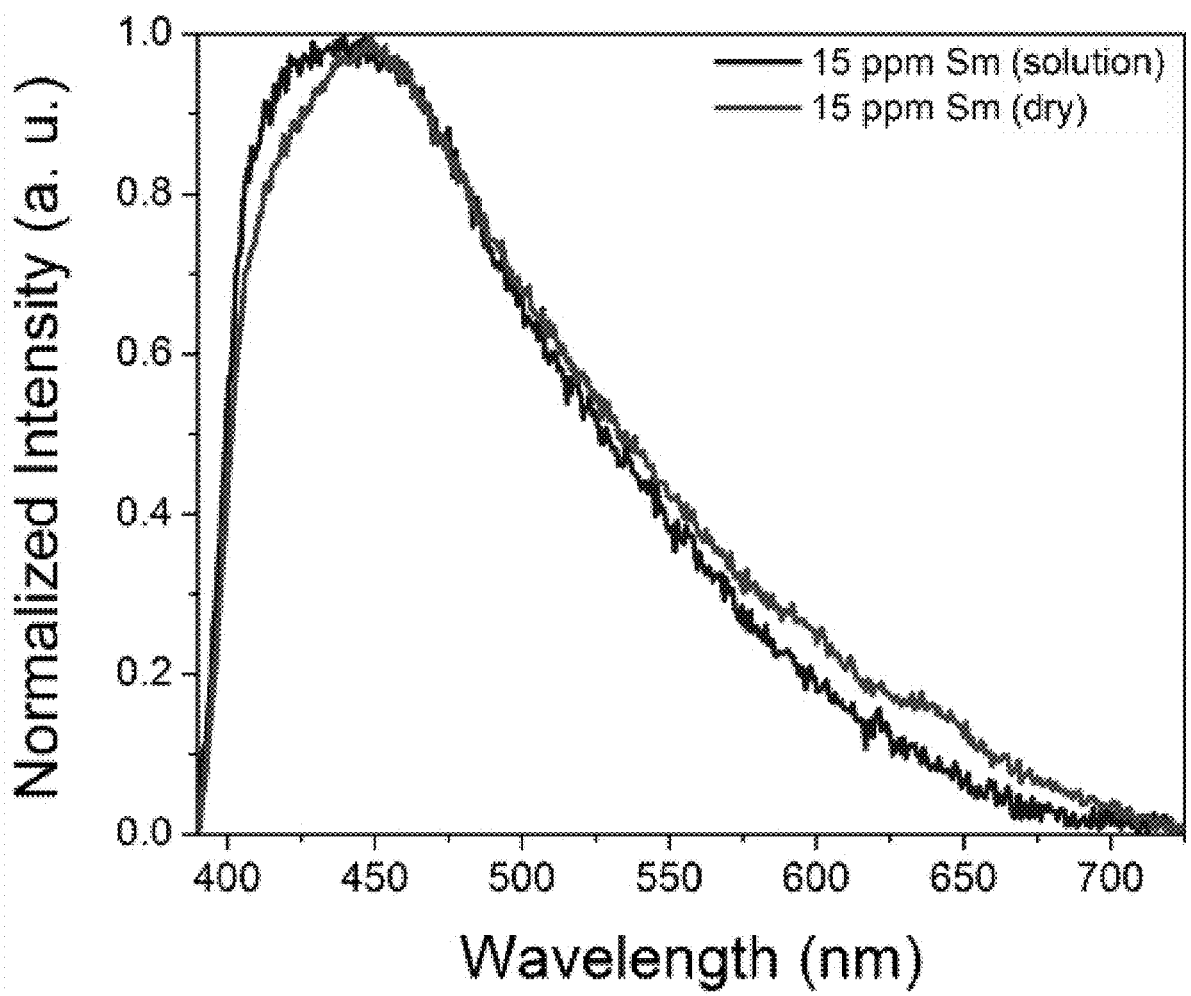
FIG. 8C is normalized emission spectra of a BTC-1 MOF-coated optical fiber tip in the presence of 15 ppm Sm in solution versus after drying, demonstrating that drying significantly enhances the emission signal from the REEs, in accordance with the features of the present invention.
Figure 8D:
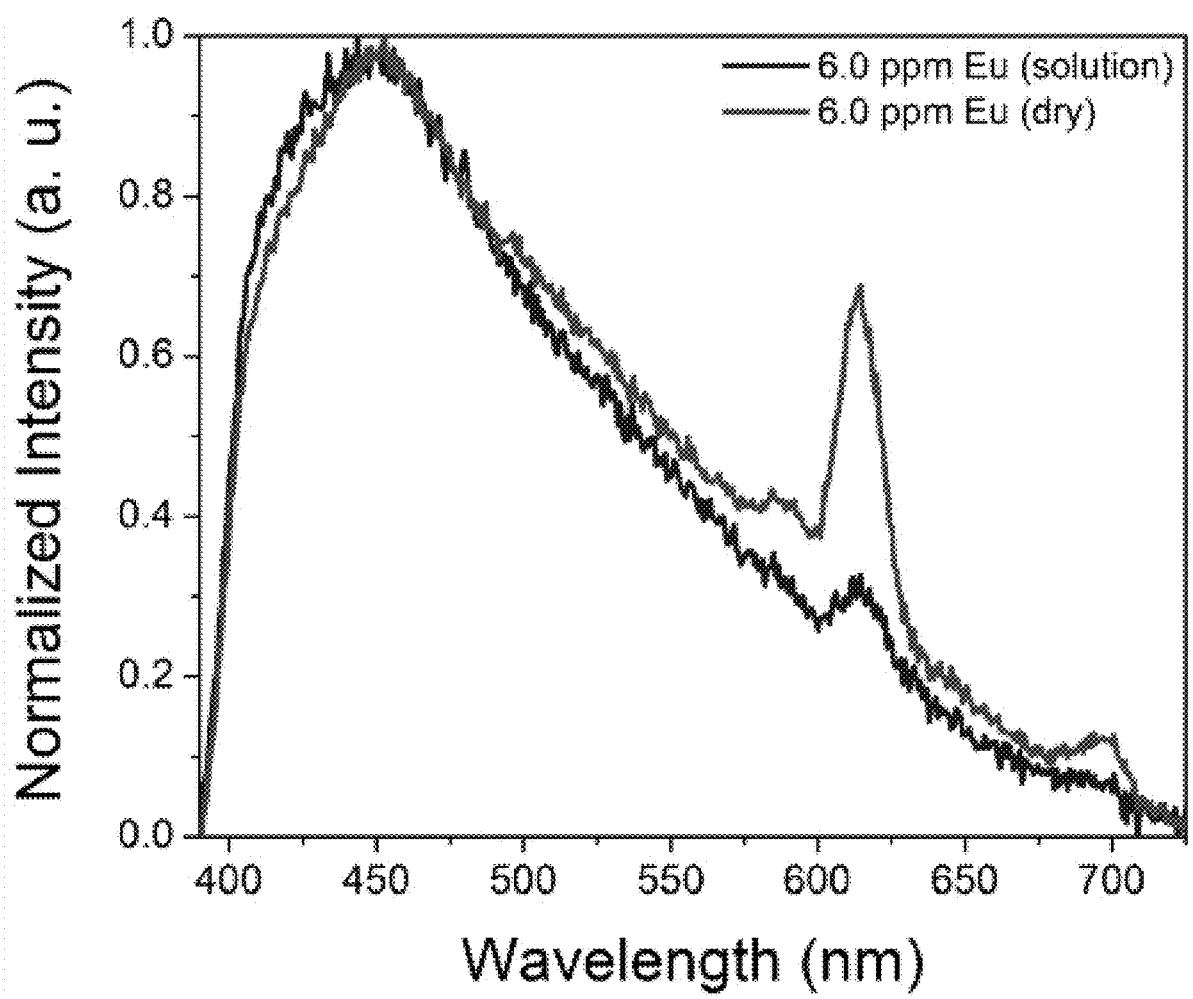
FIG. 8D is normalized emission spectra of a BTC-1 MOF-coated optical fiber tip in the presence of 6 ppm Eu in solution versus after drying, demonstrating that drying significantly enhances the emission signal from the REEs, in accordance with the features of the present invention.
Figure 9A:
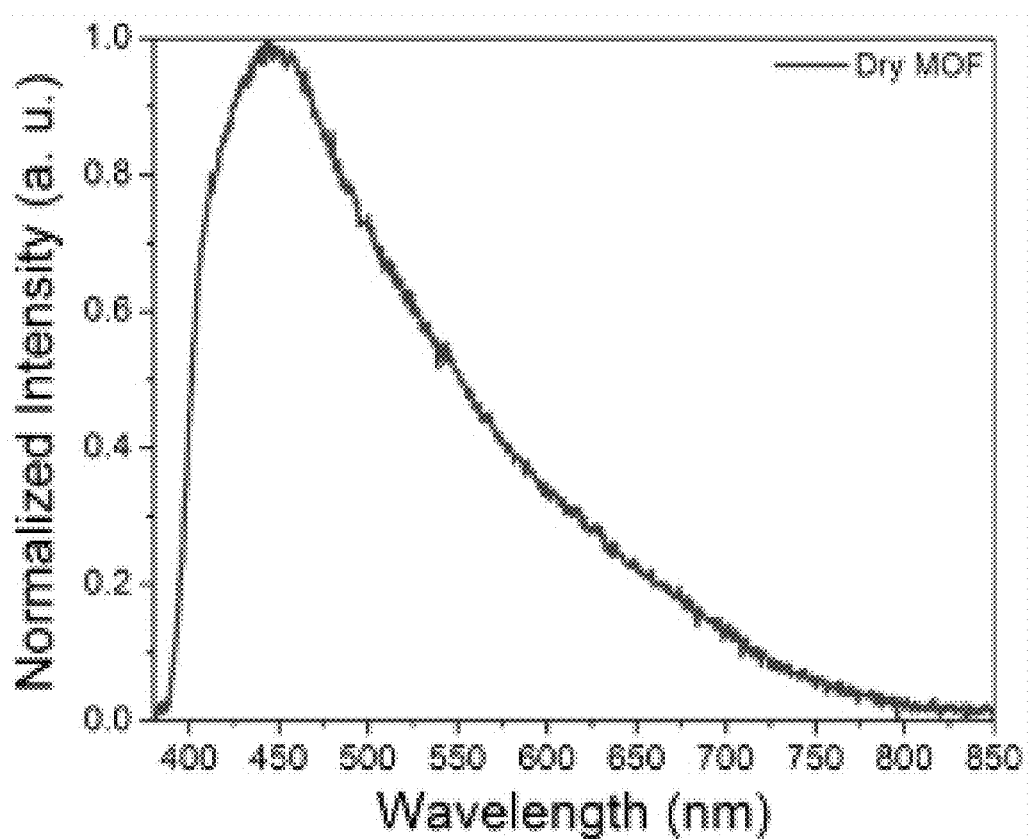
FIG. 9A is normalized emission spectra of a dry BTC-1 MOF-coated optical fiber tip, as part of a 5-sensing cycle experiment demonstrating regeneration of the REE sensor for reuse, wherein 0.5M hydrochloric acid is used in between each measurement in the presence of approximately 6 ppm Tb and Eu, restoring the original emission signal of the BTC-1 MOF, in accordance with the features of the present invention.
Figure 9B:
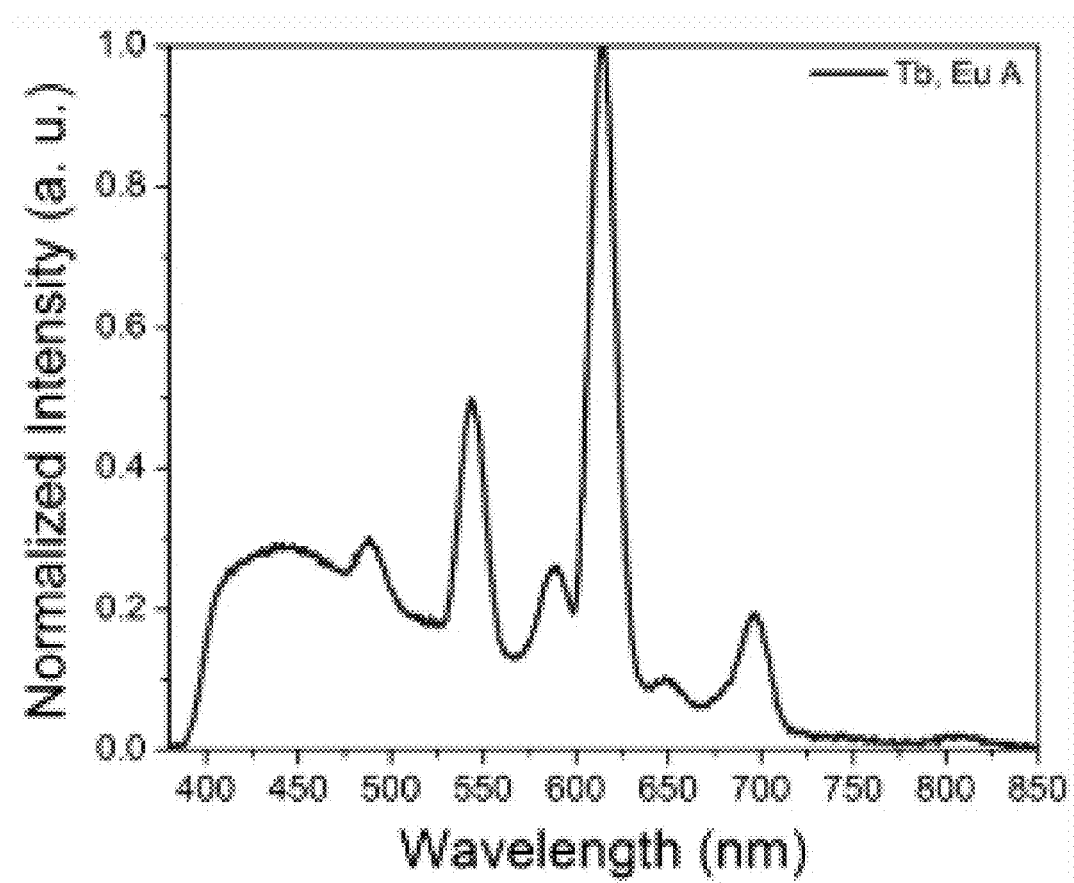
FIG. 9B is normalized emission spectra of a BTC-1 MOF-coated optical fiber tip in the presence of approximately 6 ppm Tb and Eu, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9C:
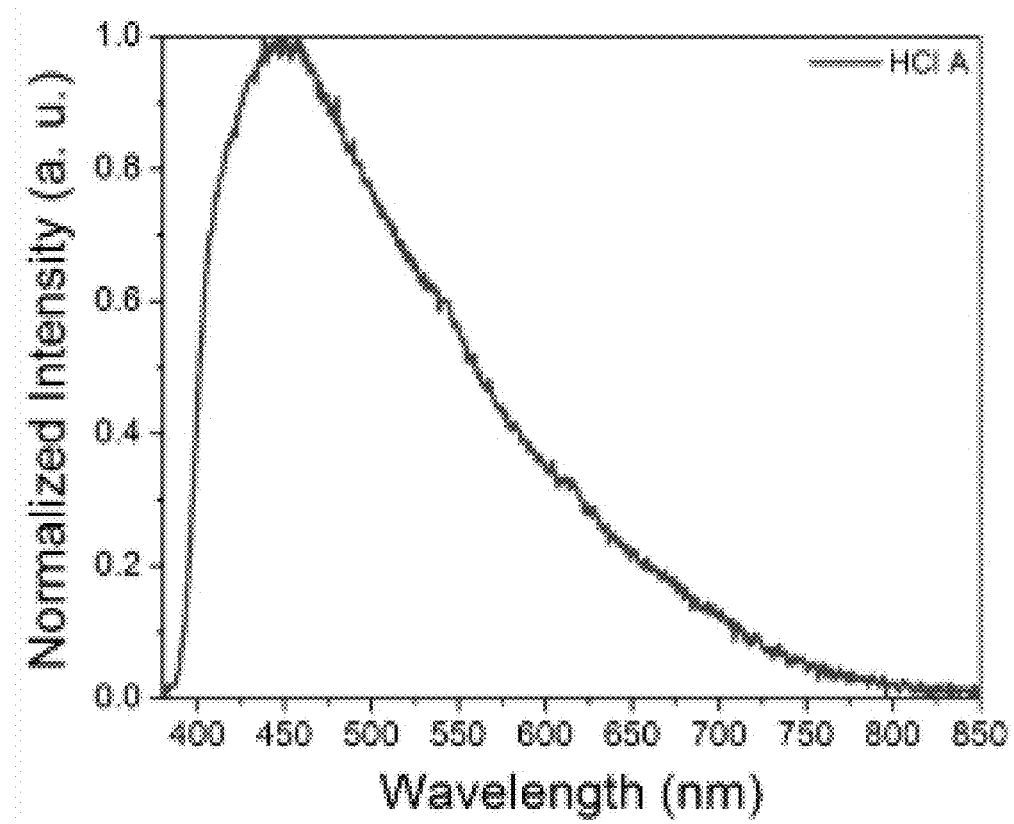
FIG. 9C is normalized emission spectra of a BTC-1 MOF-coated optical fiber tip after exposure to dilute hydrochloric acid, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9D:
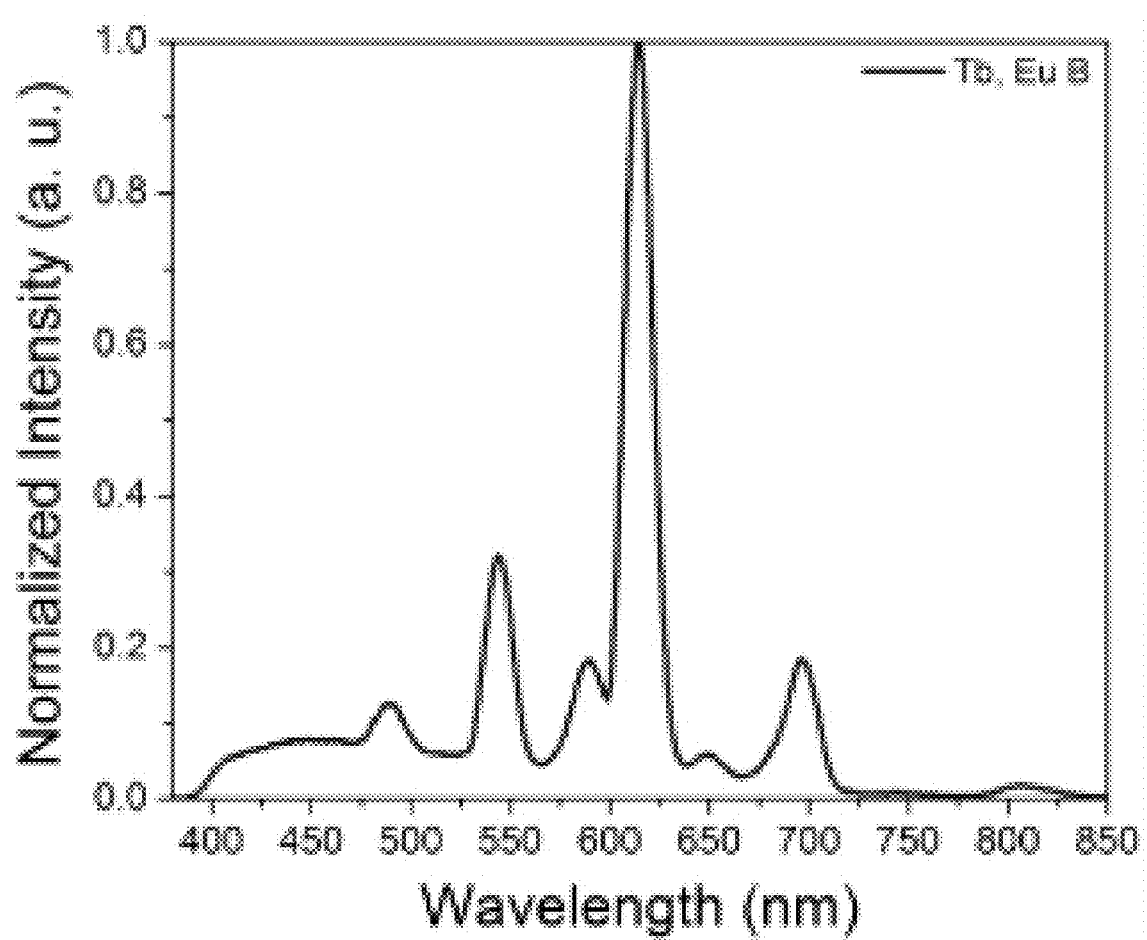
FIG. 9D is normalized emission spectra of a BTC-1 MOF-coated optical fiber tip in the presence of approximately 6 ppm Tb and Eu, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9E:
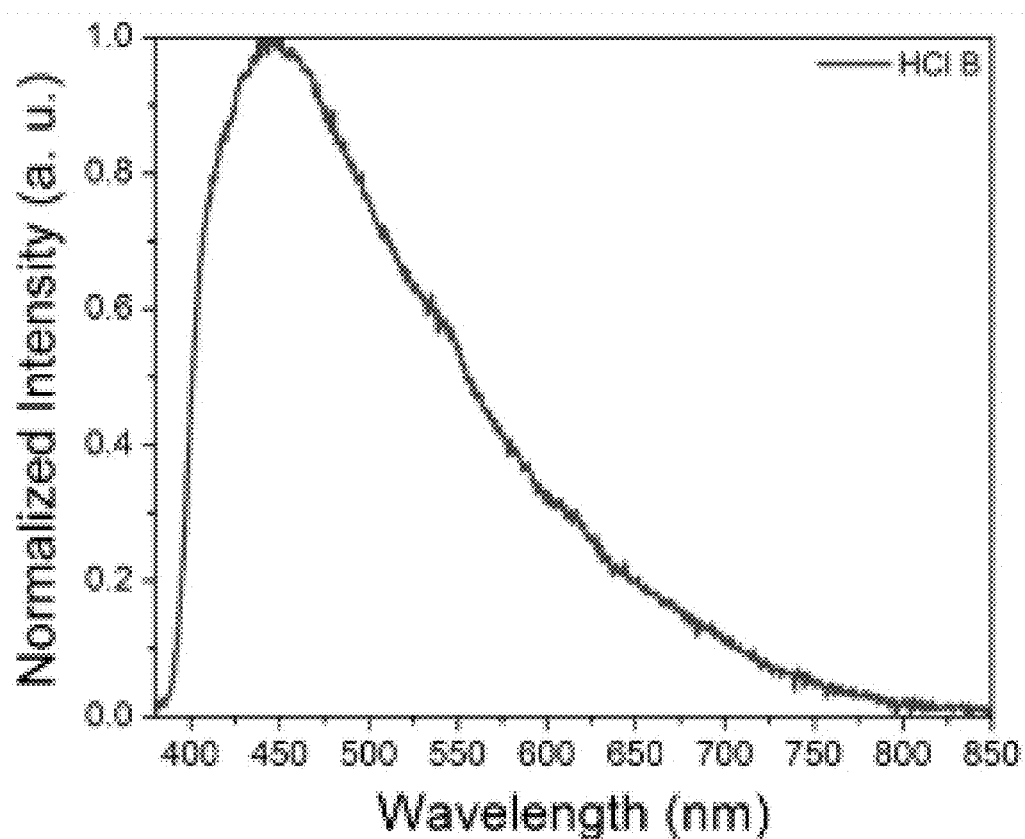
FIG. 9E is normalized emission spectra of a BTC-1 MOF-coated optical fiber tip after exposure to dilute hydrochloric acid, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9F:
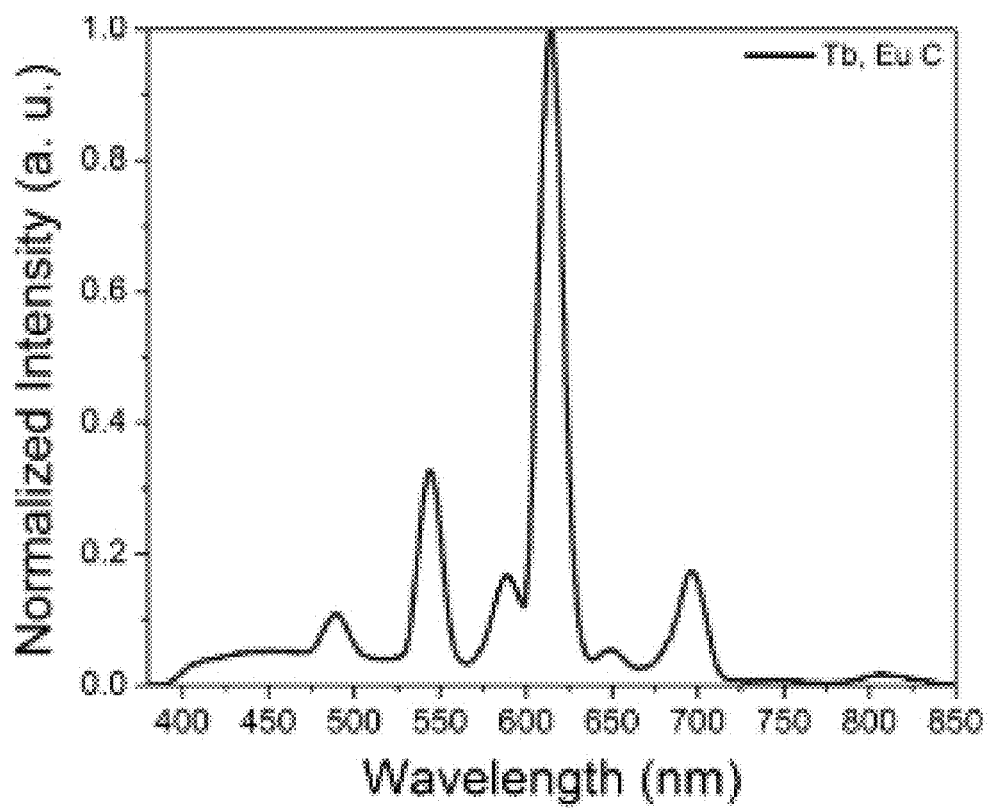
FIG. 9F is normalized emission spectra of a BTC-1 MOF-coated optical fiber tip in the presence of approximately 6 ppm Tb and Eu, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9G:
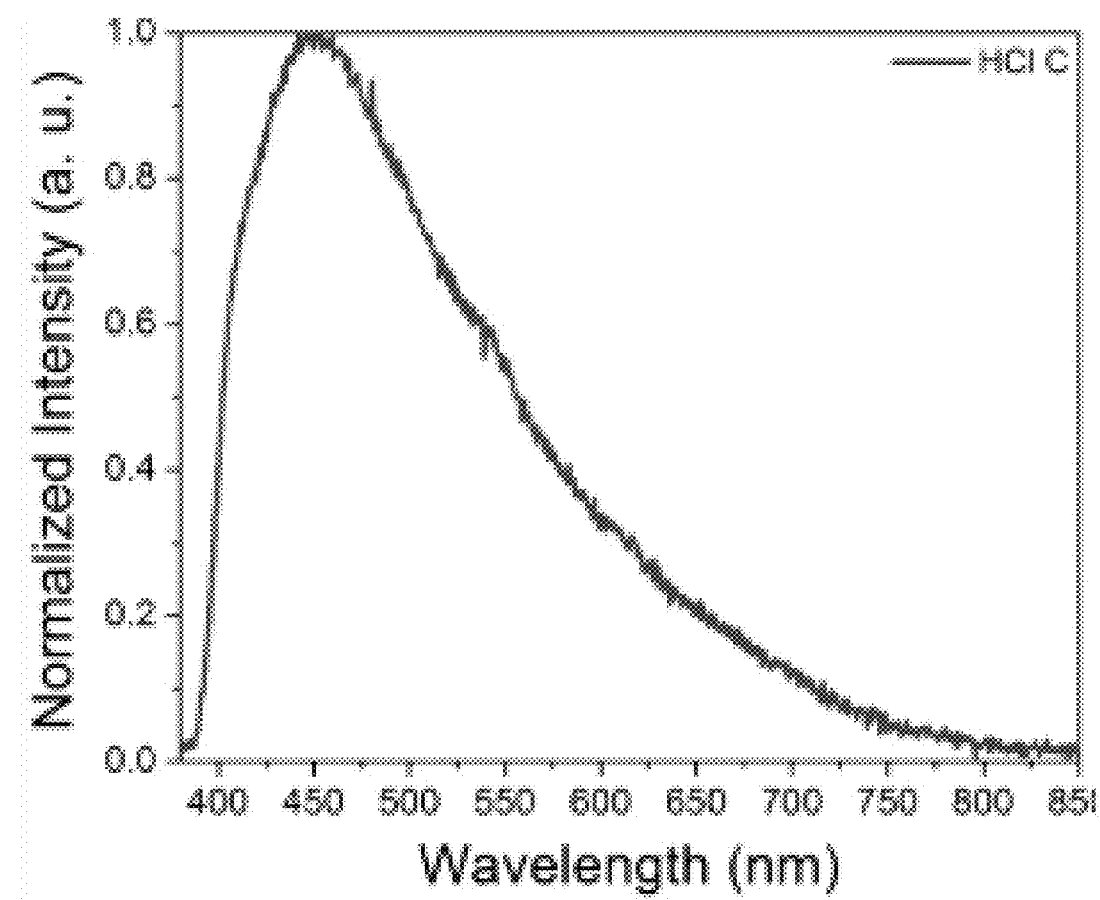
FIG. 9G is normalized emission spectra of a BTC-1 MOF-coated optical fiber tip after exposure to dilute hydrochloric acid, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9H:
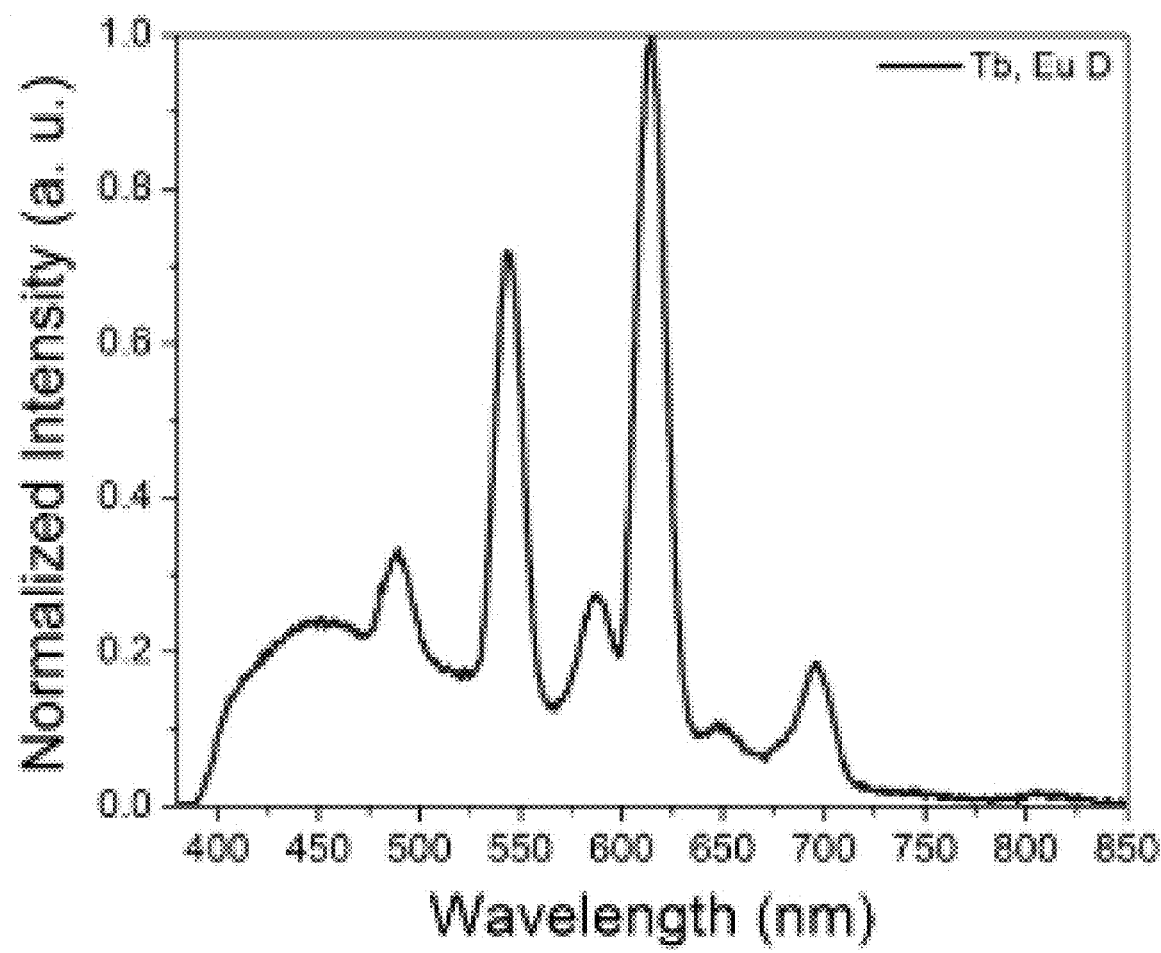
FIG. 9H is normalized emission spectra of a BTC-1 MOF-coated optical fiber tip in the presence of approximately 6 ppm Tb and Eu, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9I:
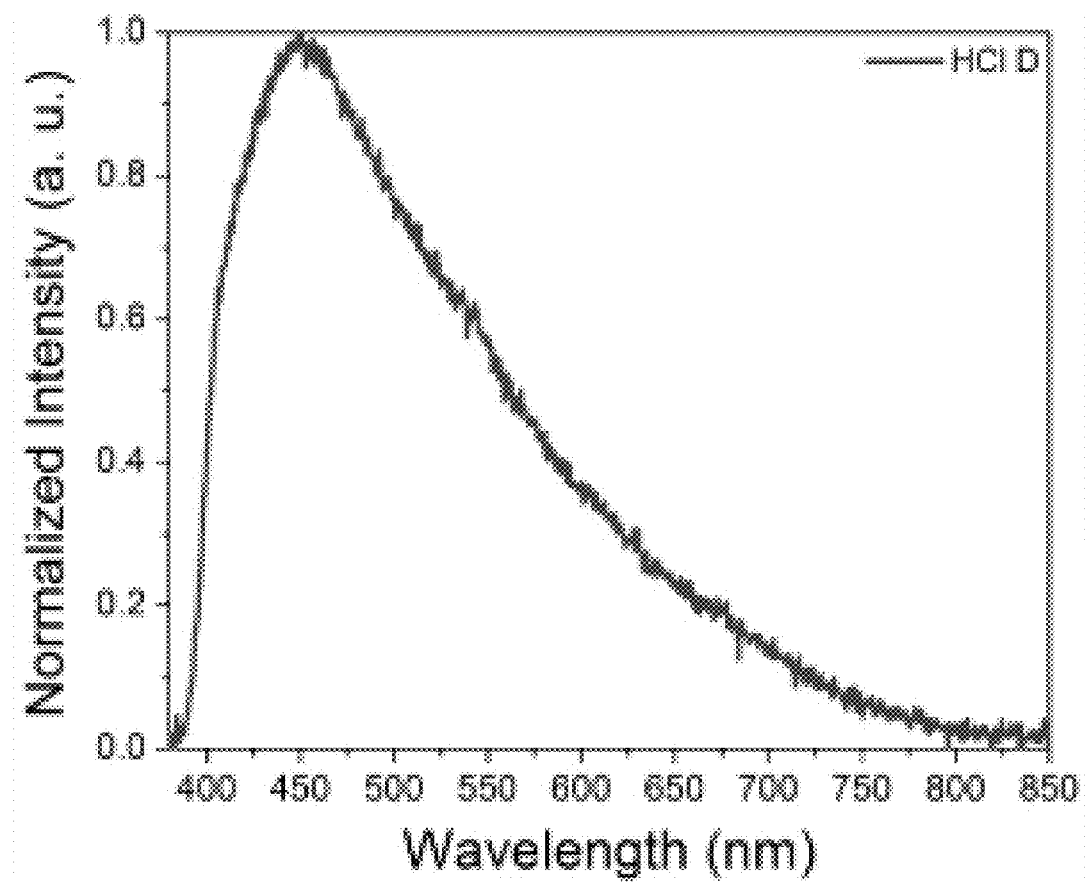
FIG. 9I is normalized emission spectra of a BTC-1 MOF-coated optical fiber tip after exposure to dilute hydrochloric acid, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.
Figure 9J:
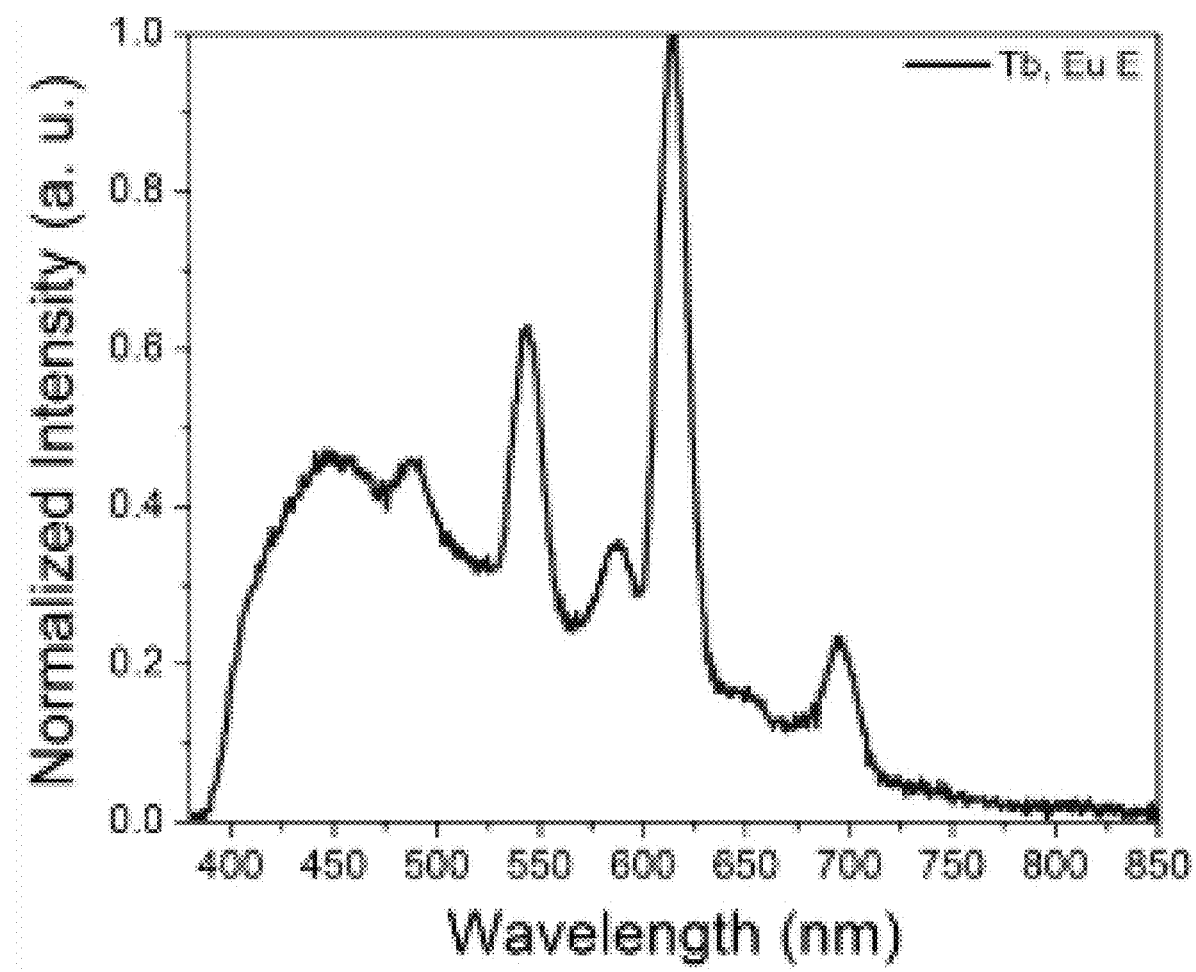
FIG. 9J is normalized emission spectra of a BTC-1 MOF-coated optical fiber tip in the presence of approximately 6 ppm Tb and Eu, as part of a 5-sensing cycle experiment demonstrating regeneration of the REE sensor for reuse, wherein 0.5M hydrochloric acid is used in between each measurement, restoring the original emission signal of the BTC-1 MOF, in accordance with the features of the present invention.

The invented fiber optic system was initially tested on solutions of four visible luminescence-emitting REEs: terbium, europium, samarium, and dysprosium in solution and after drying. Characteristic emission peaks were observed from each of the REEs. Importantly, drying the MOF-coated sample enhanced the REE emission intensity due to the removal of solvent molecules that typically act as vibrational quenchers of REE emission. Here, the luminescent signals obtained using BTC-3 MOF-coated optical fiber tips in the presence of 1.6 ppm Eu and Tb in solution versus after drying were compared, and drying significantly improved the signal (FIG. 7). Likewise, the luminescent signals obtained using BTC-1 MOF-coated optical fiber tips in the presence of 16 ppm Dy, 6.3 ppm Tb, 15 ppm Sm, and 6 ppm Eu in solution versus after drying were compared, and drying significantly improved the signal (FIGS. 8A-8D). Similarly, the luminescent signals obtained using BTC-1 MOF-coated optical fiber tips in the presence of increasing concentrations of Tb, Dy, Sm, and Eu in solution versus after drying were compared, and drying significantly improved the signal (FIGS. 15A, 15C, 16A, 16C, 17A, 17C, 18A, 18C).

In order to better estimate the sensitivity of the invented REE sensor, limit of detection studies were conducted in which the emission was measured at different REE concentration levels in solution and after drying, and detection limits within the part-per-billion range were achieved in water for all four visible-emitting REEs (Table 1). Representative calibration curves for limit of detection analysis of BTC-1 in the presence of increasing concentrations of TB, Dy, Sm, and Eu in solution and after drying are shown in FIGS. 15B, 15D, 16B, 16D, 17B, 17D, 18B, and 18D.

As demonstrated in Table 1, a marked improvement in the limits of detection were observed upon drying: for example, the LOD for Tb decreased from 140 to 60 ppb, while the LOD for Eu decreased from 110 to 90 ppb. Increased sensitivity as a result of drying is one advantage of having the MOF coating the optical fiber. In a solution-phase measurement, it would be much more tedious to isolate, concentrate, and dry the sensing material after exposure to rare earth elements. Moreover, the invented REE sensor is capable of detecting all four visible-emitting REEs (Tb, Eu, Dy, and Sm) when they are present simultaneously.

Figure 10A:
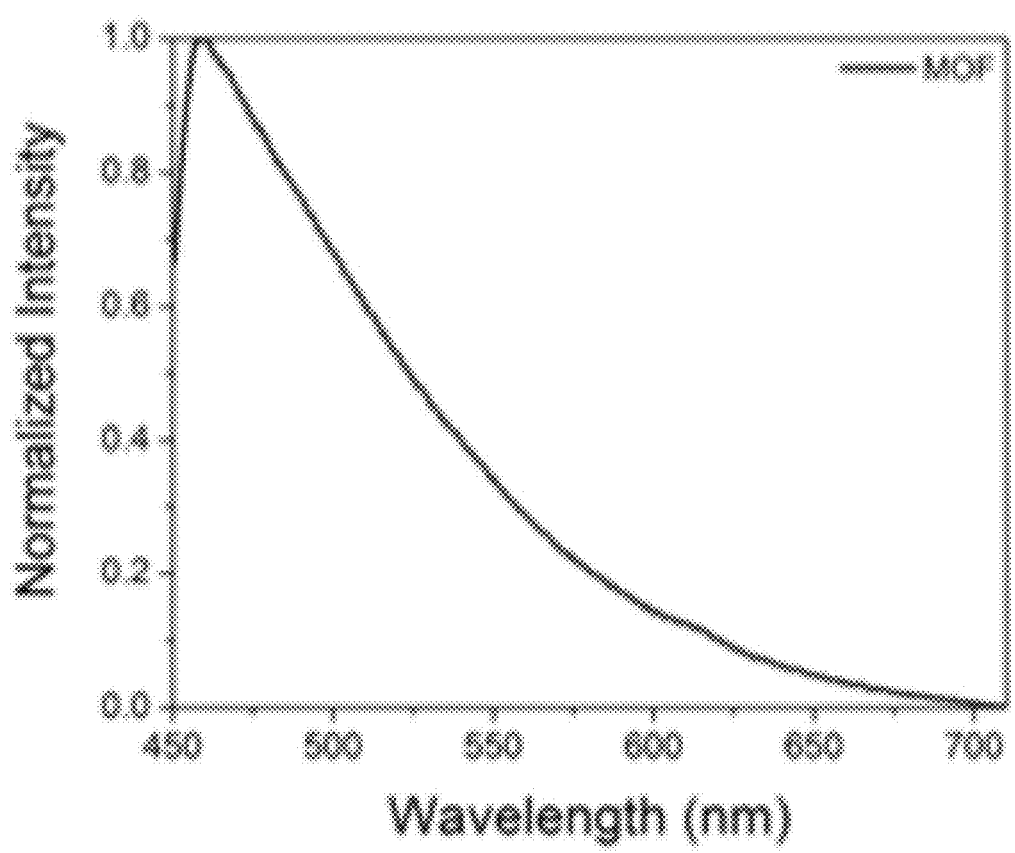
FIG. 10A is normalized emission spectra of a BTC-3 MOF-coated optical fiber tip, as part of a 10-sensing cycle experiment demonstrating regeneration of the REE sensor for use, wherein dilute hydrochloric acid is used in between each measurement in the presence of Tb and Eu, restoring the original emission signal of the BTC-3 MOF, in accordance with the features of the present invention.
Figure 10B:
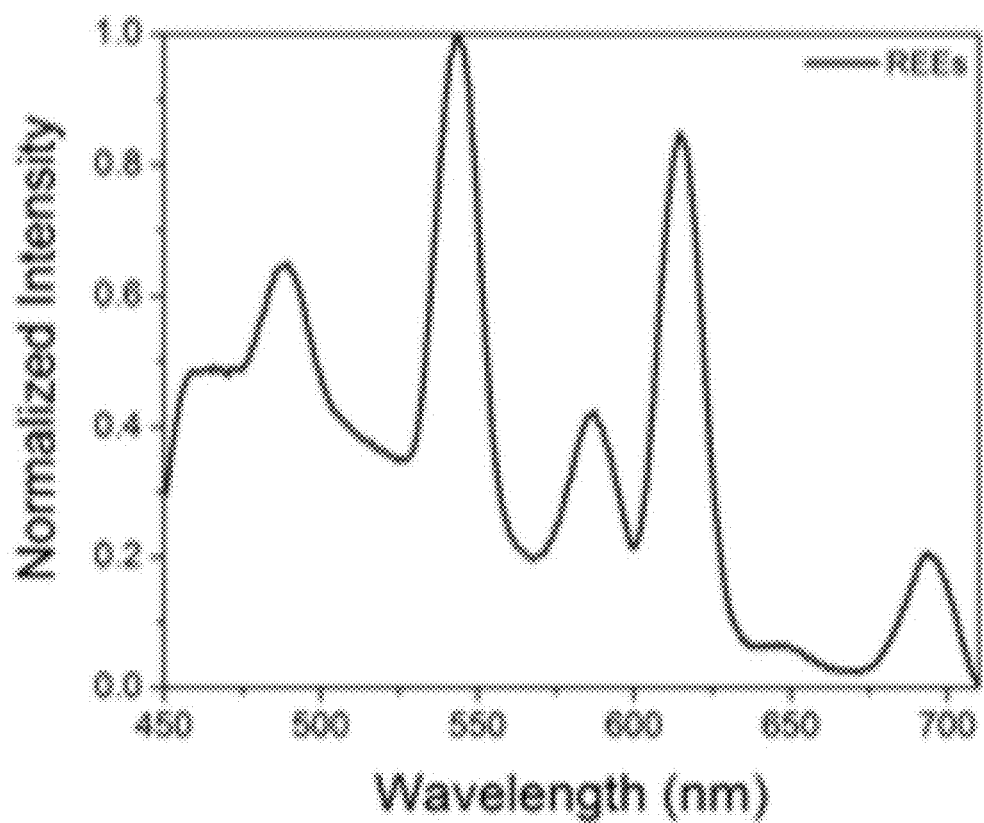
FIG. 10B is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10C:
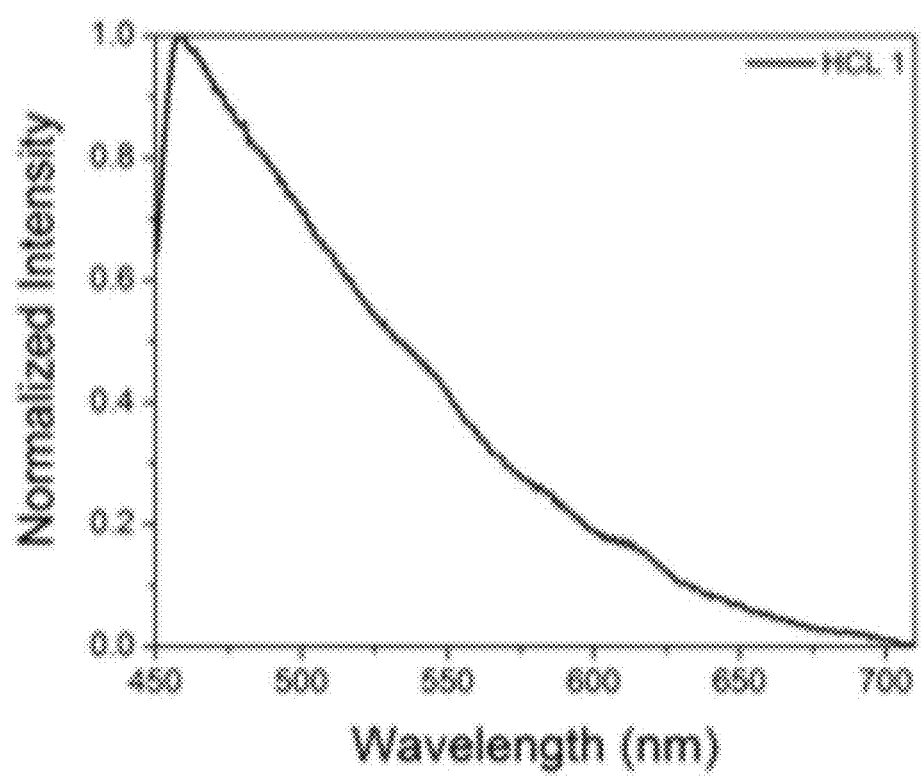
FIG. 10C is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10D:
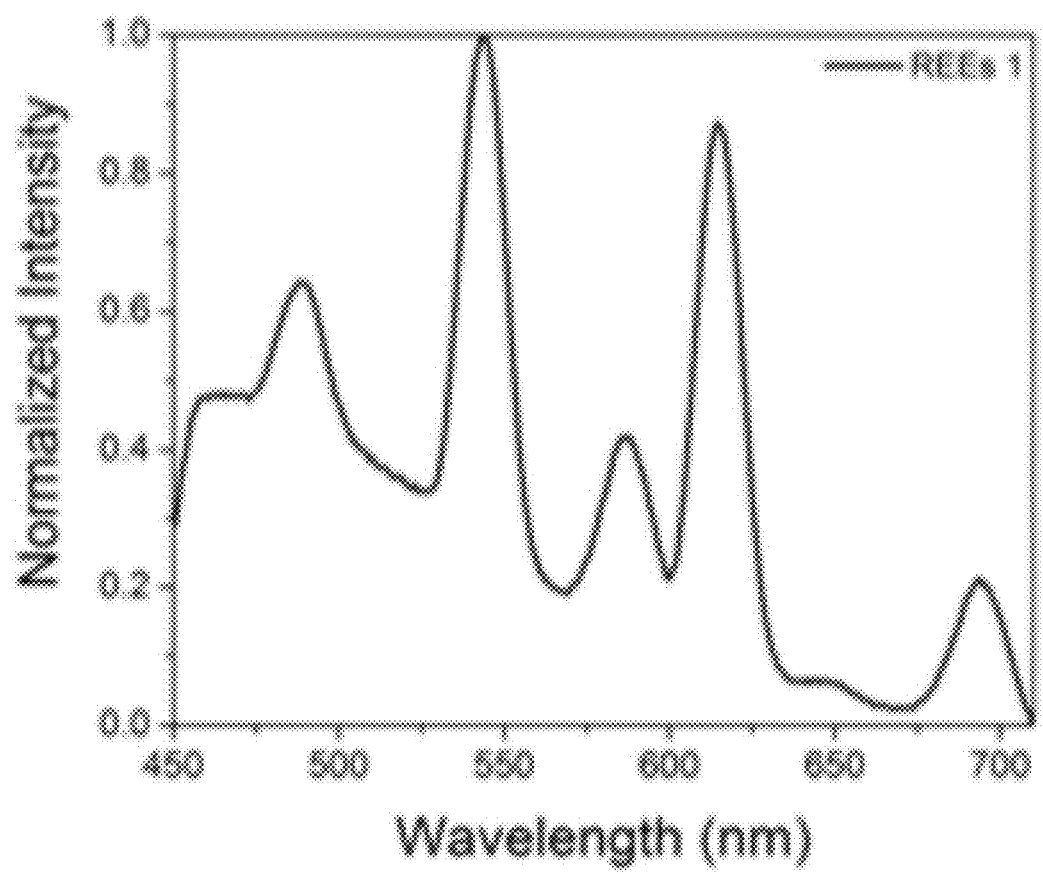
FIG. 10D is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10E:
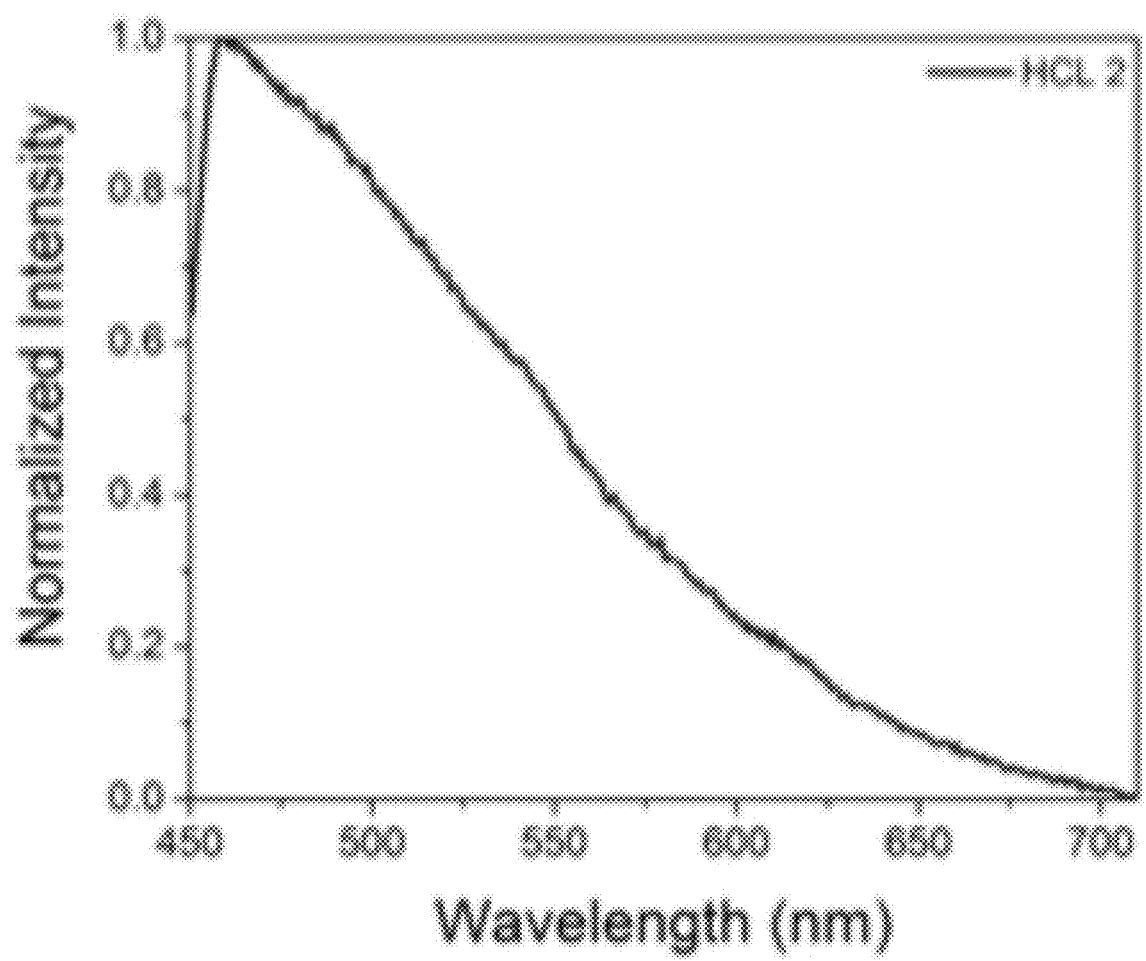
FIG. 10E is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10F:
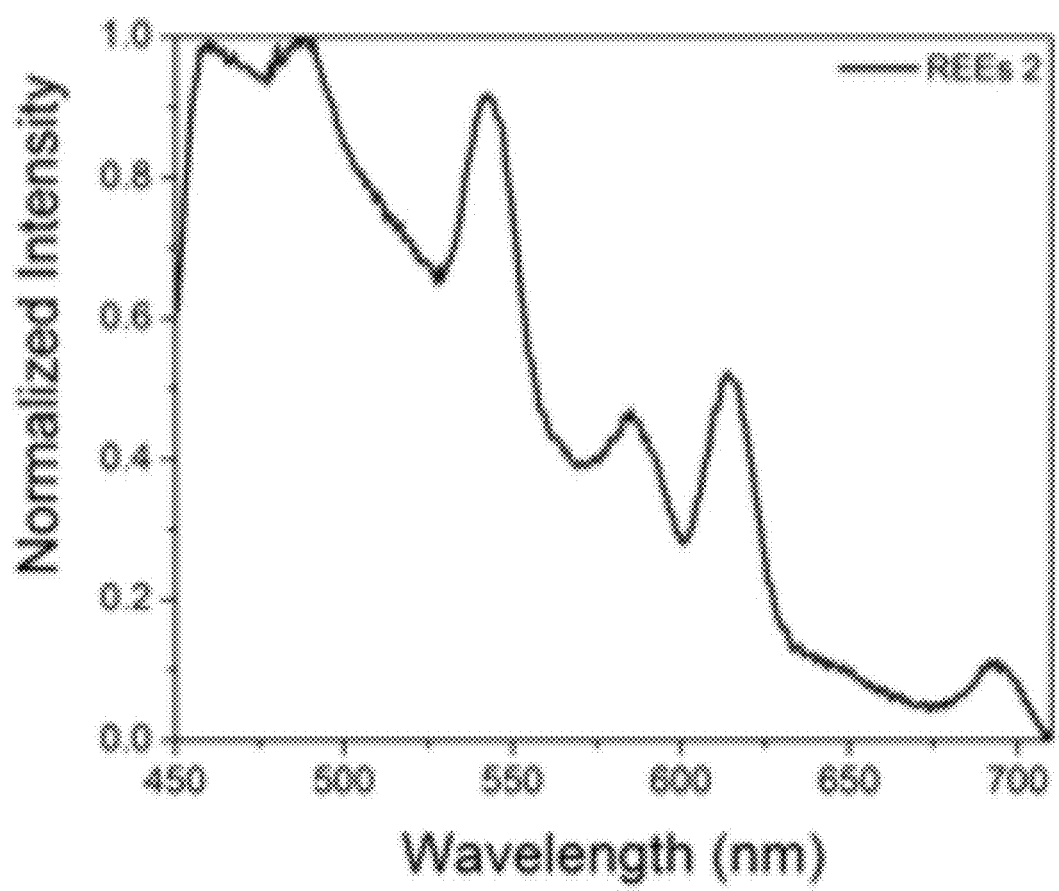
FIG. 10F is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10G:
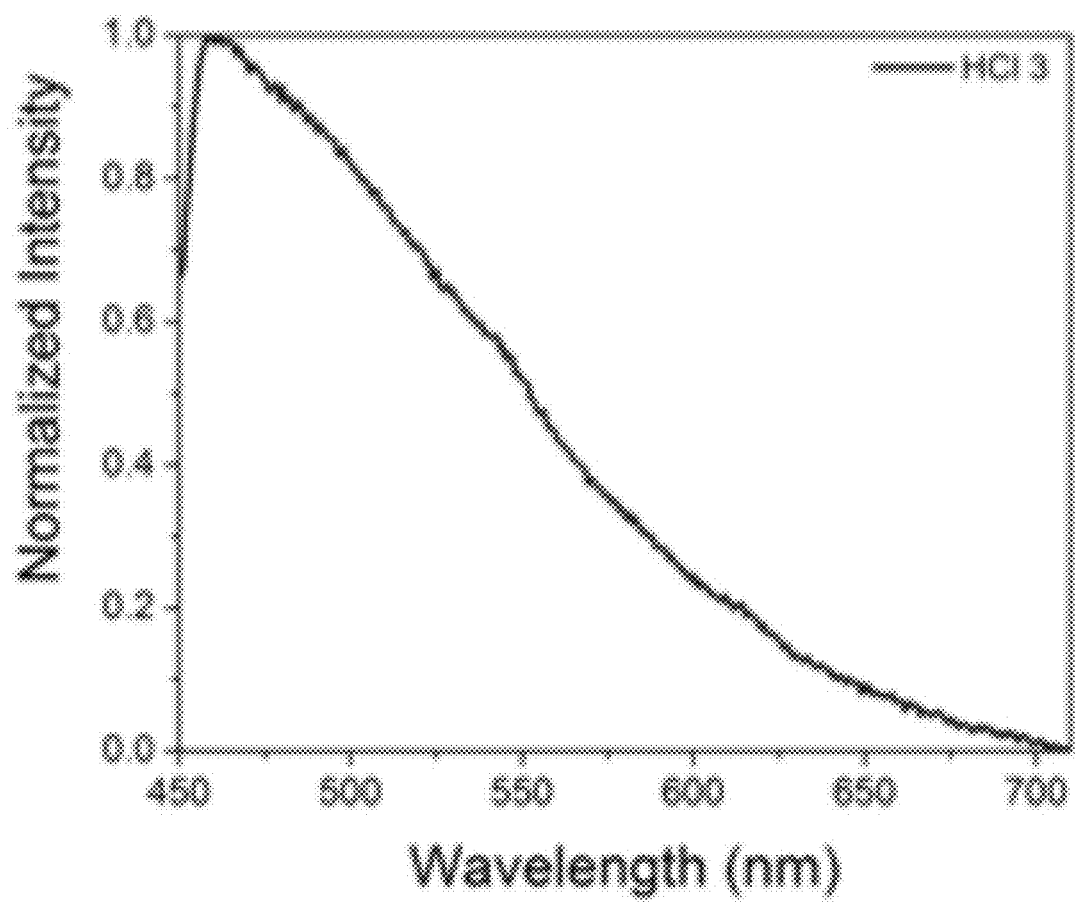
FIG. 10G is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10H:
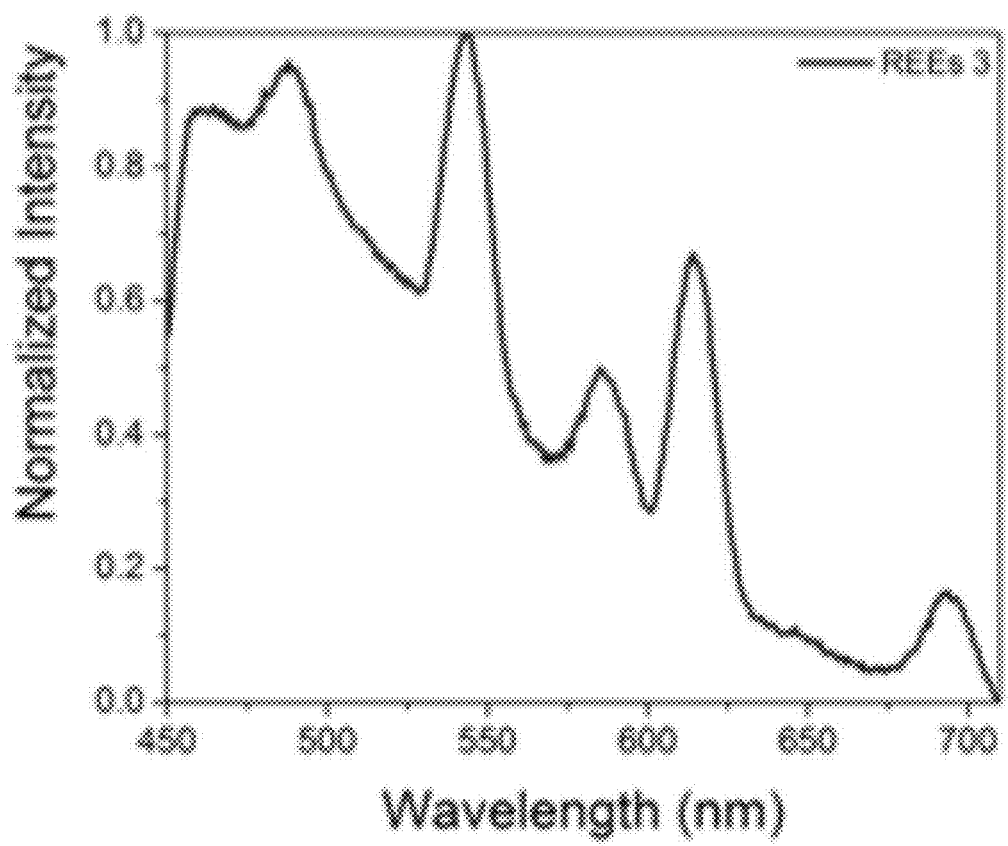
FIG. 10H is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10I:
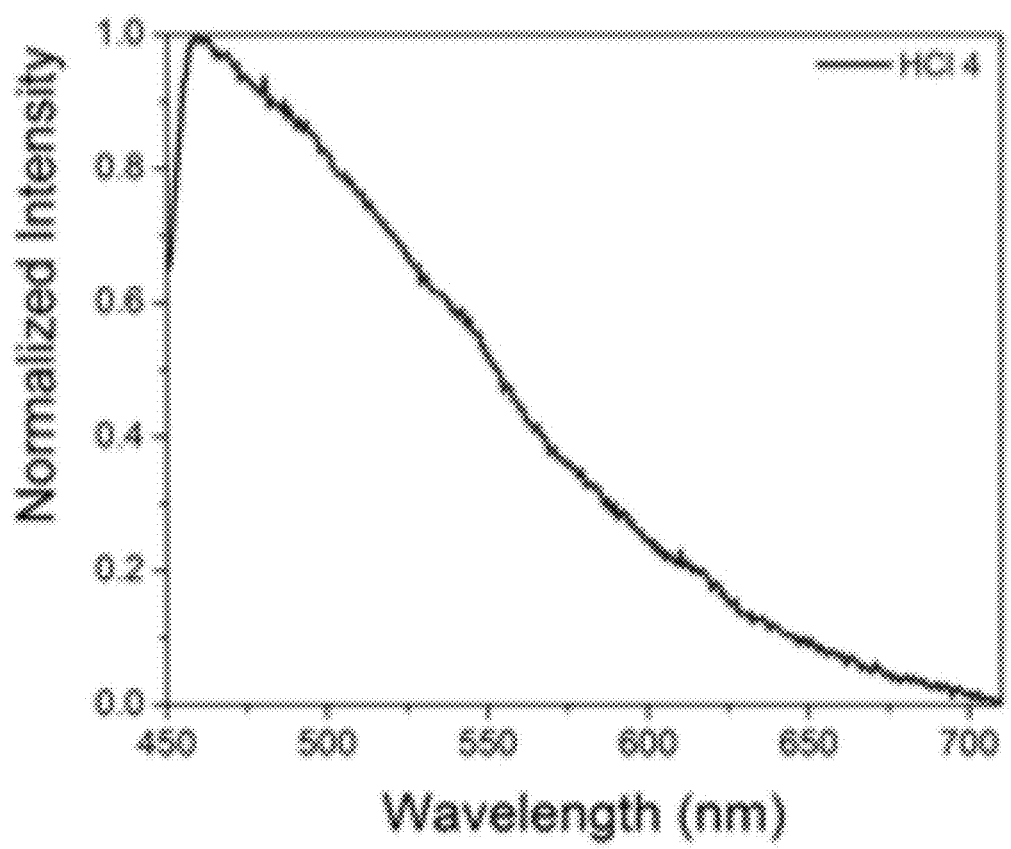
FIG. 10I is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10J:
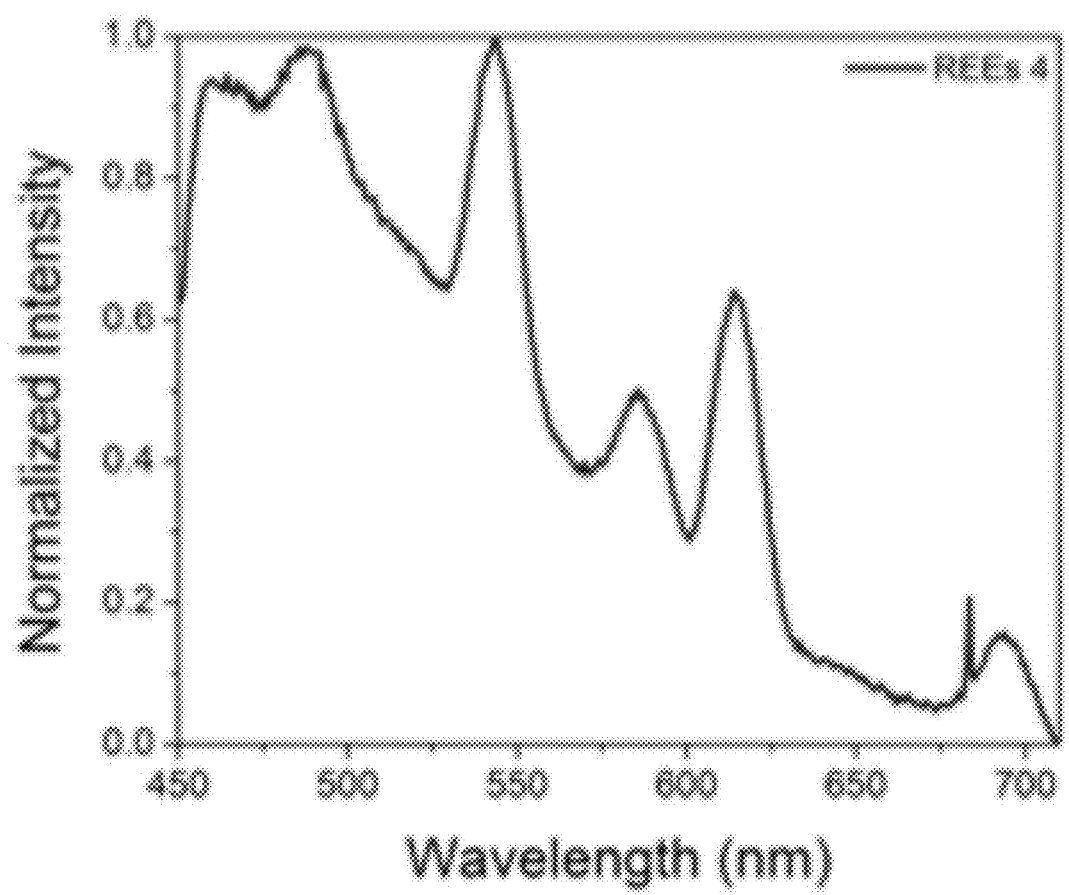
FIG. 10J is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10K:
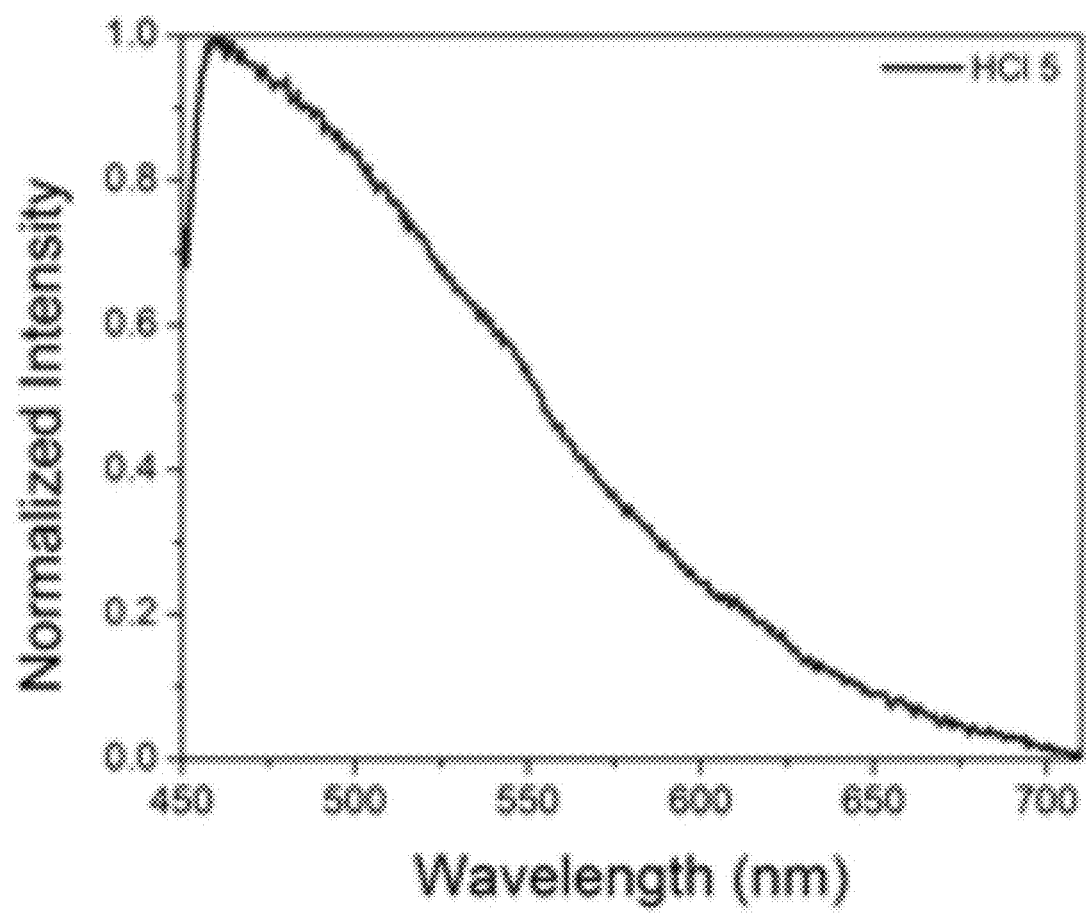
FIG. 10K is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10L:
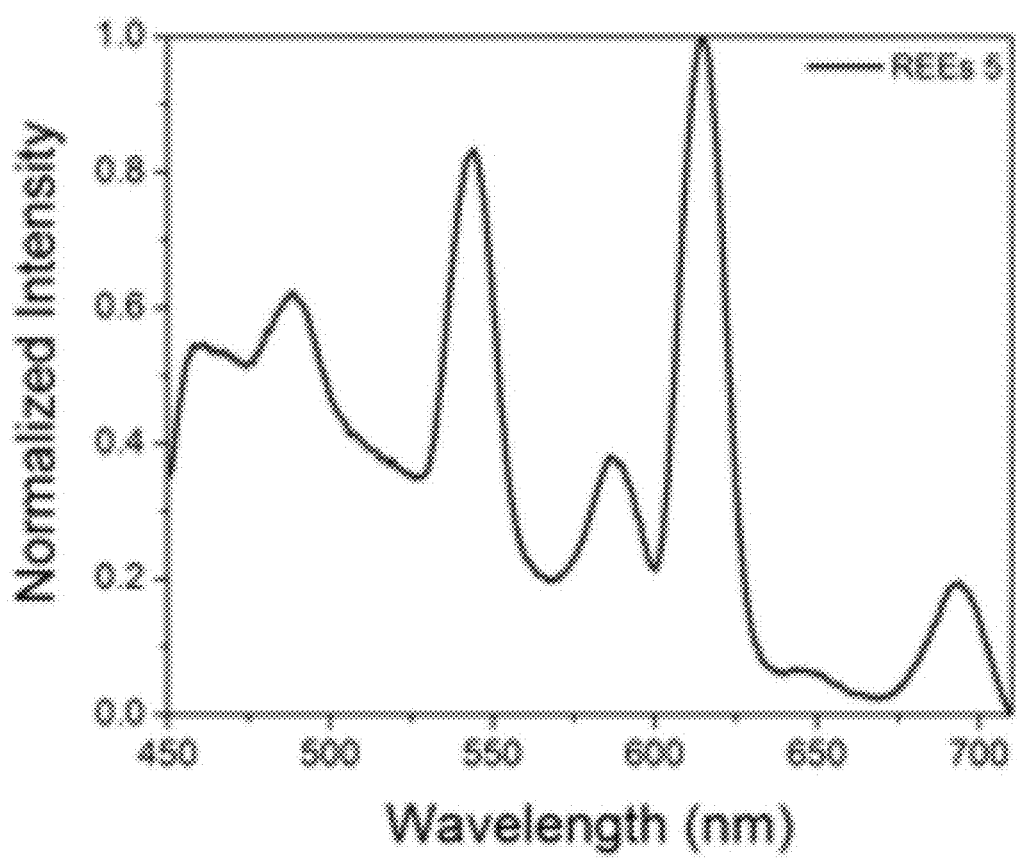
FIG. 10L is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10M:
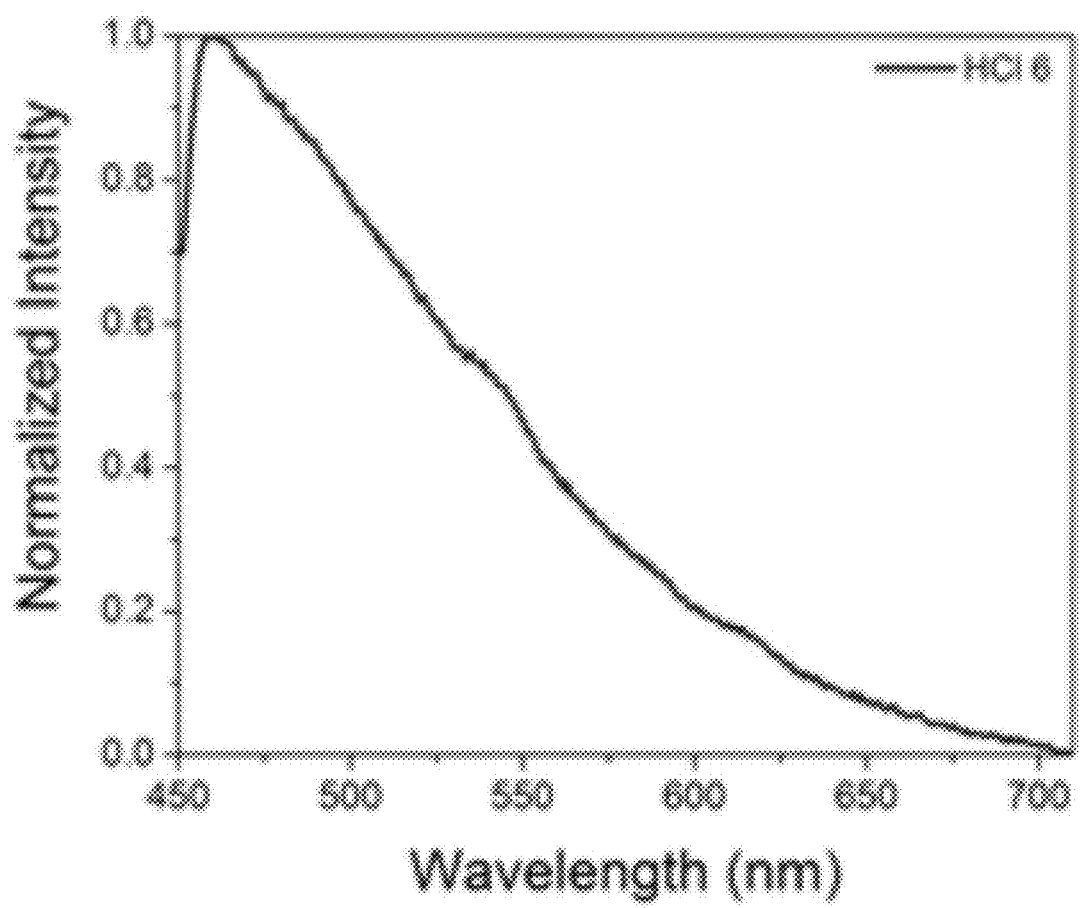
FIG. 10M is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10N:
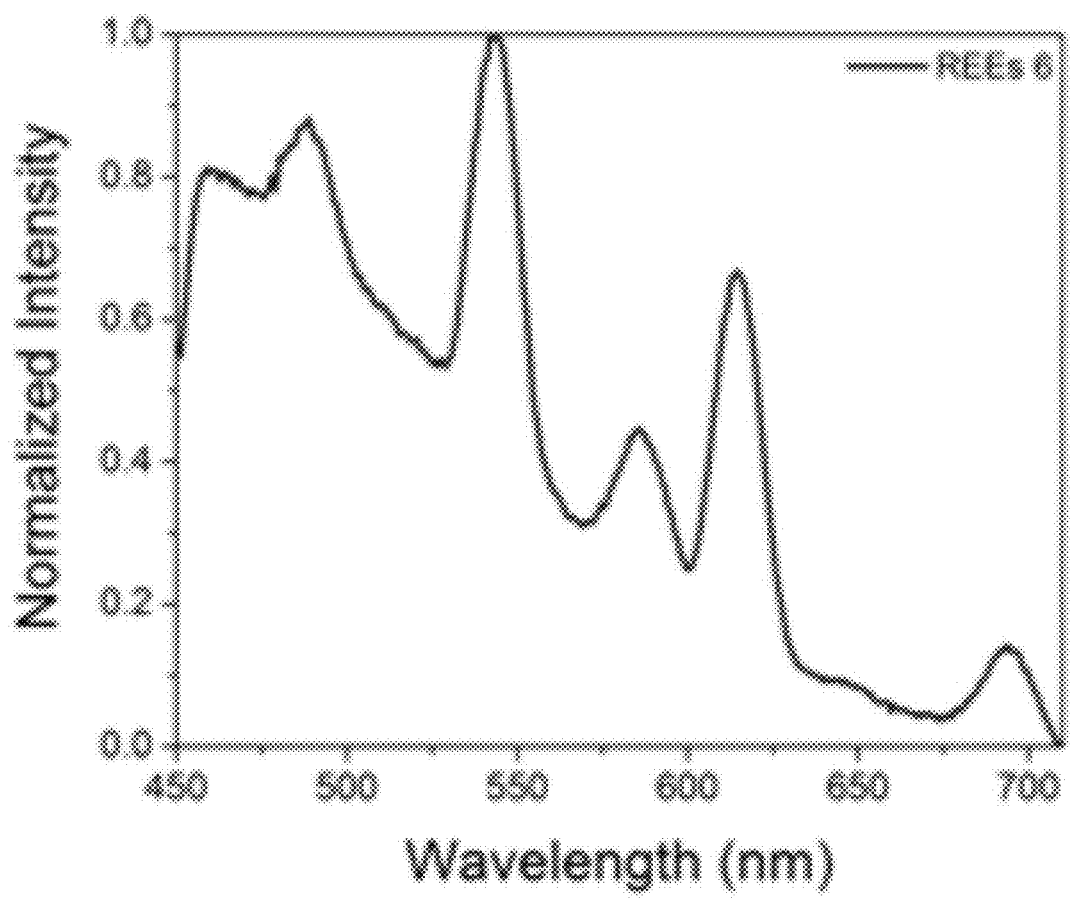
FIG. 10N is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10O:
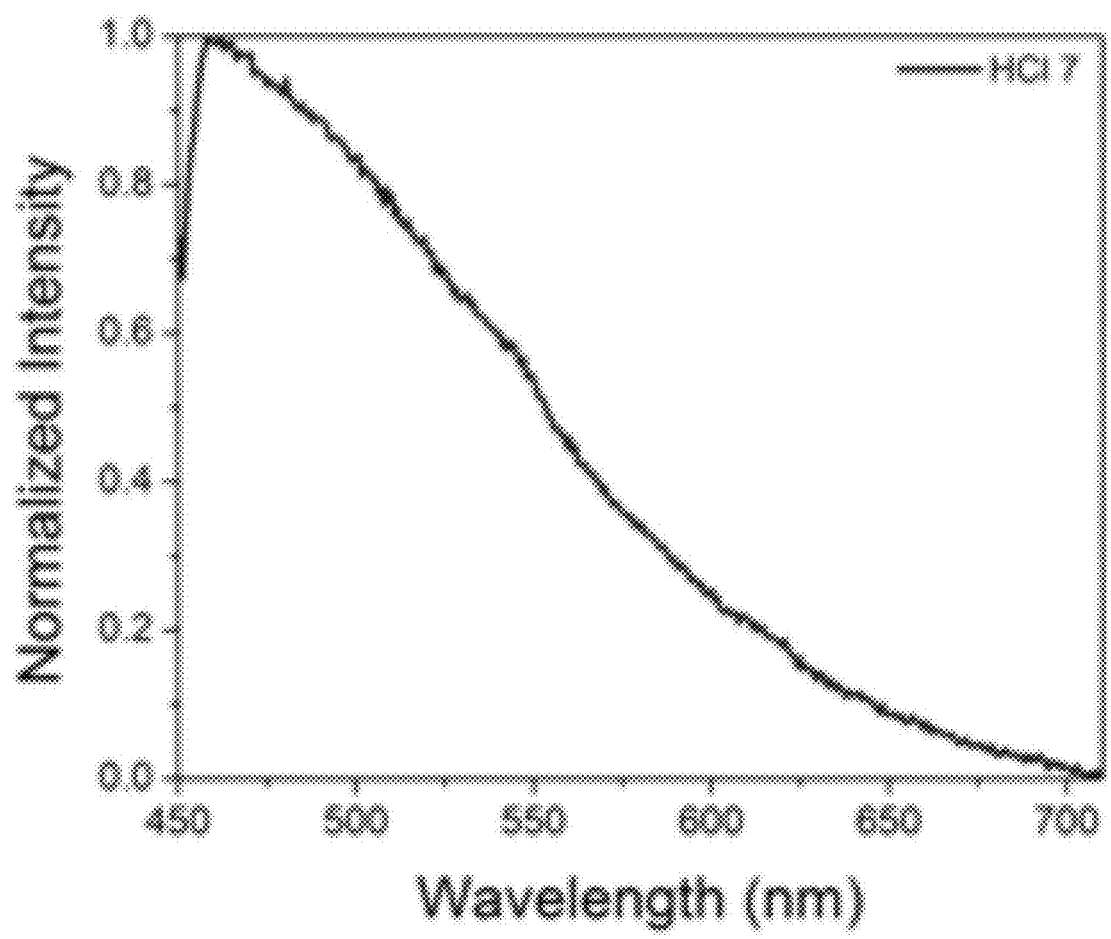
FIG. 10O is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10P:
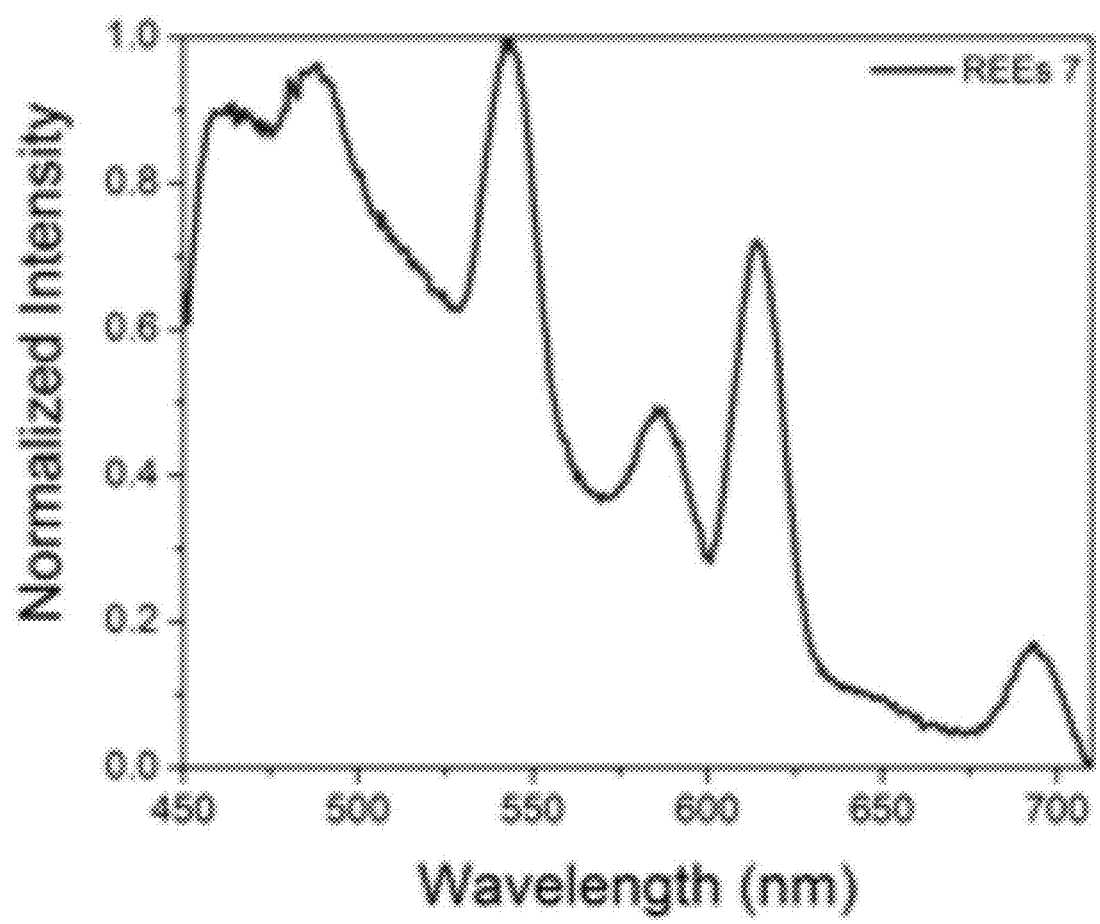
FIG. 10P is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10Q:
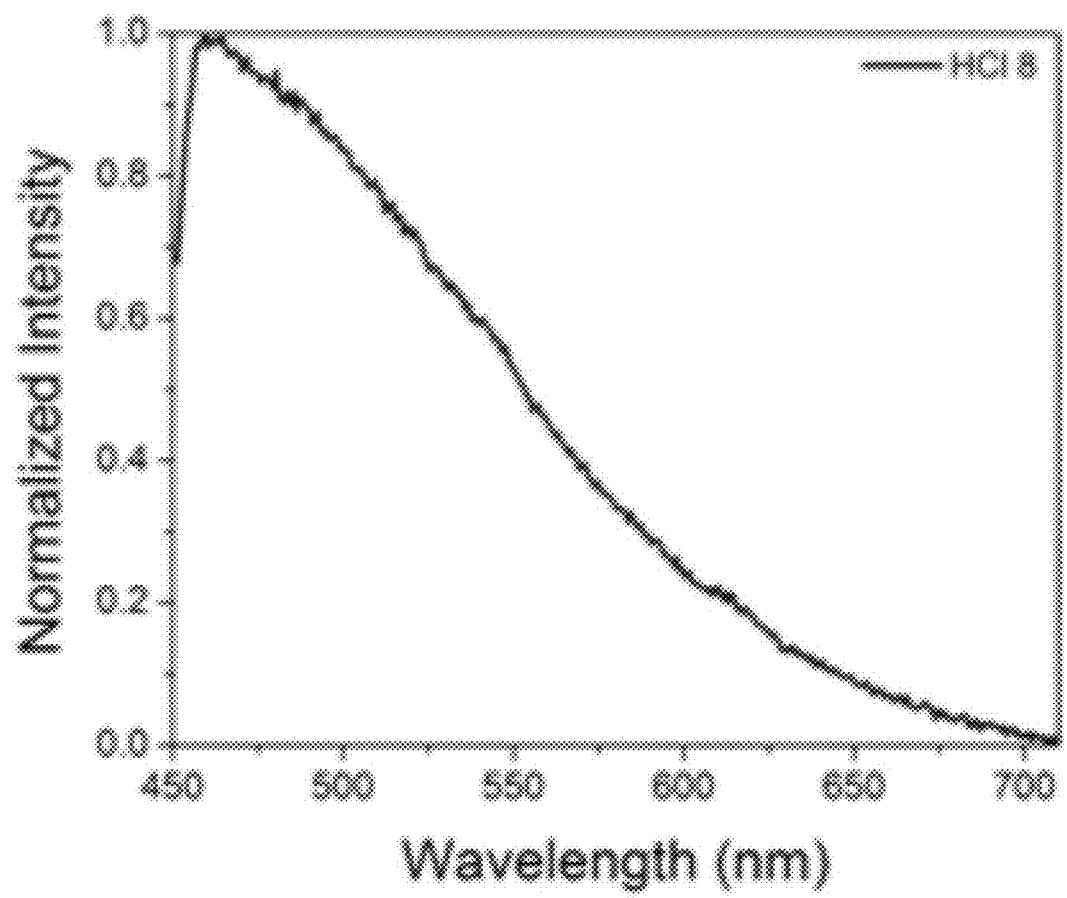
FIG. 10Q is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10R:
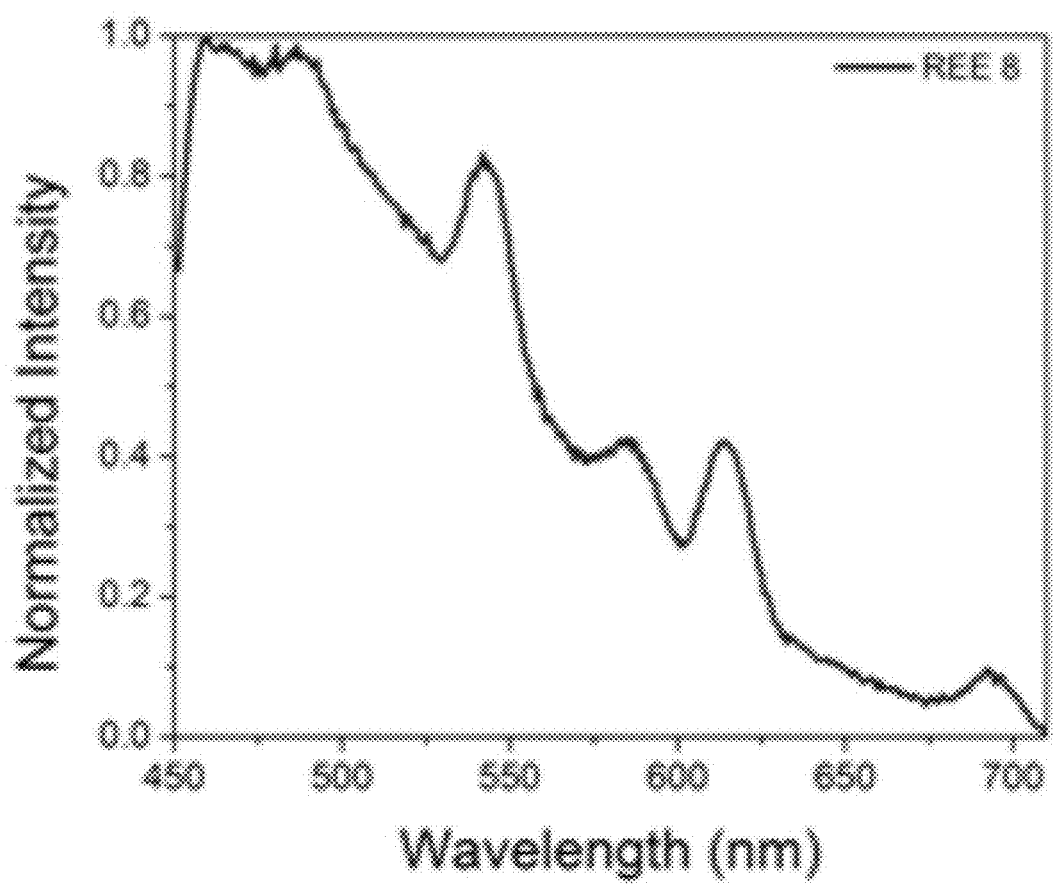
FIG. 10R is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10S:
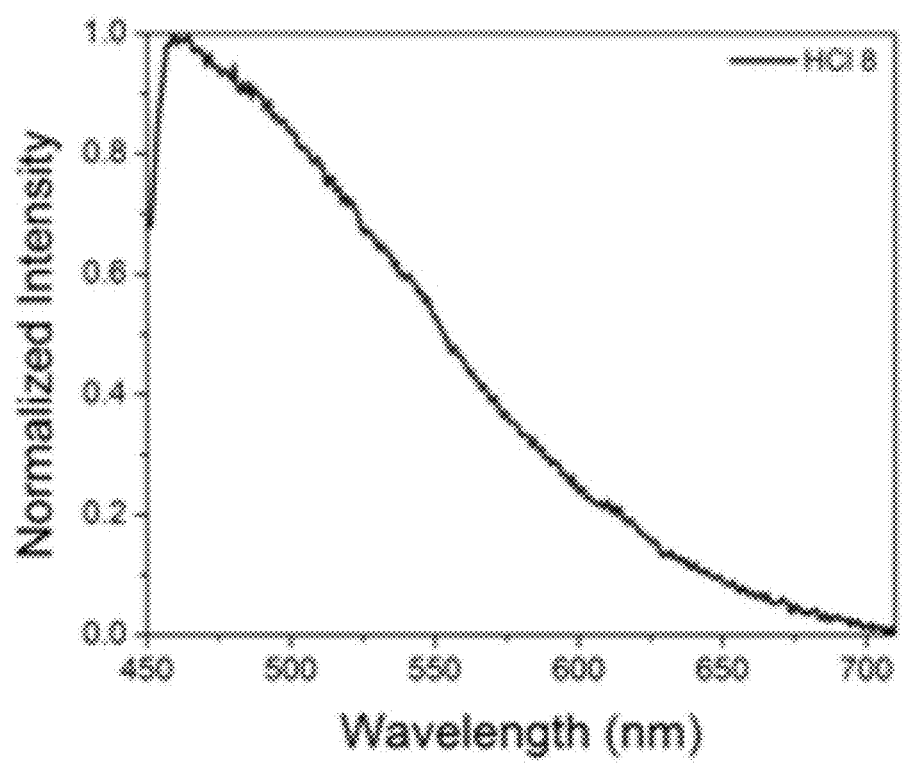
FIG. 10S is normalized emission spectra of a BTC-3 MOF-coated optical fiber tip after exposure to dilute hydrochloric acid, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.
Figure 10T:
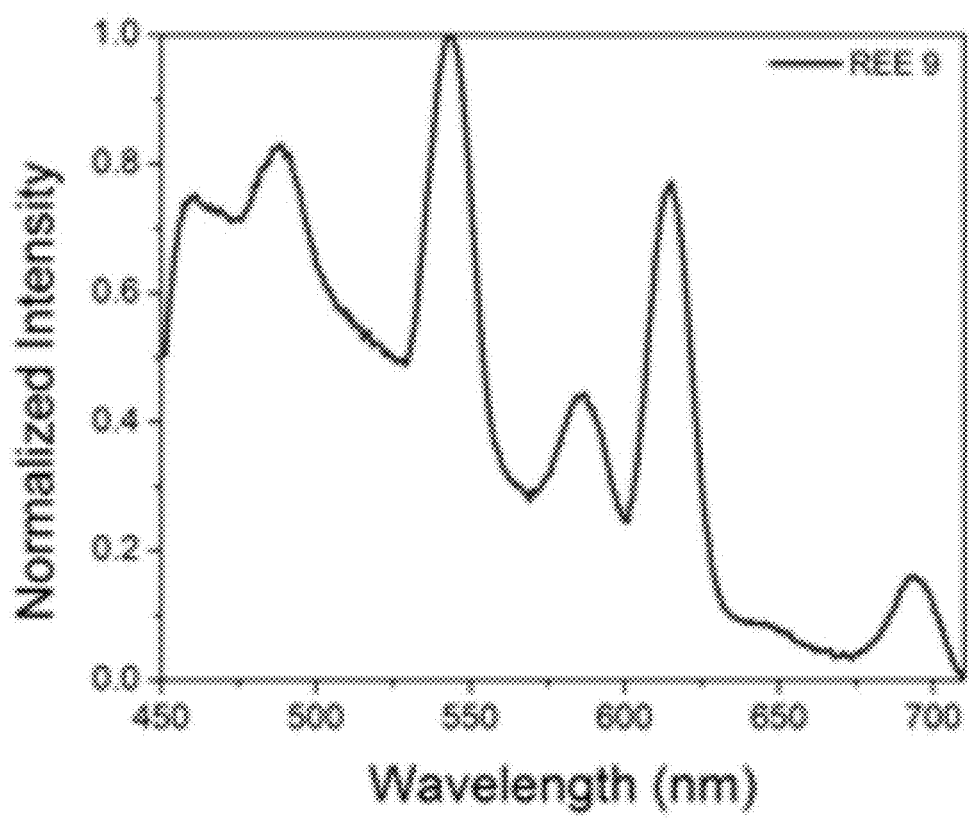
FIG. 10T is normalized emission spectra of a BTC-3 MOF-coated optical fiber tip in the presence of Tb and Eu, as part of a 10-sensing cycle experiment demonstrating regeneration of the REE sensor for reuse, wherein dilute hydrochloric acid is used in between each measurement, restoring the original emission signal of the BTC-3 MOF, in accordance with the features of the present invention.

Exposing the MOF-coated optical fiber tip to dilute (0.5 M) hydrochloric acid (HCl) for 2.5 minutes eliminated emission signal from REEs, but importantly, the REE signal returned upon exposure to the REE solution. Qualitative regeneration of the REE sensing material could be achieved across multiple cycles by repeatedly alternating between HCl solution and REEs, up to at least 10 cycles. Here, qualitative reversible sensing of approximately 6 ppm terbium and europium across 5 sensing cycles was demonstrated, with the restoration of the original emission signal of the BTC-1 MOF in between exposure to 0.5M hydrochloric acid per measurement cycle (FIG. 9A-9J). Likewise, qualitative reversible sensing of terbium and europium across 10 sensing cycles was demonstrated using a BTC-3 MOF-coated optical fiber tip exposed in alternating cycles to an Eu/Tb-containing solution and a dilute HCl solution (FIG. 10A-10T).

An important application area for REE sensor technologies is in process monitoring, where the efficiency and effectiveness of REE extraction steps can be monitored in real time. Analysis of a membrane solvent extraction (MSX) process stream was performed. MSX is a promising strategy for purifying rare earth elements from complex streams. During this process, a simulated leachate solution containing low part-per-million concentrations of terbium and europium REEs and significantly higher aluminum and calcium concentrations was exposed to a sulfuric acid-based strip solution. Over time, the REEs are selectively transferred from the leachate solution into the strip solution. However, once the REEs are extracted, impurities begin to enter the strip solution, thus REE sensors can be used to monitor the REE concentration in both the leachate and strip solution to determine the optimum run time of the MSX process. Here, 1.5 mL samples of the strip and leachate solutions were removed at different time points over a two-day period. A fresh MOF-coated tip was exposed to each sample for 5 minutes, followed by drying with a heat gun and luminescence measurement. Following the measurement of each sample, the fiber tip was cleaved and fresh MOF was attached to the fiber tip prior to analysis of the next sample.

Figure 11A:
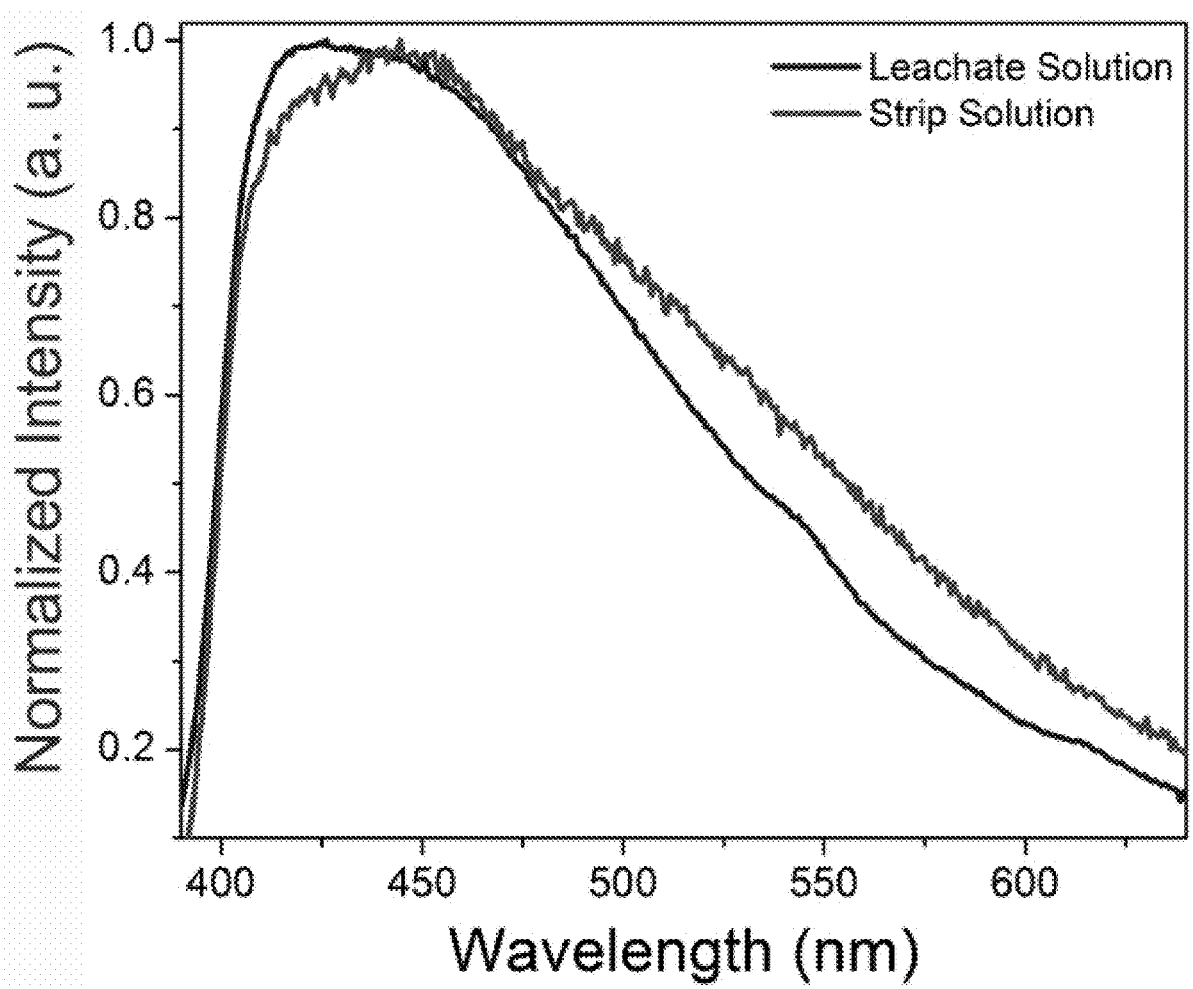
FIG. 11A is normalized emission spectra of the dry immobilized BTC-1 MOF after incubation in the leachate and strip solution at the beginning of a membrane solvent extraction (MSX) trial, in accordance with the features of the present invention.
Figure 11B:
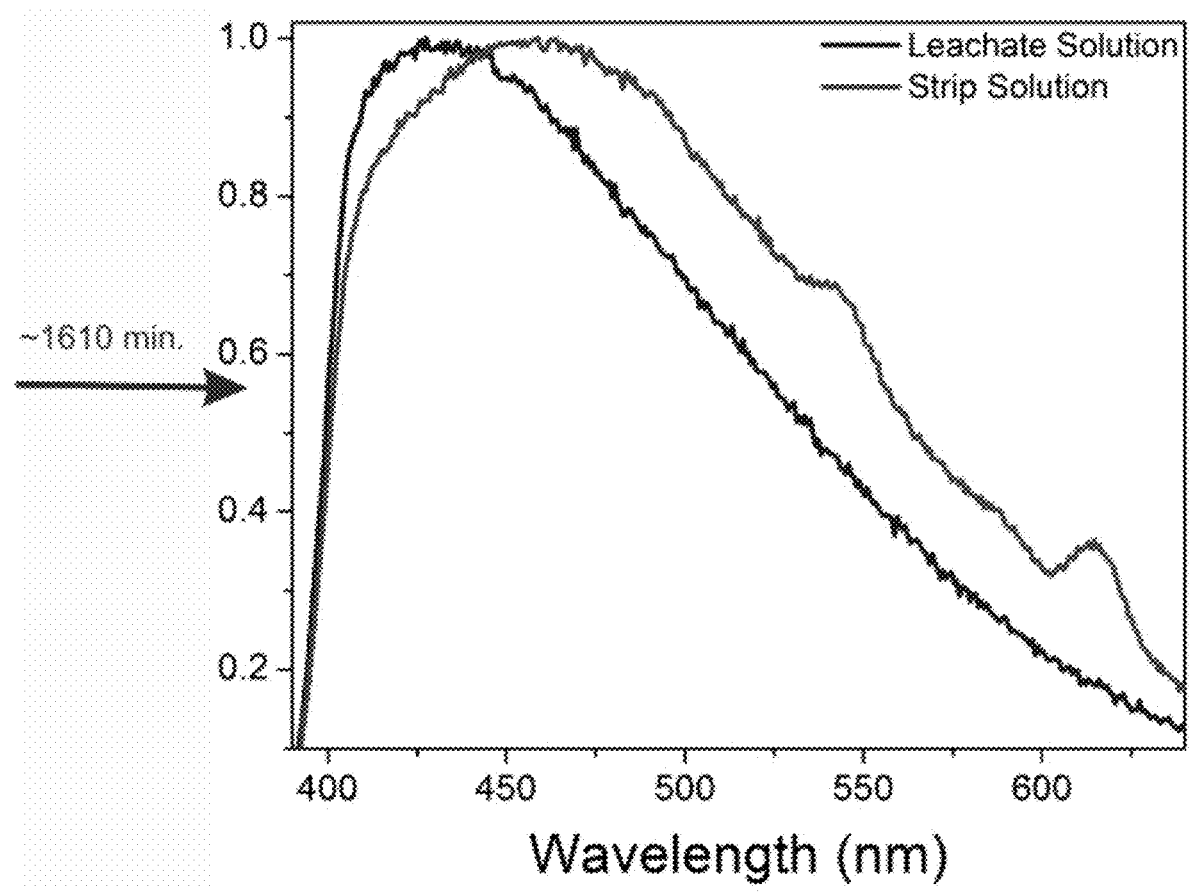
FIG. 11B is normalized emission spectra of the dry immobilized BTC-1 MOF after incubation in the leachate and strip solution after approximately 1610 minutes in a MSX trial, in accordance with the features of the present invention.
Figure 19A:
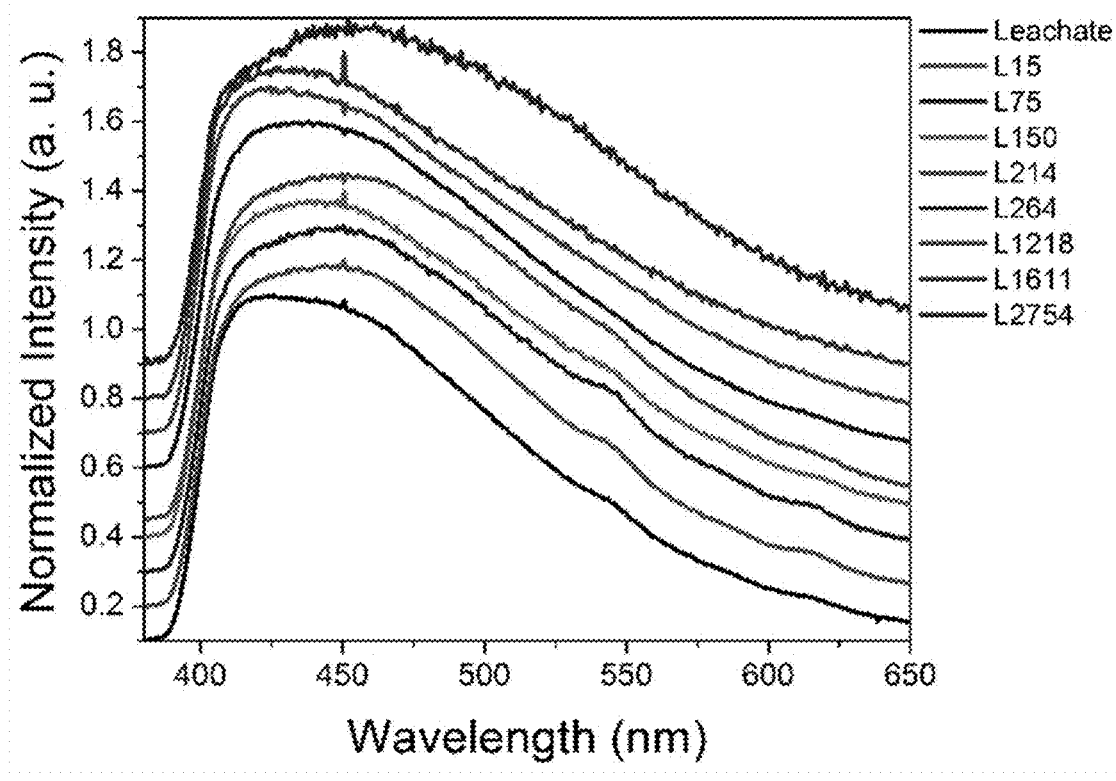
FIG. 19A is normalized, stacked emission plots of leachate solution taken at different time points (given with units of minutes in the legend) after drying during a membrane solvent exchange, wherein weak signal from terbium (approximately 545 nm) and europium (approximately 615 nm) decreases, indicating that the concentration of REEs in the leachate is decreasing with time, in accordance with the features of the present invention.
Figure 19B:
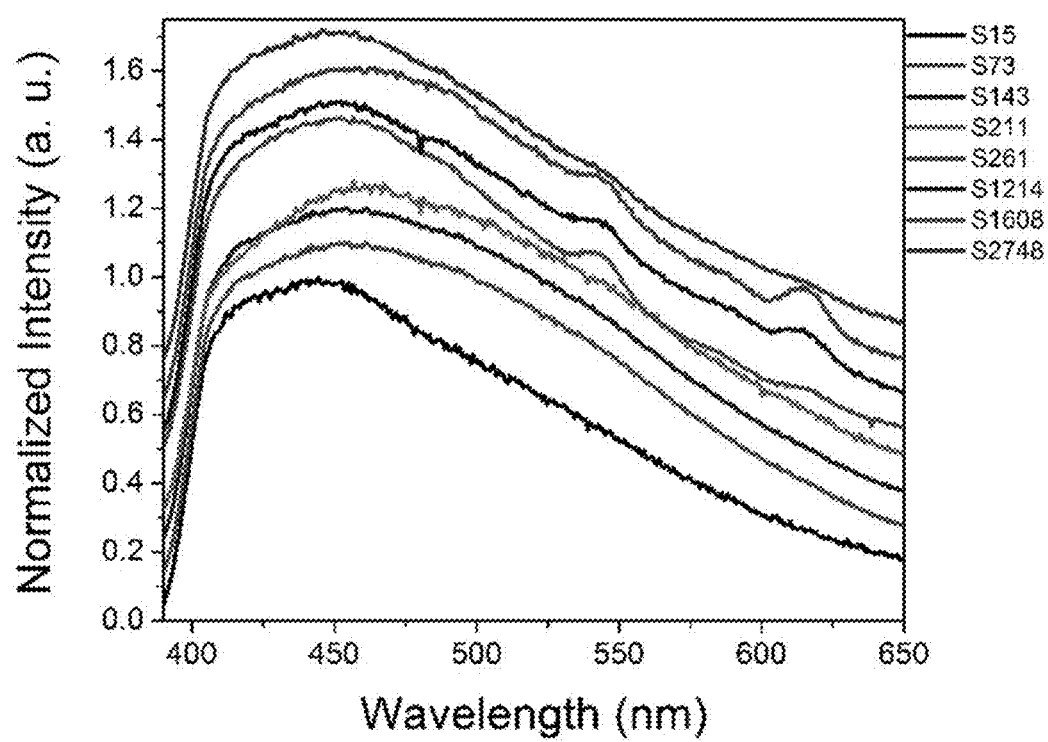
FIG. 19B is normalized, stacked emission plots of strip solution taken at different time points (given with units of minutes in the legend) after drying during a membrane solvent exchange, wherein signal from terbium and europium increases with time in the strip solution as REEs are transferred, with maximum signal achieved after approximately 1600 minutes, in accordance with the features of the present invention.

Optimizing the time for extraction during the MSX process is critical; once all of the REEs have been transferred to the strip solution, impurity metals such as calcium and aluminum also begin to enter the strip solution. Monitoring REE signal at different time points can therefore provide valuable information for optimizing the extraction time used. Here, maximum REE signal was achieved after 1608 minutes in the leachate solution. FIG. 11A shows representative normalized emission spectra of dry, immobilized BTC-1 MOF after incubation in the leachate and strip solutions during the initial stages of an MSX trial. FIG. 11B shows representative normalized emission spectra of dry, immobilized BTC-1 MOF after incubation in the leachate and strip solutions after reaching the optimum REE signal at 1608 minutes in the MSX trial. As shown in FIGS. 19A-19B, initially, weak signal from terbium (545 nm) and europium (617 nm) were observed only in the leachate, with no signal in the strip solution. After approximately 1610 minutes, stronger Tb and Eu signals were observed in the strip solution and no signal was observed in the leachate, indicating that the REEs had been transferred from the leachate to the strip solution. These experiments followed the expected trend: weak signal from Tb and Eu were observed in the early stages of the MSX process in the leachate solution, with little to no signal observed in the strip solution. Over time, the signal in the leachate decreased, with a corresponding increase in REE signal in the strip solution. The ability of the sensor to detect Tb and Eu in streams with low pH and/or high concentrations of competing ions undergoing a real extraction process is an encouraging step towards deployment in real-world applications.

Figure 12:
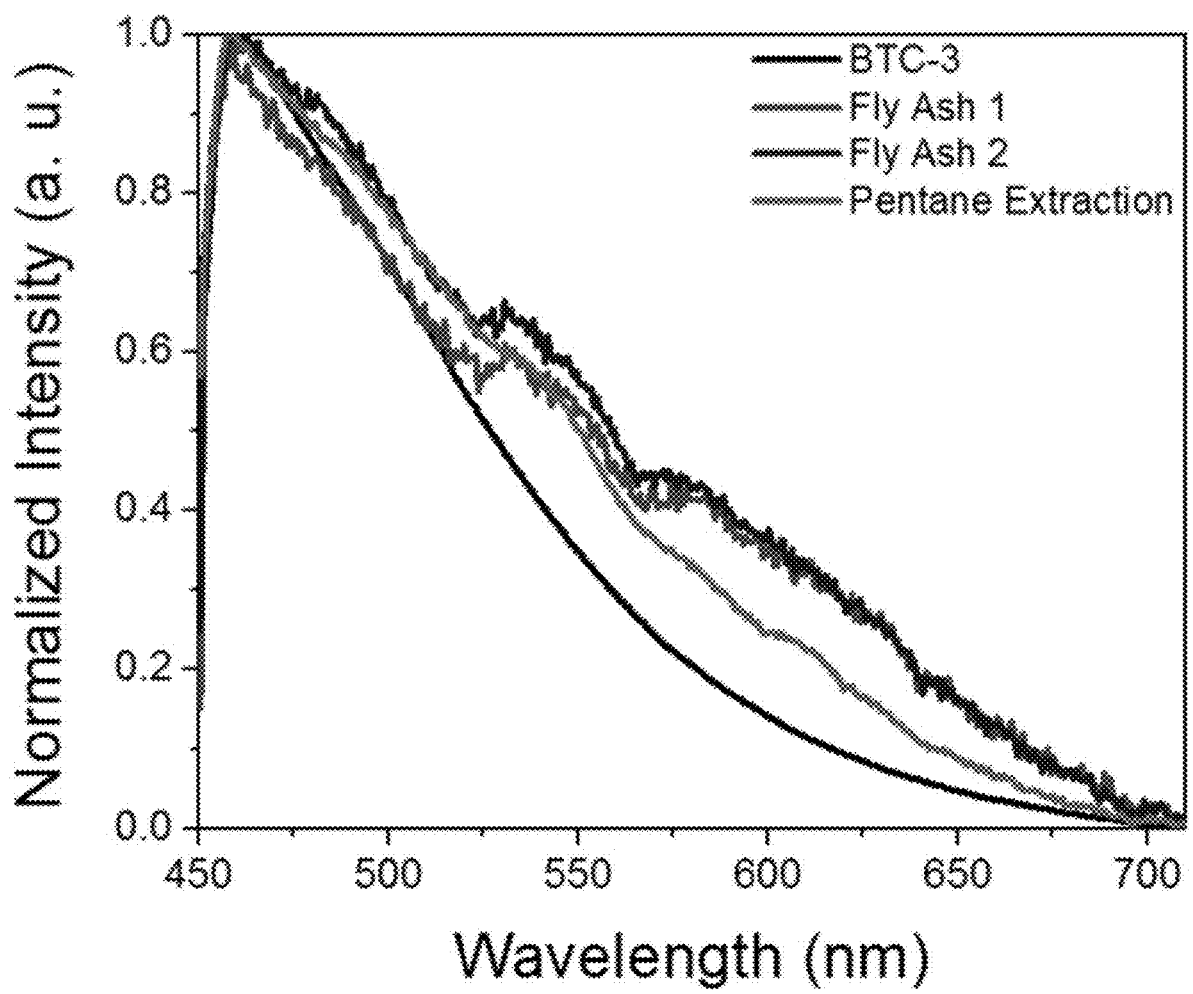
FIG. 12 is normalized emission spectra of a BTC-3 MOF-coated optical fiber tip in the presence of various fly ash leachates and pentane extraction, where signal from Tb and Eu can be observed, in accordance with the features of the present invention.

Likewise, experiments deploying the invented REE sensor using BTC-3 MOF-coated optical fiber tips on fly ash leachate process streams were conducted. Here, fly ash was leached into hydrochloric acid and/or were extracted into the organic solvent pentane (ICP-MS values: Fly ash 1 (38.1 ppb Tb, 56.4 ppb Eu), Fly ash 2 (39.9 ppb Tb, 60.1 ppb Eu), and pentane extraction liquid (approximately 70 ppb Tb, 100 ppb Eu). Luminescent signal from Tb and Eu were observed from the process streams, where peaks at 545 nm indicate the presence of terbium, and peaks at 590 and 615 nm indicate europium. (FIG. 12).

Figure 13A:
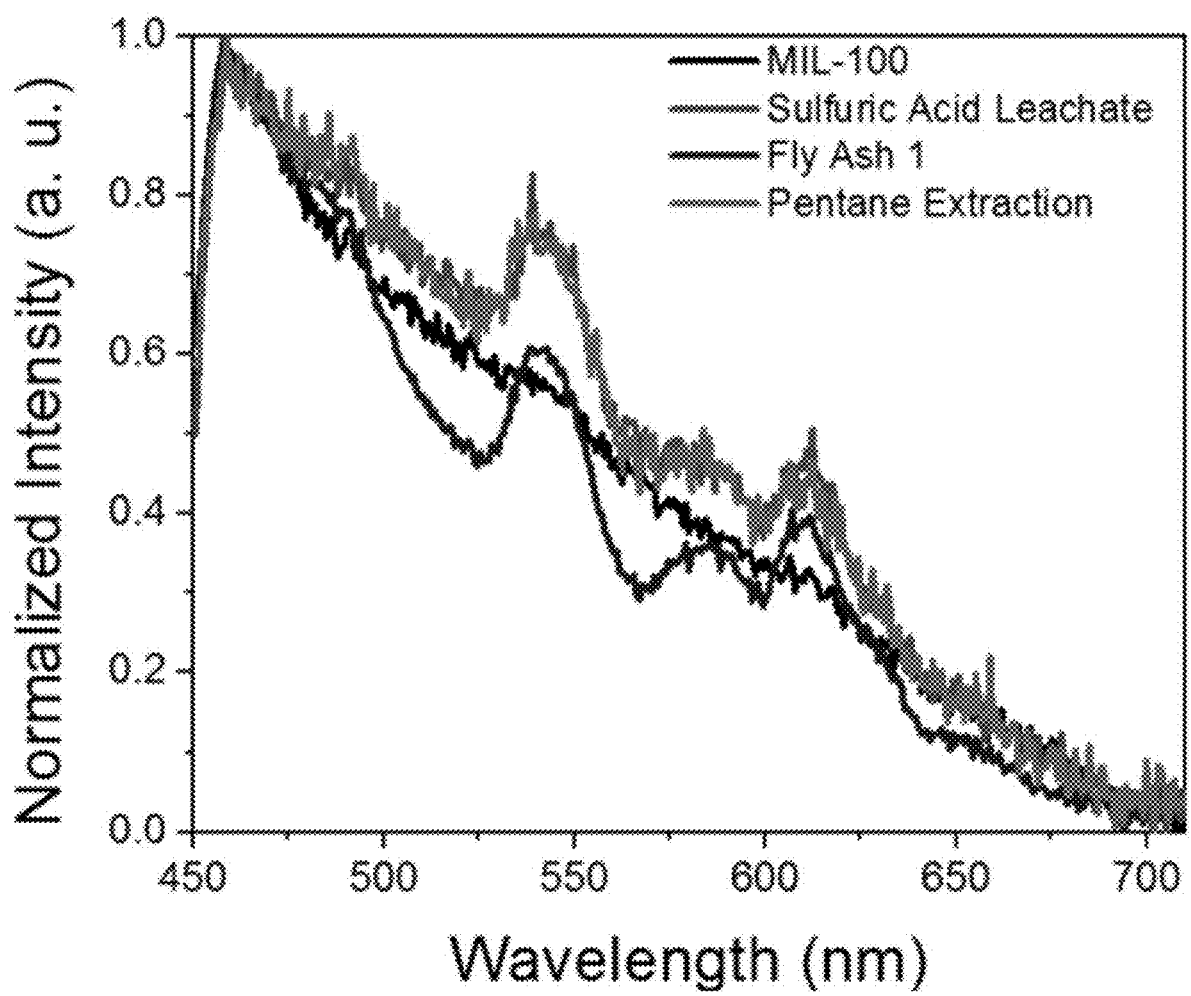
FIG. 13A is normalized emission spectra of a MIL-100 MOF-coated optical fiber tip and a MIL-100-coated optical fiber tip in the presence of fly ash leachate, sulfuric acid leachate, and pentane extraction, where signal from Tb and Eu can be observed, in accordance with the features of the present invention.
Figure 13B:
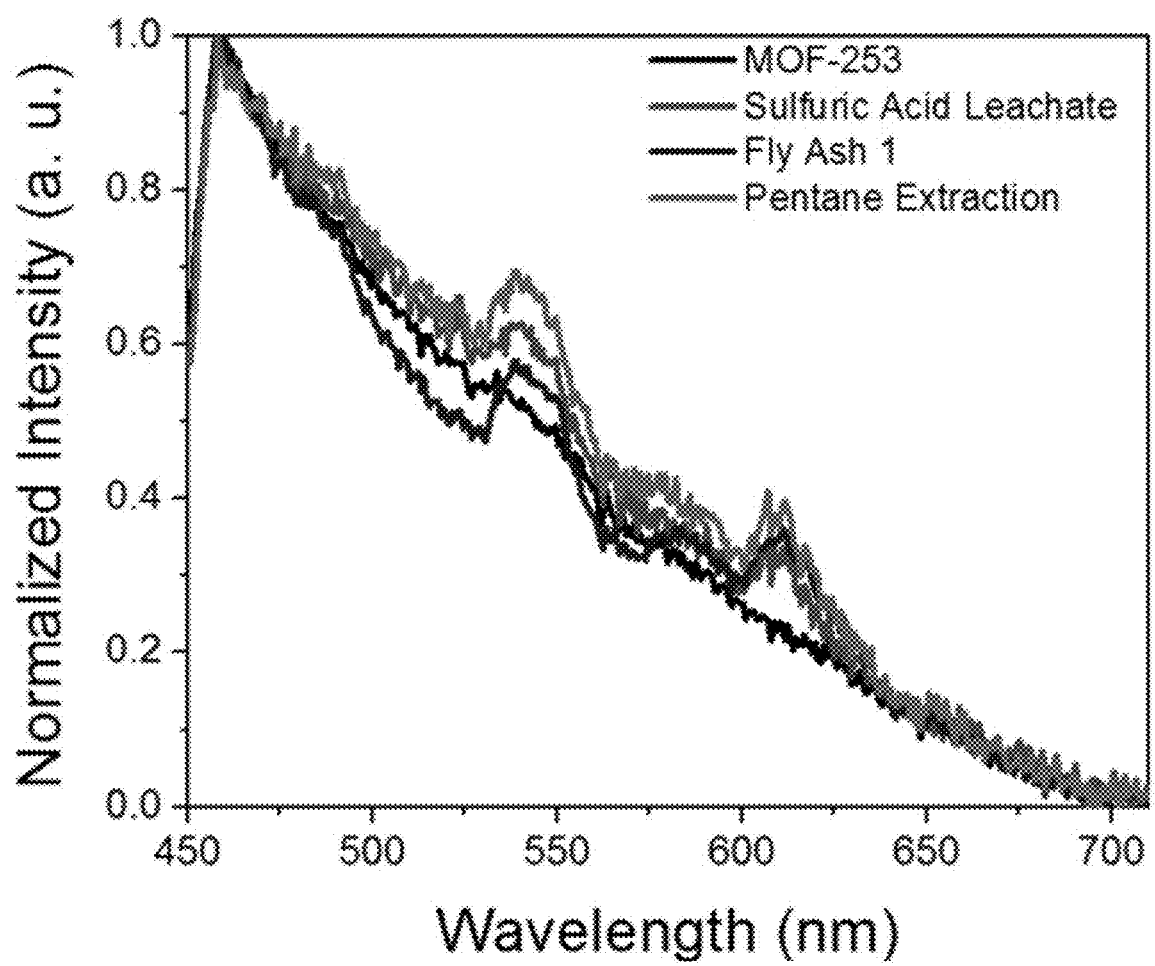
FIG. 13B is normalized emission spectra of a MIL-100 MOF-coated optical fiber tip and a MOF-253-coated optical fiber tip in the presence of fly ash leachate, sulfuric acid leachate, and pentane extraction, where signal from Tb and Eu can be observed, in accordance with the features of the present invention.

A salient feature of the invented REE sensor is that it can be easily functionalized with MOF coatings selected from a range of MOFs. The REE sensor disclosed herein was functionalized with other MOFs known in the literature to sensitize REEs, including MIL-100 (iridium and benzene-1,3,5-tricarboxylate) and MOF-253 (aluminum and 2,2-bipyridine-5,5-dicarboxylate). FIG. 13A shows the luminescent signal from Tb and Eu induced in process streams, including fly ash leachate, sulfuric acid leachate, and pentane extraction liquid, using a MIL-100 MOF coating. Likewise, FIG. 13B shows the luminescent signal from Tb and Eu induced in process streams, including fly ash leachate, sulfuric acid leachate, and pentane extraction liquid, using a MOF-253 MOF coating. Luminescent signal from Tb and Eu was observed in all process streams (ICP-MS values: fly ash 1 (38.1 ppb Tb, 56.4 ppb Eu), sulfuric acid leachate (105 ppb Tb, 132 ppb Eu), and pentane extraction liquid (approximately 70 ppb Tb, 100 ppb Eu)).

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A method to detect and quantify rare earth elements in a fluid contacting a sensor, comprising:
   providing the sensor to an environment such that the sensor is in contact with the fluid, wherein the sensor comprises a fiber extending between a first end and a second end along a longitudinal axis, wherein the sensor further comprises a coating on the second end of the fiber, wherein the coating comprises a metal-organic framework material;
   removing the sensor from contact with the fluid and drying the sensor;
   interrogating the sensor with light;
   collecting a luminescent signal; and
   detecting the rare earth elements in the fluid contacting the sensor using the luminescent signal, wherein the fluid comprises a pH less than or equal to about 1, a concentration of non-rare earth element metals at least several orders of magnitude greater than a concentration of rare earth elements therein, or combinations thereof.

2. The method of claim 1 wherein the metal-organic framework material comprises a crystalline, ordered, highly porous material comprising metal centers linked by organic ligands.

3. The method of claim 1 wherein the metal-organic framework material comprises zinc adeninate and a polar, aprotic solvent.

4. The method of claim 3 wherein the metal-organic framework material comprises 1,3,5-benzenetricarboxylate.

5. The method of claim 3 wherein the metal-organic framework material comprises 4,4-biphenyldicarboxylate.

6. The method of claim 1 wherein the rare earth element comprises a lanthanide selected from a group consisting of terbium, europium, dysprosium, neodymium, ytterbium, samarium, and combinations thereof.

7. The method of claim 1 wherein the metal-organic framework material is immobilized on the fiber using a coating procedure selected from the group of coating procedures consisting of sol-gel coating, dipcoating, and combinations thereof.

8. The method of claim 1 wherein the metal-organic framework comprises pores, and wherein detecting the rare earth elements step comprises encapsulating the rare earth elements in the pores.

9. The method of claim 8 wherein the method sensitizes the rare earth elements to luminescence-based detection.

10. The method of claim 1 wherein the luminescent signal is produced by the rare earth element in the fluid upon exposure to light.

11. The method of claim 1 wherein the luminescent signal is collected downstream from the sensor by a simple optical detector.

12. The method of claim 1 wherein the method provides a limit of detection of the rare earth elements in the fluid between approximately 60 and approximately 780 parts per billion.

13. The method of claim 1 wherein the method provides a limit of quantification of the rare earth elements in the fluid between approximately 210 and approximately 2600 parts per billion.

14. A rare earth element sensor comprising:
   a fiber extending between a first end and a second end along a longitudinal axis, wherein the fiber further comprises a coating on the second end of the fiber, wherein the coating is dried prior to interrogation of the sensor with light, and wherein the coating comprises a metal-organic framework material, wherein the metal-organic framework material comprises pores wherein the pores encapsulate excited rare earth elements from a fluid.

15. The sensor of claim 14 wherein the metal-organic framework material comprises a crystalline, ordered, highly porous material comprising metal centers linked by organic ligands.

16. The sensor of claim 14 wherein the metal-organic framework material comprises zinc adeninate and a polar, aprotic solvent.

17. The sensor of claim 14 wherein the metal-organic framework material comprises 1,3,5-benzenetricarboxylate.

18. The sensor of claim 14 wherein the metal-organic framework material comprises 4,4-biphenyldicarboxylate.

19. The sensor of claim 14 wherein the fluid comprises a pH less than or equal to about 1.

20. The sensor of claim 14 wherein the fluid comprises a pH less than or equal to about 1 and a non-rare earth element metal concentration at least several orders of magnitude greater than a rare earth element concentration therein.

21. The sensor of claim 14 wherein the fluid comprises a pH greater than or equal to about 2 a non-rare earth element metal concentration at least several orders of magnitude greater than a rare earth element concentration therein.

* * * * *